(12) United States Patent
Craft

(10) Patent No.: US 12,406,005 B2
(45) Date of Patent: Sep. 2, 2025

(54) MEDIA TRIGGERED VIRTUAL REPOSITORY WITH TEMPORAL DATA RECOGNITION AND MATCHING ENGINE

(71) Applicant: Mack Craft, Denver, CO (US)

(72) Inventor: Mack Craft, Denver, CO (US)

( * ) Notice: Subject to any disclaimer, the term of this patent is extended or adjusted under 35 U.S.C. 154(b) by 31 days.

(21) Appl. No.: 18/652,738

(22) Filed: May 1, 2024

(65) Prior Publication Data

US 2024/0281474 A1 Aug. 22, 2024

Related U.S. Application Data

(63) Continuation-in-part of application No. 18/064,337, filed on Dec. 12, 2022, and a continuation-in-part of application No. 18/051,273, filed on Oct. 31, 2022, now Pat. No. 12,079,263, which is a continuation-in-part of application No. 17/248,185, filed on Jan. 13, 2021, now Pat. No. 11,526,472, which is a continuation-in-part of application No. 16/213,959, filed on Dec. 7, 2018, now abandoned.

(60) Provisional application No. 62/974,091, filed on Nov. 13, 2019, provisional application No. 62/596,003, filed on Dec. 7, 2017.

(51) Int. Cl.
*G06F 16/903* (2019.01)
*G06F 16/9035* (2019.01)
*G06F 16/9038* (2019.01)

(52) U.S. Cl.
CPC .... *G06F 16/90335* (2019.01); *G06F 16/9035* (2019.01); *G06F 16/9038* (2019.01)

(58) Field of Classification Search
CPC .......... G06F 16/90335; G06F 16/9038; G06F 16/9035
See application file for complete search history.

(56) References Cited

U.S. PATENT DOCUMENTS

2017/0287056 A1* 10/2017 Dohlman ............ G06F 16/5838

* cited by examiner

*Primary Examiner* — Jay A Morrison
(74) *Attorney, Agent, or Firm* — Mark Young, PA

(57) ABSTRACT

A computer-implemented method of matching exact item records from a media file (audio or video or photograph) from at least one of various triggers associated with temporal data recognition during a broadcast, program, event, or streaming. The triggered recognized media is associated with an item record of one or more virtual repositories of one or more users. A response to a user may include a link to one or more item records associated with an online commerce site, a calendared object associated with an event, a notification, or interactive gaming.

30 Claims, 21 Drawing Sheets

MEDIA TRIGGERED VIRTUAL REPOSITORY WITH TEMPORAL DATA RECOGNITION AND MATCHING ENGINE

RELATED APPLICATION

This application is a continuation in part and claims the benefit of priority of U.S. Nonprovisional application Ser. No. 18/064,337 filed Dec. 12, 2022 and nonprovisional of U.S. Nonprovisional application Ser. No. 18/051,273 filed Oct. 31, 2022, which claim the benefit of priority of U.S. Nonprovisional application Ser. No. 17/248,185 filed Jan. 13, 2021 which is now patented as U.S. Pat. No. 11,526,472, issued Dec. 13, 2022; which claims the benefit of priority of U.S. Provisional Application No. 62/974,091 filed Nov. 13, 2019, the entire contents of which are incorporated herein by this reference and made a part hereof.

FIELD OF THE INVENTION

This invention relates to a system that generates triggers that identify a user and target, processes the triggers to determine one or more item records from a virtual repository that are, related to the target, and generates a functional response.

BACKGROUND

Items associated with television shows, movies, television series, sporting events, and celebrities are fascinating and more desirable to the consuming public. Consumers want to purchase items shown on television or video on impulse without the need to search. They want to know about those items now and not later. They want the ability to save these items instantly. The brands, television networks, streaming companies, production companies, celebrities, and distribution companies have no ability to monetize from the items shown on television or programs in real-time when the user first sees it or when they are the most interested in the items. Sales opportunities for the brands are lost with time. The intent to purchase or save items shown on tv for the consumer diminishes over time. It's natural to forget. Distribution companies don't know how to turn their millions of viewers into millions of shoppers, instantly. The problem with QR codes, about time the viewer realizes they are interested in the offer, the QR code is gone, or the new TV ad or TV show has started. Another sales opportunity was lost. Google lens allows consumers to interact with a single item or image within a photo to find a match or similar item through a visual query search basically casting a wide net full of similar items, and it doesn't monetize for the TV networks, celebrities, production companies, or distribution companies. The current invention solves all these problems and more including allowing many of the exact items in a photo or video seen to return results to a user interface with a single trigger and allowing owners of the content the opportunity to earn compensation from the sale of these items in real-time from viewers or members. Owners of content can be a TV network, sports team, TV show, business, agency and more. The search is narrow focused and 100% accurate of the exact items shown or heard or matched from video data or audio data. Celebrities influence the consumer public. Fans may want to dress like celebrities, wear the same jewelry, consume the same foods, and beverages, enjoy the same furniture, drive the same vehicles. Heretofore, consumers had to conduct their own research to find out what a celebrity wore, drove, consumed or used on a show, at an event or in a movie. While corporate sponsors have paid considerable sums to movie producers to have their brand blatantly highlighted in a scene, the exposure was limited and often considered tacky. The sponsored product appeared briefly in a few scenes. Unsponsored products were wholly ignored.

Some consumers want to know what a celebrity wore, drove, consumed or used on a show, at an event or in a movie. What appeals to some consumers may not appeal to others. It is difficult or impossible to predict what may catch a consumer's eye. One consumer may adore a watch worn by a celebrity in scene. Another may fancy a garment. Another may desire a vehicle. However, there is no convenient way to make this information available to consumers, and, heretofore, no motivation for a celebrity or producer to go through the effort.

Some efforts have been devoted to websites that identify items (e.g., garments) that appeared in a show. Typically, the items that actually appeared, or close facsimiles, are listed in an online marketplace. Such lists are exceedingly limited and not accessible from the show.

Consumers may also be interested in appearances by celebrities and events at locations. Heretofore, consumers surfed the Internet to find sources of relevant information. A website for a venue may post a schedule of events that venue. Entertainment websites may identify appearances, performance, matches, games by celebrities, groups and teams. While such postings are helpful, they necessitate research, which can be cumbersome.

Financing is constant challenge for celebrities and producers. A good production can be costly. Heretofore, production companies and investors with considerable resources financed the production and marketing of movies. The majority of their financial return came from movie tickets, sales or rental of copies, licensed rights for broadcast and on-demand offerings, and, occasionally, merchandising of brands made popular by the production. Heretofore there was no way for producers to effectively capitalize on the popularity of a product due to the movie.

The status quo does not inspire sellers. Products supplied or sold for use by a celebrity are a one-time sale by the seller. Occasionally, a dress designer will receive publicity on the red carpet when a celebrity mentions the brand. The dresses and brands are impractical and too expensive for ordinary consumers. If sellers had assurance that their products would be marketed to consumers via the show, event or movie, they would not only be willing to supply the products for free but may also offer a portion of sales proceeds derived from such marketing.

A system and method that provides a functional response from a triggered target is needed. A target is a person, place, information, image, or thing of interest. A trigger should be generated by interacting with a target, such as by photographing a target or an identifier (e.g., 1-D or 2-D barcodes) for the target, recording (audio and/or video and/or location data and/or event data and/or image and/or object) a target or an identifier for the target, selecting a target, or activating a control while a target is present. A trigger should include data that includes information to identify the target and to identify the user who generated the trigger. A functional response should contain interactive information relevant to the target. The interactive information may include purchasing links, calendar or scheduling data, or other information, links, interactive overlays, interactive 3D graphic representation, augmented reality, objects, or tools that relate to the subject.

The claimed invention is similar to the invention claimed in allowed patent application Ser. No. 17/248,185, except that the invention claimed herein is triggered by temporal data recognition or scene recognition associated with a media file and a virtual repository. The invention is a technological advancement, overcoming one or more of the problems and solving one or more of the needs including evolving the traditional search engine with media triggered instantaneous results.

SUMMARY OF THE INVENTION

To solve one or more of the problems set forth above, in an exemplary implementation of the invention, a computer-implemented method of managing a virtual repository system includes providing on a computing system a plurality of virtual repositories. Each virtual repository is assigned to a user. Each virtual repository includes item records for items owned and/or used and/or managed by the user. A first trigger is received on the computing system, which includes a programmed computer, from a first computing device of a first user. The first trigger requests information associated with at least one virtual repository of the plurality of virtual repositories. Results are sent from the computing system to the first computing device. The results including links to at least one virtual repository of the plurality of virtual repositories in response to the trigger. All notifications may be associated with a link. Using an application on a portable computing device or computing device such as a smartphone or smart TV, a consumer generates a trigger. The exemplary method accepts various triggers. A trigger requests information associated with a target. A target may be a location, a product, media, an event, gaming, an image, a face, a video, an object, a logo, a scene, a time code, a touch sensor (finger or cursor), biometric, pattern, voice, speaker, speech, text, typing, audio or sound, and a bounding box. The target is associated with at least one virtual repository of the plurality of virtual repositories. The target may be a user, person, group of people, place, video, audio, event, location, or thing. An event trigger requests virtual repository information for one or more users or item records appearing at a scheduled event. A location trigger requests information for one or more users at the same location (which includes the vicinity) as the location of the first user who submitted the trigger. A media trigger contains an image, video, video trigger, or sound recording, from which a user's identity is determined via facial, speaker recognition, time code, or temporal data recognition. A media trigger may be a photograph trigger, a recorded audio trigger or a recorded video trigger or a time code trigger. A time code trigger may work in combination with a touch sensor or touch digitizer trigger (e.g. Finger). A media trigger includes captured media.

A product trigger identifies a product and seeks links corresponding to the product. A directive trigger includes a condition, which, when satisfied, causes the computing system to send results that include responsive details. To solve one or more of the problems set forth above, in an exemplary implementation of the invention, a computer-implemented method of managing a virtual repository system includes providing on a computing system a plurality of virtual repositories. Each virtual repository is assigned to a user. Each virtual repository includes item records for items owned and used by the user. A first trigger is received on the computing system, which includes a programmed computer, from a first computing device of a first user. The first trigger requests and/or process information associated with at least one virtual repository of the plurality of virtual repositories or database. Results are sent from the computing system to the first computing device. The results including one or more links to at least one virtual repository of the plurality of virtual repositories in response to the trigger.

The exemplary method accepts various triggers. A target trigger requests information associated with at least one virtual repository of the plurality of virtual repositories assigned to an identified user, individual or person. An event trigger requests virtual repository information from and for one or more users appearing at a scheduled event. A location trigger requests information from and for one or more users at the same location (which includes the vicinity) as the location of the first user who submitted the trigger. A media trigger contains or may request information associated with an image, face, object, scene, video, video data, event data, text, timestamp, time value, time code, a QR Code, Multi-dimensional QR Code, invisible QR Code, transparent QR Code, temporal data, sound recording and repository information, from which a user's identity is determined via facial recognition, video recognition, sound recognition, pattern recognition, object recognition, scene recognition, text recognition, image recognition, time code recognition, timestamp recognition, voice recognition, audio recognition, optical character recognition, speaker recognition, temporal data recognition, and a combination thereof. A product trigger identifies a product and seeks links to users and/or virtual repositories that contain item records, marketing objects, matching objects, that corresponds to the product or game, gaming, or betting platform. A directive trigger includes a condition, an instruction, functions, which, when satisfied, causes the computing system to send results that may include active communication and responsive details. A text message trigger includes messages that trigger key words from a computing device that are keywords in the repository that match item records and marketing objects that works with the principles of the invention. These item records may be delivered to a user interface during a text. Phrases may also be triggered. Various triggers also include a time code trigger. A time code trigger may trigger or initiate time code recognition or trigger item record identification. Trigger item record identification initiates and/or identifies temporal data, a timeframe, a timestamp, time value, time code or time code trigger and/or time code recognition associated to item records. A time code trigger, time value, timeframe, or time code recognition identifies all item records, media file, video data, user data, audio data, in real-time during a recording, streaming, or broadcast that correlates a time code of a program, broadcast, video, media, or audio time code with a time code associated with item records in a virtual repository or database. If the time code, time value, or timestamp on the video, broadcast, program, media, or audio matches the time code, time value, or timestamp in the virtual repository or database of a user, then all item records associated with that time code or timestamp is a match and will be sent as results to the computing device of the first trigger user. Therefore, all item records in a scene, media, video, audio, program, or broadcast do not have to be identified through other recognition technologies for the user to be sent the results of all item records in a scene, audio, media, or video. A confidence score doesn't have to be perfect. In this technological advancement, one example of time code recognition or temporal data recognition, only a user's top (or any trigger or a combination thereof) may be identified or generated through, but not limited to, object, video, audio, image, facial, scene, or sound recognition on a video or audio associated to a time code, timeframe, time value, or timestamp, to identify the user's shoes and pants if all three item records are associated to the same time code, time value, or timestamp of the same virtual repository. All time codes may be correlated to objects or item records. A time code trigger and/or time code recognition may also be associated with Temporal Data, Temporal Data Recognition, Multi-Recognition Technology, or Temporal Data Matching Engine. Temporal Data Matching Engine may also be referred to as Temporal Data Recognition. In this invention, temporal databases and virtual repositories stores data relating to time instances or time. It offers temporal data types and stores information related to the past, present, and future time. Temporal databases can be uni-temporal, bi-temporal or tri-temporal. In this invention, temporal data identifies accuracy of data to make sure item records shown or heard on media matches the trigger time to determine what media program the viewer is watching or listening to, and temporal data identifies accuracy of the data to make sure item records matches the media file with time code in database or virtual repository at the time of the first trigger, and matches time the user who generated the trigger to determine who is the viewer, listener, and/or seller, and matches the time code of the results sent to the user. A time code trigger or/and time code recognition may be system generated, continuous, or ongoing throughout one or more programs, and may display or deliver item record results continuously to one or more user interfaces or computing devices from one or more virtual repositories via directives, user voice commands, system generated recommendations, a video or audio pause, a touch sensor or digitizer (e.g. finger on in-video mobile screen on smart phone or Smart TV) on the user interface of any image or object shown on video, or a cursor. User Interface may include an overlay on a visual display. In this technological advancement to determine exact identical matching, item records of a "Program" are systematically populated in virtual repository that are associated with a media file of one or more users (example: Merchants, actors, producers) of owned or used item records that are specifically being used in that "Program". When recognition technology is generated, analyzed, and processed, the queries or technology doesn't need to search the entire internet or visual database looking for the "Black Shirt" for example, worn by Tom Cruise in the movie mission impossible to return a bunch or maybes or possibilities. The technology only has to search the specific database or virtual repository associated to that specific media file or program associated to the specific time code, timeframe, or time value when a trigger generated the recognition technology. Since the "Black Shirt" item record in the virtual repository are synced up with video data at the identical time Tom Cruise was wearing the "Black Shirt" in the program Mission Impossible, during a trigger, the exact matching item "Black Shirt" is identified, instantly. For Example, (Color—All Black Shirt, Category—Shirt, Gender—Men, Brand—Calvin Klien, Size xl, ShortSleeve, Price—$98) In other use of recognition technology, like Google Lens, it's almost impossible to know the exact product details and attributes of a "Black Shirt", because an "All Black Shirt" will return many possibilities and maybe of a "All Black Shirt", but it can't return the exact or identical "Black Shirt". Managing the media file of a program and item records used in the program is the technological advancement of recognizing identical record items from any program or any computing device where the technology is applied or integrated. Temporal Data Recognition, the combination of one or more recognition technologies (also referred to as multi-authentication recognition) being generated at once with time code recognition associated with triggers and managed media files associated with a virtual repository, creates the 100% identical match that Tom Cruise was wearing the "Black Shirt" in the exact scene or scenes. To double down on the technological advancement, the current invention eliminates the need to search. Information about things, people, or places you see on programs or in-person, can be identified through triggers and delivered to your user-interface, without searching or browsing the internet. If the time code, time value, or timestamp on the video, broadcast, program, media, or audio matches the time code, time value, or timestamp in the virtual repository or database of a user, then all item records associated with that time code or timestamp is a match and will be sent as results to the computing device of the first trigger user. Therefore, all item records in a scene, media, video, audio, program, or broadcast do not have to be identified through other recognition technologies for the user to be sent the results of all item records in a scene, audio, media, or video. A confidence score doesn't have to be perfect. In this technological advancement, one example of time code recognition, only a user's top (or any trigger or a combination thereof) may be identified or generated through, but not limited to, object, image, facial, or sound recognition on a video associated to a time code, time value, or timestamp, to identify the user's shoes and pants if all three item records are associated to the same time code, time value, or timestamp of the same virtual repository. Other technologies only identify one item at a time. A system generated recommendation or suggestion to a user via a virtual repository or database may also be triggered or initiated by a trigger or time code trigger. A Smart TV when triggered, may be synced to a user smartphone to deliver results to a user mobile smart phone or user interface. A gaming trigger identifies a sequence of events throughout a scene, program, TV show, movie, TV series, or event or time code related to marketing objects, and item records that are associated to video data that queries questions or betting options, including systematically created or generated questions or betting options using artificial intelligence that correlates to temporal data within a repository. These questions or betting options are sent to a user interface, smart TV, or digital device for user interaction. Compensation for gaming winnings may result in rewards not limited to monetary compensation, points, and gifts. User data associated with programs may also be computer or system generated on the fly or stored in a database or virtual repository to correlate to triggers. In all cases, displayed results may be filtered and sorted by the user or system. All results contain one or more item records, marketing objects, objects, matching objects, notifications, and links or a combination thereof. Item records include consumer product goods and semantic information.

In another aspect of an exemplary implementation of the invention, a virtual repository method and system with robust item management automatically derives item data from accessed current and past transactions. The system interfaces with merchant systems to receive current and archived transaction data, scans emails for current and past transaction data, monitors browser data for online transaction data, and accepts manual input. The system establishes a communication channel with each remote disparate source. The system executes program instructions to harvest data from each local source. The system filters and collates data from all sources and stores the processed data in a virtual repository for presentation to a user in an easy to navigate GUI. Data obtained from all sources is filtered, collated and stored in a cache for user input and approval. Approved cached entries are migrated into the virtual repository. The resulting virtual repository is an accurate reflection of the user's real-world acquisitions within a user-defined category including a navigable three-dimensional graphic representation of a virtual repository. A three-dimensional graphic representation or augmented reality may be associated to a location trigger (GPS) and/or a location of places, people, and things. A location trigger may also initiate a nearby search of item records or objects within proximity. A management system enables scheduling and tracking use of, sharing information about and capitalizing on (e.g., selling, leasing, promoting, donating) items. Merchants may reward users for sales attributed to the user's promotion.

In one embodiment, an exemplary computer-implemented method of managing a virtual repository includes a step of a user, via a user computing device, creating a virtual repository. The virtual repository includes a virtual repository, media file or media identification or media. The term "Media" or "Media file" or Media Information in this invention may contain one or more of the following: video data, media identification, audio data, sound data, speaker data, speech data, face data, scene data, event data, location data, time data, gaming data, user data, digital data, data feeds, and media information associated with TV shows, Movies, TV Series, advertisement, TV Ads, sporting events, streaming programs, podcast, celebrities, influencers, social media, establishments, and other users including item records and objects or a combination thereof. The term or word "Media" may have the same meaning as "Media file" or "Media information" in this current invention or vice versa. A "Media File, Media, and Media information may also contain a traffic system. A traffic system may be associated to an as-run log. A traffic system is used to log or store every TV AD Commercial at a TV station, streaming company, or TV network and keep a record on when they should be played throughout an hour, day, week, month etc. and an as-run log does reconciliation after airing to determined what was missed and re-slot it. A traffic system or "Traffic" is the scheduling of program material, specifically advertisement. Item Records associated to a traffic system of a media file may be identified through a time code, time code trigger, Temporal Data Recognition and time code recognition. A programmed system obtains, on a server, via network communication, item records from a plurality of third party sources including merchants or other users selling items from a secondary market, the item records being records of items (e.g., clothes, furniture, users, program information, product details, gaming data, service details, video data, event data, sound data, objects, matching objects, marketing objects, etc. . . . ) acquired by the user. The programmed system collates the obtained item records. At this point the item records are merged into a structured form, such as a table or list or database. Item records may have the same meaning as, or associated with, marketing objects, matching objects, items, video data, sound data, users, consumers, clients, persons, individuals, objects, marketing directives, and vice versa. The step of the programmed system collating the obtained item records entails extracting data from the obtained item records (e.g., identifying and storing data for the fields of each item record) and merging obtained item records into a table, each item record comprising a plurality of fields. The programmed system stores the collated obtained item records in a cache (i.e., a temporary storage). The programmed system presents to the user the collated obtained item records stored in the cache. This gives the user a chance to validate (e.g., accept, reject and delete, or modify) records. The user, via the user computing device, validates the collated obtained item records stored in the cache as presented by the programmed system. Then the programmed system associates the validated collated obtained item records stored in the cache with the virtual repository. The programmed system also stores the validated collated obtained item records on a storage device, whereupon the cache may be wiped clean (i.e., all records may be deleted from the cache). Each item record may include a photograph of an item or an address (e.g., URL or pointer) to a photograph of an item. A link may also mean affiliate link or hyperlink. An affiliate link may be associated with any of the validated collated obtained item records. The affiliate link allows affiliate compensation for clickthrough purchases by other users. A software component on the user computing device (e.g., a plugin, addon or application) searches emails for item records, and provides the item records from searched emails to the programmed system for collating with the obtained item records, for subsequent validation in the cache. Another software component on the user computing device monitors browser activity for item records and provides the item records from browser activity to the programmed system for collating with the obtained item records, again for subsequent validation in the cache. Manually input item records may be received on the user computing device and provided (communicated via network communication) to the programmed system for collating with the obtained item records, again for subsequent validation in the cache. At least one image, video data, sound data, user data, event data, gaming data, and/or information relating to a virtual repository may be displayed on a display device of the user computing device. The displayed image and/or information may be one or more item photos or videos, a navigable two-dimensional graphic representation of the virtual repository, a navigable three-dimensional graphic representation of the virtual repository, item photos arranged in a continuous list from which any photo from the continuous list is displayable by user command, several levels of item photos or videos arranged in continuous lists from which any photo from a continuous list at each displayed level is displayable by user command. Virtual repositories and/or item records marked for sharing may be viewed (accessed for viewing but not changed) by other users. This allows users to browse virtual repositories and item records (e.g., images of items and information pertaining to such items) of other users. A user may record dates, timestamps, media identifications, scene names, and marketing objects of use of items or video data corresponding to item records. This facilitates management of items according to recorded use. Items may be marked for sale, rental and donation. Item records may be systematically calendared by time and date of which an event is set to start or released to the public. In the cases of sale and rental, a marked item is shared with other users, who may purchase or rent the items through the system. In the case of donation, the user may select a charity to which the item may be donated.

A computer-implemented method of managing a virtual repository system associated with item records matching media file associated with merchant links during a trigger, the method comprising: a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and the computer system receiving a selection of a first item record, the first item record being an item record for an item used or owned by the second user, the computing system associating the first item record with use information for the second user of the second repository; the computing system receiving from a first computing device of a first user a first trigger, the first trigger requesting first information including marketing objects associated with marketing directives and the first trigger including media file, the media file including video data associated with the second user; and the computing system performing trigger item record identification including steps of performing object recognition on the video data, and identifying a video program scene of interest on the video data including temporal data that correlates item records shown on a program to a specific time value of matching item records associated to a virtual repository, and identifying the second user from the video data, and identifying one or more matching item records from the media file and similar item records associated with a plurality of users for the second user; and the computing system sending results to the first computing device, the results including a link to one or more item records including one or more systematic notifications associated with item records of one or more repositories associated with the video data, the first item record and notification being responsive to the first trigger.

A computer-implemented method of managing a virtual repository system associated to item records precisely matching video and audio data associated to merchant links, the method comprising: a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and the computer system receiving a selection of a first item record, the first item record being an item record for an item used or owned by the second user, the computing system associating the first item record with use information for the second user of the second repository; the computing system receiving from a first computing device of a first user a first trigger, the first trigger requesting first information including marketing objects associated with marketing directives and the first trigger including media file, the media file including video data associated with the second user; and the computing system performing trigger item record identification including steps of performing sound recognition on the video data, and identifying a video program scene of interest on the video data including temporal data that correlates item records shown on a program to a specific time value to item records associated to a virtual repository, and identifying the second user from the video data, and identifying one or more matching item records from the media file and similar item records associated with a plurality of users for the second user; and the computing system sending results to the first computing device, the results including a link to one or more item records including one or more systematic notifications associated with item records of one or more repositories associated with the video data, the first item record and notification being responsive to the first trigger.

A computer-implemented method of managing a virtual repository system associated to item records precisely matching video and audio data associated to merchant links, the method comprising: a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and the computer system receiving a selection of a first item record, the first item record being an item record for an item used or owned by the second user, the computing system associating the first item record with use information for the second user of the second repository; the computing system receiving from a first computing device of a first user a first trigger, the first trigger requesting first information including marketing objects associated with marketing directives and the first trigger including media information, the media information including video data associated with the second user; and the computing system performing trigger item record identification including identifying temporal data that correlates time to individuals and items appearing throughout the duration of the video and precisely correlating a user video data with matching item records timestamped in the repository, and identifying the second user from the video data, and identifying one or more matching item records from the media file and similar item records associated with a plurality of users for the second user; and the computing system sending results to the first computing device, the results including a link to one or more item records including one or more systematic notifications associated with item records of one or more repositories related to the video data, the first item record and notification being responsive to the first trigger.

A computer-implemented method of managing a virtual repository system associated to item records precisely matching video and audio data associated to merchant links, the method comprising: a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and the computer system receiving a selection of a first item record, the first item record being an item record for an item used or owned by the second user, the computing system associating the first item record with use information for the second user of the second repository; the computing system receiving from a first computing device of a first user a first trigger, the first trigger voice command requesting first information including a directive with instructions to implement a function associated to marketing objects and the first trigger including media file, the media file including audio data associated with the second user; and the computing system performing trigger item record identification including steps of performing voice recognition and speech recognition on the voice command of the first user and speech and sound recognition on the audio data, and identifying the first user from the voice and speech recognition, and identifying the second user from the audio data, and identifying one or more matching item records associated with one or more directives from the first user corresponding to one or more virtual repositories of a second user; and corresponding to one or more directives of the first user and implementing one or more functions until one or more directives are satisfied; and the computing system sending results to the first computing device, the results including a link to one or more matching item records, the first item record being responsive to the first trigger.

A computer-implemented method of managing a virtual repository system associated to item records precisely matching video and audio data associated to merchant links, the method comprising: a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and the computer system receiving a selection of a first item record, the first item record being an item record for an item used or owned by the second user, the computing system associating the first item record with use information for the second user of the second repository; the computing system receiving from a first computing device of a first user a first trigger, the first trigger voice command requesting first information including a directive with instructions to implement a function associated to marketing objects and the first trigger including media file, the media file including audio data associated with the second user; and the personal digital assistant performing trigger item record identification including steps of performing voice recognition and speech recognition on the voice command from the first user and speech and sound recognition on the audio data, and identifying the first user from the voice and speech recognition, and identifying the second user from the audio data, and identifying one or more matching item records associated with one or more directives from the first user corresponding to one or more virtual repositories of a second user; and corresponding to one or more directives of the first user and implementing one or more functions until one or more directives are satisfied; and the computing system sending results to the first computing device, the results including a link to one or more item records, the first item record being responsive to the first trigger.

A computer-implemented method of managing a virtual repository system associated to item records precisely matching video and audio data associated to merchant links, the method comprising: a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and the computer system receiving a selection of a first item record, the first item record being an item record for an item used or owned by the second user, the computing system associating the first item record with use information for the second user; the computing system receiving from a first computing device of a first user a first trigger, the first trigger requesting first information including marketing objects associated with marketing directives and the first trigger including media file, the media file including video data associated with the second user; and the computing system performing trigger item record identification including steps of performing object recognition on the video data, and identifying a video program scene of interest on the video data including temporal data that correlates item records shown on a program to a specific time value of matching item records associated to a virtual repository, and identifying the second user from the video data, and identifying one or more matching item records from the media file and similar item records associated with a plurality of users for the second user; and the computing system sending results to the first computing device, the results including an interactive video overlay covering the visual display and a link to one or more item records corresponding to the interactive overlay associated with a user-interface and one or more repositories related to the video data, the first item record being responsive to the first trigger.

A computer-implemented method of managing a virtual repository system associated to item records precisely matching video and audio data associated to merchant links, the method comprising: a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and the computer system receiving a selection of a first item record, the first item record being an item record for an item used or owned by the second user, the computing system associating the first item record with use information for the second user; the computing system receiving from a first computing device of a first user a first trigger, the first trigger requesting first information including marketing objects associated with marketing directives and the first trigger including media file, the media file including video data associated with the second user; and the computing system performing trigger item record identification including steps of identifying a video program scene of interest on the video data associated with temporal data that correlates item records shown on a television program to a specific time value of matching item records associated with a virtual repository, and identifying the second user from the video data, and identifying one or more matching item records from the media file and similar item records associated with a plurality of users for the second user; and the computing system sending results to the first computing device, the results including an interactive video overlay covering the visual display and a link to one or more item records corresponding to the interactive overlay associated with a user-interface and one or more repositories associated with the video data, the first item record being responsive to the first trigger.

A computer-implemented method of managing a virtual repository system associated to item records precisely matching video and audio data associated to merchant links, the method comprising: a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and the computer system receiving a selection of a first item record, the first item record being an item record for an item used or owned by the second user, the computing system associating the first item record with use information for the second user; the computing system receiving from a first computing device of a first user a first trigger, the first trigger requesting first information including marketing objects and media file associated with the first trigger, the media file including video data associated with the second user; the computing device receiving a touch sensor on one or more images on an interactive touchscreen or overlay on the user interface of the first user and the computing system performing object recognition on the item records displayed on the user-interface including steps of identifying a video program scene of interest on the video data associated with temporal data that correlates item records shown on a program to a specific time value of matching item records associated to a user virtual repository, and identifying the second user from the video data, and identifying one or more matching item records from the media file and similar item records associated with a plurality of users for the second user; and the computing system sending results to the first computing device, the results including a link to one or more item records corresponding to the interactive overlay associated with a user-interface of one or more repositories associated with the video data, the first item record being responsive to the first trigger.

A computer-implemented method of managing a virtual repository system associated to item records precisely matching video and audio data associated to merchant links, the method comprising: a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and the computer system receiving a selection of a first item record, the first item record being an item record for an item used or owned by the second user, the computing system associating the first item record with use information for the second user; the computing system receiving from a first computing device of a first user a first trigger, the first trigger voice command or personal digital assistant requesting first information including a directive with instructions to implement a function associated to marketing objects and the first trigger including media file, the media file including video data associated with the second user; and the computing system performing trigger item record identification including steps of performing object recognition on the video data, and identifying a video program scene of interest on the video data including temporal data that correlates item records shown on a program to a specific time value of matching item records associated to a user virtual repository, and identifying the second user from the video data, and identifying one or more matching item records from the use information including media information and similar item records associated with a plurality of users for the second user; and corresponding to the directive of the first user and implement one or more functions until the directive is satisfied; and the computing system sending results to the first computing device, the results including an interactive video overlay covering the visual display and a link to one or more item records corresponding to the interactive overlay associated with a user-interface and one or more virtual repositories related to the video data, the first item record being responsive to the first trigger.

A computer-implemented method of managing a virtual repository system associated to item records precisely matching video and audio data associated to merchant links, the method comprising: a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and the computer system receiving a selection of a first item record, the first item record being an item record for an item used or owned by the second user, the computing system associating the first item record with use information for the second user; the computing system receiving from a first computing device of a first user a first trigger, the first trigger requesting first information including marketing objects associated with marketing directives and the first trigger including media file, the media file including video data associated with the second user; and the computing system performing trigger item record identification including steps of performing object recognition on the video data, and identifying a video program scene of interest on the video data including temporal data that correlates item records shown on a television program to a specific time value of matching item records associated to a user virtual repository, and identifying the second user from the video data, and identifying one or more matching item records from the use information including media information and similar item records associated with a plurality of users for the second user; and the computing system sending results to the first computing device, the results including an interactive video overlay covering the visual display and a link to one or more item records corresponding to the interactive overlay associated with a user-interface and one or more virtual repositories associated with the video data, the first item record being responsive to the first trigger.

A computer-implemented method of managing a virtual repository system associated to item records precisely matching video and audio data associated to merchant links, the method comprising: a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and the computer system receiving a selection of a first item record, the first item record being an item record for an item used or owned by the second user, the computing system associating the first item record with use information for the second user of the second repository; the computing system receiving from a first computing device of a first user a first trigger, the first trigger requesting first information including media file, the media file including video data associated with the second user; and the computing system performing temporal data recognition including identifying temporal data that correlates time to individuals and items appearing throughout the duration of the video with one or more matching item records of video data timestamped in the virtual repository, and identifying the second user from the video data, and identifying one or more similar item records associated with a plurality of users for the second user; and the computing system sending results to the first computing device, the results including a link to one or more matching item records including one or more systematic notifications associated with matching item records of one or more virtual repositories related to the video data, the first item record and notification being responsive to the first trigger.

A computer-implemented method of managing a virtual repository system associated with item records matching media file associated with merchant links, the method comprising: a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and the computer system receiving a selection of a first item record, the first item record being an item record for an item used or owned by the second user, the computing system associating the first item record with use information for the second user of the second repository; the computing system receiving from a first computing device of a first user a first trigger, the first trigger requesting first information including media file, the media file associated with the second user; and the computing system performing time code recognition including identifying temporal data that correlates time to individuals and items appearing throughout the duration of the media with one or more matching item records of media file timestamped in the virtual repository, and identifying the second user from the media file, and identifying one or more similar item records associated with a plurality of users for the second user; and the computing system sending results to the first computing device, the results including a link to one or more matching item records associated with matching item records of one or more virtual repositories related to the media file, the first item record being responsive to the first trigger.

A computer-implemented method of managing a virtual repository system associated to item records precisely matching video and audio data associated to merchant links, the method comprising: a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and the computer system receiving a selection of a first item record, the first item record being an item record for an item used or owned by the second user, the computing system associating the first item record with use information for the second user of the second repository; the computing system receiving from a first computing device of a first user a first trigger, the first trigger requesting first information including media file, the media file including video data associated with the second user; and the computing system performing temporal data recognition including identifying temporal data that correlates time to individuals and items appearing throughout the duration of the video with one or more matching item records of video data timestamped in the virtual repository, and identifying the second user from the video data, and the computing system sending results to the first computing device, the results including a link to one or more item records of one or more virtual repositories associated with the video data, the first item record being responsive to the first trigger.

A computer-implemented method of managing a virtual repository system associated to item records precisely matching video and audio data associated to merchant links, the method comprising: a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and the computer system receiving a selection of a first item record, the first item record being an item record for an item used or owned by the second user, the computing system associating the first item record with use information for the second user of the second repository; the computing system receiving from a first computing device of a first user a first trigger, the first trigger requesting first information including media file, the media file including event data associated with the second user; and the computing system performing temporal data recognition including identifying temporal data that correlates time to individuals and items appearing throughout the duration of the event with one or more matching item records of event data timestamped in the virtual repository, and identifying one or more users from the event data, and the computing system sending results to the first computing device, the results including a link to one or more item records of one or more virtual repositories associated with the event data, the first item record being responsive to the first trigger.

A directive comprises an authoritative instruction pertaining to delivery of electronically deliverable reply. A directive may come with a function and may be responsive to interact with the user until the directive is satisfied. A directive may be a consumer directive or a marketing directive. A consumer directive may be one of many different types including, a location directive, a personal information directive, a general directive and a specific directive. A personal information directive may provide a user's gender, race, age, income level, profession, and personal interests to facilitate delivery of reply marketing objects pertaining thereto. A general directive remains active until canceled. A specific directive and marketing directive instructs the system to which consumers the system should send a particular marketing object. A centralized processing engine saves each received directive as a record in a database referred to as a directive repository. A location directive identifies the user and provides location information for the user. The location information may comprise an address such as a home, business or temporary address, or another location. A location directive may be time bound, i.e., effective for a user-specified period of time. A personal information directive may provide some or all of a user's gender, race, age, religion, marital status, income level, education level, profession, and personal interests to facilitate delivery of marketing objects pertaining thereto. Items of data may be optional, to accommodate users with heightened sensitivity to privacy and/or anonymity.

A general directive remains active until canceled. A general directive identifies goods, services, categories of goods and services, brands, or other identifiable classificatory division of subject matter that is of interest or desired by a user. The general directive identifies the user and the subject matter of interest. A graphical user interface may present a user with a form that allows a user to identify a multitude of subject matter of interest. From the form, a general directive may be produced for each subject matter. By way of example and not limitation, one category may be pickup trucks and another category may be Ford F150® pickup trucks.

A specific directive is an immediate request. A specific directive identifies goods, services, categories of goods and services, brands, or other identifiable classificatory division of subject matter that is presently required by a user. The specific directive identifies the user and the subject matter required. A graphical user interface may present a user with a form that allows a user to identify each subject matter required. From the form, a specific directive is produced for each subject matter. Specific directives are processed immediately or as soon as practicable. A specific directive may be time bound, i.e., limited in duration (e.g., for a day, week, month, until an end date, etc. . . . ). By way of example and not limitation, a specific directive may request coupons or discounts for a particular business. The specific directive may be limited to a particular day when the coupons or discounts are needed. After that day, the coupons will not be provided unless requested again.

A marketing directive instructs the system to which users the system should send a corresponding marketing object. A marketing directive may specify users by subject matter of interest or by personal attribute or by location, as set forth in consumer directives (e.g., location, personal, specific or general directives). A marketing directive is associated with a marketing object. The marketing object is an image, file, stream or data that will be forwarded to each user with a consumer directive that matches a marketing directive. All directives may be associated with artificial intelligence and/or machine learning and/or deep learning or a combination thereof. Computer generated responses to directives, voice commands or personal digital assistants may be associated with artificial intelligence and/or machine learning and/or deep learning or a combination thereof. The marketing object may be stored in the database.

Time bound provisioning is available. All directives may be time bound. In other words, a directive may be active for a limited period of time, defined in hours, days, weeks, months or years. For example, a general directive may be time bound for a year. The user associated with the general directive may receive a reminder of the time limit prior to the expiration, giving the user a chance to re-provision or remove the time limit. As another example, a merchant user may impose a time limit on a marketing directive for a coupon or discount. The marketing directive may expire on a determined date.

Unit provisioning is also available. For example, a merchant may want to limit a marketing directive to a maximum of 100 or 1000 or 100000 users or transactions. In this case, after the unit limit is reached, the marketing directive expires. The unit limit is reached when the number of copies made available to users equals the unit limit or when the number of transactions using the marketing directive (e.g., using a coupon or discount provided with the marketing directive) exceeds a unit (e.g., transactional) limit. For fairness, in one implementation, the limited number of users may be determined randomly, or using a random selection algorithm, from all users with consumer directives to which the marketing directive is responsive. Alternatively, the limited number of users may be selected based on seniority of their consumer directives—first posted, first served. These and other user selection criteria may be employed if a unit limit must be applied. In the case of a transactional unit limit, the limit may be applied on a first come first served basis.

The trigger creates a percipient sample pack (PSP), i.e., a sample pack or data pack. The PSP may include a user identification, location information, time information and captured (e.g., recorded) media. Thus, the PSP contains information and captured media. The user identification, location information, time information are PSP information. The captured media is PSP media. The captured media is recorded audio and/or video of a target. Captured media may be associated with a virtual repository or database. One or more virtual repositories may be associated to a database or may be one or more databases. A database may be one or more virtual repositories. The target may, for example, be a television program (e.g., a show, TV series, or movie, event, location, TV commercial, music video, objects, or item records), a streamed program, or a program from another source, such as a recording medium (e.g., a DVD), the Internet or a program delivery service that provides content by network communication. The captured media may be a portion of the target, i.e., a portion of interest to the user. A portion of a target may also mean the entire target or all objects in or on the target doesn't have to be identified through recognition technology to identify all the objects or the entire target or objects in the entire scene or location. This computer method is another example of a new technological invention. The user may be interested in the participants who appear in the captured media, the garments or accessories they are wearing, items they are using or other objects or objects related to services (e.g. make-up the participant is wearing and the make-up artist who put it on the participant and option or link to schedule an appointment) that appear in the captured media (e.g., furniture, dishware, art, pets, bed, lamp, event information. Services in captured media may also include, but not limited to buildings with leasing options or purchasing options to office space, residential space, and location information. The user might be interested in detailed information of the type of dog or cat in the captured media and the breeder of the dog or cat with location and purchasing information. The user might be interested in a movie shown as a video trailer in a TV commercial and would like to calendar the movie and information about the movie, or would like a reminder to see the movie or a reminder to purchase tickets or an option to purchase pre-sale tickets now. Those are several examples of targets.

Virtual repository information may be associated with product or service details, product or services links or product or service codes, video data, audio data, event data, celebrity data, or entertainment information. An object or object record may be an item or item record. An object may be a marketing object or matching object or object record. An object may be a numerical timestamp, time code, or duration value. An object or matching object may be a movie or television show scene. A matching object or object may be participant, participant or user details may include an image, product details, movie details, TV show details, scene information, numerical timestamp, colors, sizes, prices, services details, entertainment or TV guide schedule information, company logos, television or streaming channels, product categories, brand and retailer information. A user may also be a participant. A user may also be a viewer. Each user account may come with user personal information or business information. One or more objects may be used to determine a matching program, user, virtual repository, other item records, and participants in a scene, movie, tv show, event or any video data, sound data, event data, or scene data for another user.

The PSP is sent to a remote computing system, which includes a matching engine. The matching engine receives and processes the PSP or the captured media of the PSP to identify one or more related or corresponding records (each a target) of a virtual repository used for a functional response. Processing of the PSP entails parsing the PSP (i.e., separating the PSP into its components) and determining types of components (e.g., captured location (LOC), time, user identification (User_ID), photograph, recorded audio, recorded video, code image, etc. . . . ). Based upon the type of components included in the PSP, the matching engine performs target identification. In the case of recorded audio, target identification may entail Automatic Content Recognition (ACR), such as sound recognition, speaker recognition, speech recognition, voice recognition, pattern recognition, biometric data, audio fingerprinting and/or embedded digital watermark detection and identification. In the case of recorded video, target identification may entail Automatic Content Recognition (ACR), such as sound recognition, voice recognition, speaker recognition, speech recognition, logo recognition, scene recognition, typing recognition, pattern recognition, text recognition, image recognition, optical character recognition, biometric recognition, facial recognition, object recognition, video fingerprinting, and/or embedded digital watermark detection and identification. In the case of a photograph, target identification may entail facial recognition, object recognition, image fingerprinting, and/or embedded code detection and identification. A code image, such as an image of a matrix code (e.g., a QR code), may be processed to determine the alphanumeric equivalent of the code. Temporal (time) information and location information may be used alone or in combination with media (e.g., a photograph or recorded audio and/or video), to identify each target.

A watermark is a signal (e.g., an audio signal that is imperceptible to humans) that is included in the audio or video of a program. By way of example, companies who track which programs are watched by users have implemented technology that allows broadcasters and other distributors to embed watermarks in the audio. If a watermark is detected, the program may be identified from a database or similar repository that relates known watermarks to programs. The watermark may not only identify the program but also provide a timing component that indicates the part of the program.

A fingerprint is a unique proxy or signature (e.g., a series of digital values, a waveform, etc.) generated from characteristics of the captured media. The fingerprint may be compared to a set of reference fingerprints corresponding to known programs. When a substantial match is found, the program and portion of the program that contains the captured media can be identified with a relatively high probability. Fingerprints and pre-determined fingerprints may be associated to matching objects. A computerized system and databases may be associated to APIs, data feeds, and client portals. Fingerprints and pre-determined fingerprints may be associated to portals, APIs, duration value, data feeds, timestamps, or a pre-defined duration value that match program duration values to determine matching objects. The computerized system may automate and synchronize programs, user repositories, entertainment databases, entertainment information, brands, retailers, APIs, data feeds, timestamps, matching objects for faster processing and outcomes. Within the current invention, all data feeds and content may be curated in real-time during any trigger. For one example, a gaming (betting) data feed can be used in the current invention to let users know which athletes or advertisements are shown or mentioned on the basketball court in real-time during live airing of the program or event and what item records are available. Curated media files, scenes, content, or data feeds may be used for example, but not limited to by a pause, move, change, start, or stop button or triggered to add, delete, or pause item records from user results. All results may be determined by curation in real-time.

The matching engine sends the user identification and target information to a Virtual Repository Matching Module (VRM). The VRM searches a database or other repository for records of associated with an identified target. A target may be a person or group of people (e.g., individuals who appeared in the captured media and/or items that are managed by a person and appeared in the captured media or services related to items or objects in the captured media). The person or group of people may appear in a broadcast or streamed show, at a live event, in public, in an image, audio or video on a webpage, in an image on a billboard, magazine page, or other tangible medium of expression. Accounts associated with the target are searched to identify records of items and/or services that relate to the target. Items may be associated to services. A user account may be associated to but not limited to an influencer, celebrity, business, organization, movie studio, TV Network, streaming service company, wardrobe supervisor, set designer, costume designer, fashion designer, and producer. A user account may use portal for outputs and inputs and communicating to the multi-directional system with timely efficiency and accuracy. (e.g. Portal for Retailers, Brands, TV Networks, Movie Studios, celebrities, and Fashion Designers to collaborate for the best outcome and profits.

A hierarchical linked list is then made accessible for display on the portable computing device or computing device for the consumer who generated the trigger. The list may include a first page that displays links to each user who has an account in the virtual repository. Such users may include acting professionals, news professionals, hosts, guests, and management (e.g., a producer) of a program. Selecting link for such a user leads to linked information for item records. Linked information for an item record or service may also appear on a list without being associated with the user or acting professional and additionally, the item record may be associated with the living room, kitchen, office or restaurant on the program for example. The item records are records of items that are in the user's virtual repository and are associated with the program, and, in particular, the portion of the program for the captured media. The items may also be linked. Selecting a link for an item may lead to additional information, including product details, for the item including purchasing information. By way of example, the link may lead to a site for purchasing the item. In some examples, through the site a consumer may purchase or bid in an auction to purchase the authentic item used in the program, which may come with a certificate of authenticity or certificate of ownership, or certificate of exclusivity, (all referred to as "certificates") such as a printed certificate, electronic certificate or a non-fungible token (NFT), i.e., a unique digital identifier that cannot be copied, substituted, or subdivided, that is recorded in a blockchain, digital wallet, and is used to certify authenticity and ownership of the user, item, and the proof of purchase associated to the program or/and professional actor wearing the item and NFT may include the inventory or/and inventory count in numerical order in which the item was purchase from the program. The NFTs or certificates may be valued like memorabilia. For example, valuing the first, second, and third item purchased from the program more valuable than the ninety-eighth, ninety-ninth, and one hundredth item purchased from the program (e.g., Product Number). The NFTs are sent to the user, owner, or/and purchaser through a digital or computerized system after the purchase of each item from the program. The NFT may include user or professional actor, brand of item, retailer selling the item, category of the item (e.g., shirt, jacket), program name (e.g., Mission Impossible, Legally Blond), product name, product purchase number, color, size, price, date, time, and current owner (user that made the purchase or user whom which the item was purchase for). Alternatively, the link may lead to a retail site through which such an item may be purchased.

Through an affiliate program, a user may earn compensation (e.g., a commission) for each item purchased through such a link. In this manner, consumers are efficiently provided links to purchase items of interest that appear in a program, while actors, production companies and others associated with a program are compensated for garnering consumer interest and facilitating sales of the items, all without any explicit marketing and without any direct communication between the consumer and user.

In one exemplary implementation, a computer-implemented method of object linking from captured media entails, on a portable computing device, creating a pack including captured media, and sending the pack to a media identification module. Through the media identification module, a first fingerprint is generated for the captured media, the first fingerprint being unique to the captured media. Fingerprint generation may, optionally, entail transforming the captured media into a transform domain. Through a remote computing system, a fingerprint database configured to relate predetermined fingerprints to a plurality of programs is accessed. A plurality of predetermined fingerprints related to each program of the plurality of programs. Through the remote computing system, a search is performed for a matching fingerprint among the predetermined fingerprints. A distance between the matching fingerprint and the first fingerprint is less than the distance between the first fingerprint and any other predetermined fingerprint of the fingerprint database. From the plurality of programs, a matching program and program scene related to the matching fingerprint is identified. Through the remote computing system, a participant database is accessed. The participant database relates participant records to programs and scenes. A search is performed for a matching participant, the matching participant being a participant record related to the matching program and scene. Through the remote computing system, a virtual repository is accessed. A TV remote control, button, and a cursor may be used to initiate the trigger, media being captured, fingerprinting, watermarks, or/and virtual repository. The virtual repository is a database that relates user records to object records and relates object records to program records. A search is performed for a matching user or matching objects. The matching user is the user record for the matching participant. Matching objects are identified and identified with or without identifying the participant or user. The matching objects are object records related to the matching user and related to the matching program. A link to each matching object is sent to the portable computing device or computing device, and may include a link to an online retailer for each matching object to the portable computing device or computing device. A non-fungible token may be associated with at least one matching object, as a certificate, which may be important if an authentic object is acquired.

An auction bidding system may be associated with at least one or more matching objects or matching item. For example, if the participant Tom Cruise was wearing a shirt on the movie Mission Impossible, and the viewer triggers the program to capture media while Cruise wears the shirt, the matching object may be associated with a bidding system so viewers may bid on the actual or original object or item worn in the program. Auction bidding may start immediately when the program airs for the first time or later. Bidding on matching objects may last or for minutes, hours, weeks, or months. The actual or original matching object worn in the program by the participant may be sent to the user who won the bid including a signed autograph by the participant Tom Cruise.

In another embodiment a watermark is embedded into the captured media. The watermark may be a sound imperceptible to humans. The sound may be modulated to encode data. Through the media identification module, the watermark may be demodulated. Then the demodulated watermark may be searched in a watermark database that relates watermarks to programs and/or scenes of programs. If the program and scene are identified using this method, then fingerprinting may be unnecessary, but may optionally be carried out for confirmation.

To solve one or more of the problems set forth above, in an exemplary implementation of the invention, a computer-implemented method of managing a virtual repository system includes providing on a computing system a plurality of virtual repositories. Each virtual repository is assigned to a user. Each virtual repository includes item records for items owned and used by the user. A first trigger is received on the computing system, which includes a programmed computer, from a first computing device of a first user. The first trigger requests information associated with at least one virtual repository of the plurality of virtual repositories. Results are sent from the computing system to the first computing device. The results including links to at least one virtual repository of the plurality of virtual repositories in response to the trigger.

The exemplary method accepts various triggers. A target trigger requests information associated with at least one virtual repository of the plurality of virtual repositories assigned to an identified user. An event trigger requests virtual repository information for one or more users appearing at a scheduled event. A location trigger requests information for one or more users at the same location (which includes the vicinity) as the location of the first user who submitted the trigger. A media trigger contains an image, object, location, video or sound recording, from which a user's identity may be determined via pattern recognition, object recognition, screen recognition, biometric recognition, time code recognition, image recognition, scene recognition, text or typing recognition, video recognition, sound recognition, voice recognition, speaker recognition, logo recognition, Icon recognition, speech recognition and face recognition. A product trigger identifies a product, or contains an image of a product (e.g., in a photo or video), and seeks links to users and/or virtual repositories that contain item records that corresponds to the product. A depicted product may be identified through object recognition. A directive trigger includes a condition, which, when satisfied, causes the computing system to send results that include responsive details and functions until the user is satisfied. In all cases, displayed results may be filtered and sorted by the user. A single trigger or the term "Trigger" may include one or more of the following triggers, but not limited to a location trigger, product trigger, media trigger, target trigger, event trigger, gaming trigger, image trigger, face trigger, video trigger, object trigger, logo trigger, scene trigger, time code trigger, touch sensor trigger (finger or cursor), biometric trigger, pattern trigger, voice trigger, speaker trigger, speech trigger, text trigger, audio trigger, beacon trigger, Bluetooth trigger, television proximity trigger, satellite trigger, cable box trigger, bounding box trigger, and a specific trigger or a combination thereof. All triggers may be associated with one or more recognition technologies. All triggers may be computer systematic or/and automated in this invention with or without human intervention. All triggers may include a bounding box. A bounding box is a geometric shape that encloses or surrounds an object or group of objects in a digital image. All overlays or transparent overlays or user interfaces may be triggered by a touch sensor, touch. All results may be sent to a user via a computing device by but not limited to push notifications, systematic notifications, email, or link, all associated with an item record.

In another aspect of an exemplary implementation of the invention a virtual repository method and system with robust item management automatically derives item data from accessed current and past transactions. The system interfaces with merchant systems to receive current and archived transaction data, scans emails for current and past transaction data, monitors browser data for online transaction data, and accepts manual input. The system establishes a communication channel with each remote disparate source. The system executes program instructions to harvest data from each local source. The system filters and collates data from all sources and stores the processed data in a virtual repository for presentation to a user in an easy to navigate GUI. Data obtained from all sources is filtered, collated, and stored in a cache for user input and approval. Approved cached entries are migrated into the virtual repository. The resulting virtual repository is an accurate reflection of the user's real-world acquisitions within a user-defined category. A management system enables scheduling and tracking use of, sharing information about and capitalizing on (e.g., selling, leasing, promoting, donating) items. Merchants may reward users for sales attributed to the user's promotion.

In one embodiment, an exemplary computer-implemented method of managing a virtual repository includes a step of a user, via a user computing device, creating a virtual repository. The virtual repository includes a virtual repository identification. A programmed system obtains, on a server, via network communication, item records from a plurality of third party sources, the item records being records of items (e.g., clothes, furniture, etc. . . . ) acquired by the user. The programmed system collates the obtained item records. At this point the records are merged into a structured form, such as a table or list. The step of the programmed system collating the obtained item records entails extracting data from the obtained item records (e.g., identifying and storing data for the fields of each item record) and merging obtained item records into a table, each item record comprising a plurality of fields. The programmed system stores the collated obtained item records in a cache (i.e., a temporary storage). The programmed system presents to the user the collated obtained item records stored in the cache. This gives the user a chance to validate (e.g., accept, reject and delete, or modify) records. The user, via the user computing device, validates the collated obtained item records stored in the cache as presented by the programmed system. Then the programmed system associates the validated collated obtained item records stored in the cache with the virtual repository. The programmed system also stores the validated collated obtained item records on a storage device, whereupon the cache may be wiped clean (i.e., all records may be deleted from the cache). Each item record may include a photograph of an item or an address (e.g., URL or pointer) to a photograph of an item. An affiliate link may be associated with any of the validated collated obtained item records. The affiliate link allows affiliate compensation for click-through purchases by other users. A software component on the user computing device (e.g., a plugin, add-on or application) searches emails for item records, and provides the item records from searched emails to the programmed system for collating with the obtained item records, for subsequent validation in the cache. Another software component on the user computing device monitors browser activity for item records, and provides the item records from browser activity to the programmed system for collating with the obtained item records, again for subsequent validation in the cache. Manually input item records may be received on the user computing device and provided (communicated via network communication) to the programmed system for collating with the obtained item records, again for subsequent validation in the cache. At least one image and/or information relating to a virtual repository may be displayed on a display device of the user computing device. The displayed image and/or information may be one or more item photos, a navigable two-dimensional graphic representation of the virtual repository, a navigable three-dimensional graphic representation of the virtual repository, item photos arranged in a continuous list from which any photo from the continuous list is displayable by user command, several levels of item photos arranged in continuous lists from which any photo from a continuous list at each displayed level is displayable by user command. Virtual repositories and/or item records marked for sharing may be viewed (accessed for viewing but not changed or resale purchasing) by other users. This allows users to browse virtual repositories and item records (e.g., images of items and information pertaining to such items) of other users. A user may record dates of use of items corresponding to item records. This facilitates management of items according to recorded use. Items may be marked for sale, rental and donation. In the cases of sale and rental, a marked item is shared with other users, who may purchase or rent the items through the system. In the case of donation, the user may select a charity to which the item may be donated.

A device such as a tablet, smartphone, computer or smart television, may display an image or a video (media) selected by a user. For example, in one implementation, the media may be an advertisement, commercial, a broadcast or streamed program, radio program, audio program, video or movie. Radio station may be a broadcast or program or audio program. An icon, link, button, and/or other similar selection mechanisms may be provided, as a trigger, to enable a user to select a scene or page, and/or to mark (e.g., with a cursor) a face of a person in the media. The selection device may be a remote control in the case of television, a paired smartphone, in the case of a smart TV, or any available input device in the case of a computer, tablet or smartphone.

A video may be a broadcast television program, a program streamed on demand or some other motion picture recording. An image or photo may be a photo taken with a user's device, or a photo accessed by a user from an accessible source (e.g., a photo obtained from the Internet) or a photo provided to the user's device by another person (e.g., a photo transmitted to the user by email or SMS).

Identifying information may facilitate identification of subjects of a video or photo. By way of example, in the case of a broadcast program, the broadcaster (e.g., ABC, CBS, NBC, FOX, etc. . . . ), locale and time of broadcast may be used to identify the program. Such information is available from broadcasters, guides (e.g., television program guides) and data aggregators such as GraceNote. The identification of all individuals or participant appearing in an identified program may also be determined from information available for the program, from such sources. Similarly, in the case of a movie, the identification of all individuals or participants appearing in an identified movie may be determined from information available for the movie, movie databases. Knowing the identity of individuals appearing in the video facilitates identification of the person of interest to the user, whether by facial or speaker recognition, or by user selection from a list of actors, actresses, performers, hosts, guests, news anchors, reporters, and the like.

In one embodiment, a database or virtual repository 170 includes temporal data for movies, television programs, and media file. Temporal data correlates time with appearing individuals and item records. Individuals are associated to item records. Temporal Data may also correlate scene information, like scene names, with appearing individuals, user, or item records in media file. Thus, all appearing individuals are associated with time values indicating when the individuals appear in the video. The time value may be relative (e.g., relative to the start of the video at 0.0 hr, 0.0 min, 0.0 sec) or, for a broadcast program, actual time (e.g., at 3:45 pm EST). In this manner, determining the time of a scene of interest to a user reveals the individuals appearing in the scene. In this manner, the list of individuals may be greatly reduced from the full cast. Such reduction facilitates identifying a person of interest.

In the case of a photo, video data, audio data, event data, metadata may include location and time data. A database API may include event data, identifying an event, attendees, performers, locations, and times. The data may also include user location data, including historical location information and times. In this manner, a user appearing in the photo, video data, audio data, event data may be readily identified with or without facial recognition.

In one embodiment, information regarding a selected scene is provided to the user. By way of example and not limitation, a database of program information may contain the names of actors, scene names, channels, product attributes, media file, or item records in each program. For a television program the time, location and channel may be used to determine the program. The time and location may be determined from a user's computing device. The tuned channel may be determined from a smart TV, smart cable box or smart satellite receiver via communication with a paired smart phone, Bluetooth, or other computing device, or by user input. A smartphone and smart tv may be synced by but not limited to a satellite provider or matching satellite providers, matching network or streaming channels, web 3, Bluetooth, mirror cast, or other software applications. All virtual repositories are associated to databases. Virtual Repository or repository may have the same meaning as a database. All item records may be stored in one or more databases. All databases may be created using virtual repositories.

In another implementation, facial recognition may be applied to all faces in a selected scene or to a selected face in a scene. A copy of the scene or a copy of the image of the selected face may be communicated from the device (e.g., tablet, smartphone, computer or smart television) to a server (e.g., server) for facial recognition processing using facial recognition software.

Thus a matching engine processes a PSP to identify the user who generated the trigger and to identify target information. Target information is identified from the media file or media (Video data, Audio data, event data, location data, time data,) and other data in the PSP. The steps used to identify the target information are dependent upon the type of information in the PSP. Upon identifying targeting information, a Virtual Repository Matching Module (VRM) obtains data from a virtual repository, generates a functional response and sends it to the user. The term "matching engine" may have the same meaning as "Temporal Data Matching Engine" and vice versa.

Using such a system and method, a user may obtain links to purchase exact matches (e.g., the exact brand and model of clothing worn by an actor in scene not a close facsimile), or links to purchase tickets to event, or links to calendar an event or show.

BRIEF DESCRIPTION OF THE DRAWINGS

The foregoing and other aspects, objects, features and advantages of the invention will become better understood with reference to the following description, appended claims, and accompanying drawings, where:

Figure 1:
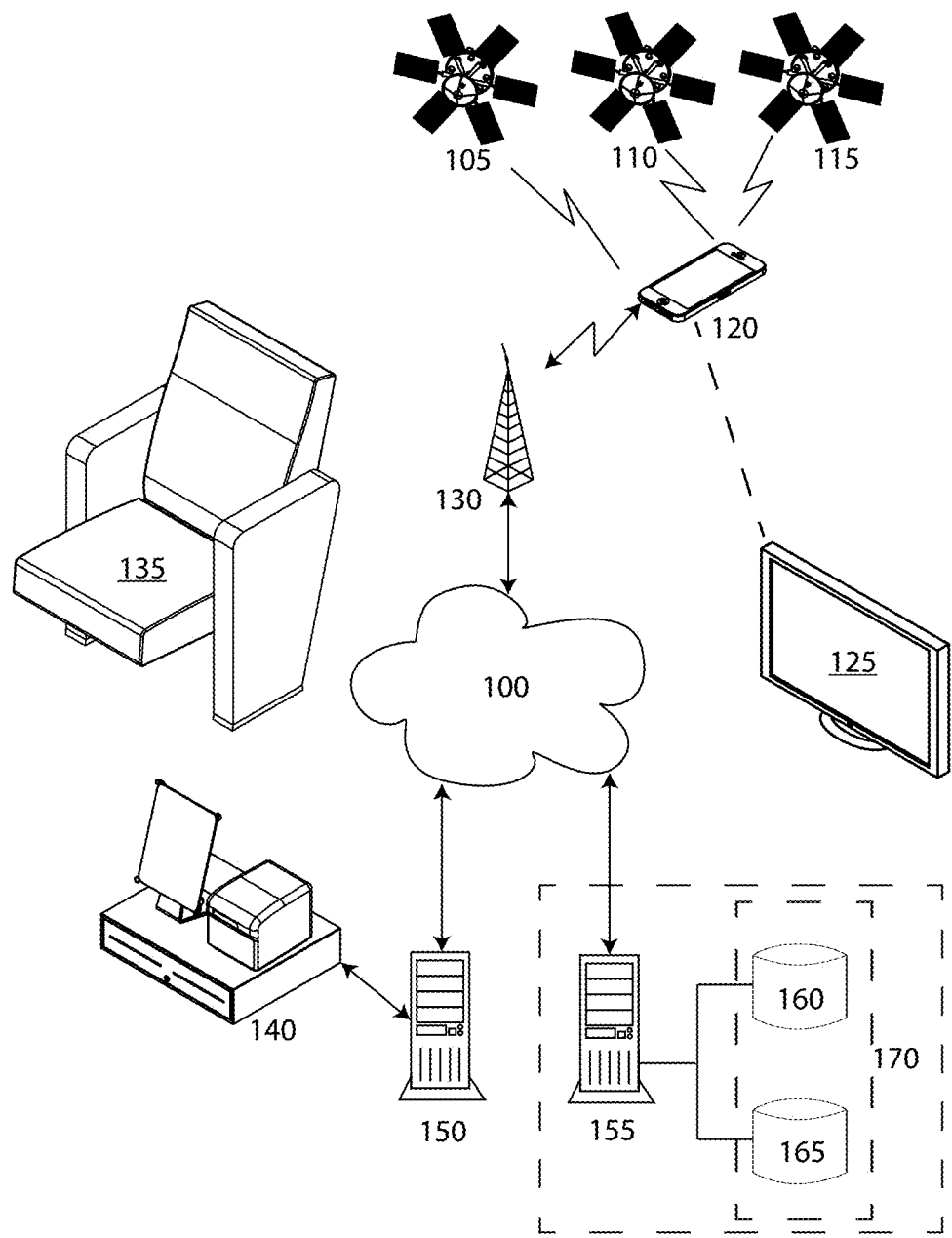
FIG. 1 is a high level block diagram of exemplary networked computing devices on which a method and system according to principles of the invention may be implemented.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

An exemplary system and method according to principles of the invention, through a media identification module (matching engine), identifies a target from captured information and provides a functional response. The information is captured using a trigger. The trigger is a function of an app on a portable computing device or any computing device. Selecting a trigger captures then current time, location data, and additional information. The additional information may be a photograph or a video or audio recording. A subject matter of interest, i.e., the target, is perceptible from the additional information. The trigger sends a user identification and captured information in the form of a percipient sample pack (PSP) to a matching engine on a remote compute system. The matching engine parses the PSP, determines the types of information contained in the PSP and applies processing according to the type of information to identify one or more possible targets. A Virtual Repository Matching Module (VRM) references one or more virtual repositories to obtain records for each target, and generate and send to the user a functional response.

A response (e.g., a reply) may be provided as a message or alert. In one embodiment, push notifications or systematic notifications are sent from a server to a user's device via the device's operating system (OS). They can include text, images, sounds, or badges and appear on the device's home screen, lock screen, or notification center. Additionally, in-app notifications may be displayed within the app while the user is actively using it. Replies may also be sent via SMS (text message) or email to users' phone number or email address. Any method of communication from a remote computing system may be employed to send responses. Systematic notifications (e.g. Push Notifications) may be driven by time code, timestamps, objects, scene information, programs, logos, or triggers.

Sequential matching engine/VRM operations provide a unique technological advancement, connecting object records (i.e., records in a virtual repository) to captured information. In the case of photograph or captured (i.e., recorded) audio and/or video, the sequential matching engine detects and demodulates any embedded watermark, fingerprints the captured audio or video for matching in a database of fingerprints, relates the fingerprint to an object record (item record, item, object) in the virtual repository. A database of fingerprints may comprise a database of fingerprints for scenes (portions) of programs or movies. Each scene may be related to participants for the scene from a database that relates participants such as actors and producers to programs and scenes of the program. Heretofore, no such automated means of connecting object records to a captured subject matter existed. The object records enable linking for useful purposes.

Program is broadly used herein to connote visual and/or audible content that can be viewed or heard from a compatible device, such as, but not limited to, a computing device, television or radio. A program may be live or recorded; broadcasted, downloaded or streamed; played from a recording medium; scripted or unscripted, with or without a teleprompter.

An exemplary virtual repository method and system with robust item management automatically derives item data from accessed current and past transactions and user input. Input may be made using typed commands, voice commands, sensible gestures, touch screen input and any other mode of supplying information to a computing device, now known or hereafter developed. The system may interface with merchant systems to receive current and archived transaction data, scan emails for current and past transaction data, monitor browser data for online transaction data, and accept manual input. The system may establish a communication channel with each remote disparate source. The system may execute program instructions to harvest data from each local source. Data obtained from all sources may be filtered, collated and stored in a cache, for user review, modification and approval, whereupon the data populates a virtual repository. The resulting virtual repository accurately reflects a user's real-world possessions, acquisitions and tools of trade within a user-defined category, which facilitates managing (e.g., using, sharing, disposing of) and capitalizing on (e.g., selling, leasing, promoting, donating) acquired items. The virtual repository is not limited to data items that a user wears or uses day to day. Rather, by way of example and not limitation, data may correspond to apparel a user has worn in a TV program, or a movie, or accessories or other items used in a scene of a TV program or movie.

Information, including but not limited to audio signals, visual signals, textual signals, and embedded codes may be generated, obtained, retrieved or communicated by or to a computing device via any suitable mode including, but not limited to, user entry, wired communication, camera (photographs and videos), microphone (audio), network communication (e.g., Wi-Fi—IEEE 802.11, Bluetooth—2.4 GHz ISM band, Zigbee—IEEE 802.15.4, Z-Wave, NFC—Near Field Communication, Cellular such as 3G, 4G and/or 5G. Using one or more of the aforementioned modes of communication, information displayed on a computing device, television, movie screen, stage, or other venue may be intercepted, captured, recorded and saved.

A user may be an individual, a business or an organization. An individual may be any person or a famous person such as a celebrity. A celebrity may be an actor, performer, athlete or person of other notoriety. A business may include a television or movie production company, or some other enterprise. In accordance with principles of the invention, at least some users are actors and/or television or movie production businesses.

An implementation of the present invention may be embodied in hardware and/or in software (including firmware, resident software, micro-code, etc.). Furthermore, the present invention may take the form of one or more computer program products on one or more computer-usable or computer-readable storage media having computer-usable or computer-readable program code embodied in the media for use by or in connection with an instruction execution system. A computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific non-limiting examples (a non-exhaustive list) of a computer-readable medium include random access memory (RAM), a read-only memory (ROM), an erasable programmable read-only memory (EPROM or Flash memory), a hard disk drive, a solid state drive, and optical discs.

Computer program code or "code" for carrying out operations (e.g., steps) according to the present invention may be written in any programming language compatible with the corresponding computing devices and operating systems. Software embodiments of the present invention do not depend on implementation with a particular programming language.

The computer program code may be provided to a processor of a general-purpose computer, special purpose computer, or other programmable computing apparatus (e.g., a phone, personal digital assistant, virtual assistant, tablet, laptop, personal computer, or computer server) as instructions, such that the instructions, which execute via the processor of the computer or other programmable data processing apparatus, create means for implementing the functions described herein. The computer code may be stored in a computer-readable memory that can direct a computer or other programmable data processing apparatus to function in a particular manner, such that the instructions stored in the computer-readable memory produce an article of manufacture including instruction means which implement the functions and perform the steps specified in the illustrations and described herein.

Referring now to FIG. 1, a high level block diagram of hardware components of a system according to principles of the invention is conceptually illustrated. Consistent with the present invention, users of the system use computing devices, such as a smartphones 120, tablets, laptop computers, personal computers, desktop computers or servers 150, communicating in a wireless or wired mode via the Internet 100. The computing devices (i.e., clients or client devices) are equipped with software for inputting and displaying information in accordance with the methodologies described herein. Such software may comprise a web browser, a client application and/or a mobile device app. Some of the computing devices 120 may be equipped with cellular wireless communication modules providing internet access via wireless cellular communication infrastructure 130. Some of the devices may be used by end users for creating and managing virtual repositories, while other devices (e.g., point of sale device 140 and server 150, 155) may be used by merchants to supply data and provide rewards or for back-end processes.

A virtual repository is an aggregation of data pertaining to items, which may be presented to a user in an easy to manage graphical user interface. The items of a virtual repository may fall within a category, such as clothing. The virtual repository may be shared by a user, allowing other users to access the virtual repository for viewing and other allowed actions (e.g., commenting and click-through purchasing). Specific items within a virtual repository may be shared, allowing other users to access data for those items for viewing and other allowed actions (e.g., commenting and click-through purchasing). A graphical user interface may present in data in lists, tables, navigable 2D or 3D models, or augmented reality displays. 2D or 3D models may be representations of scenes shown on a video associated to a virtual repository or database. A user may create a plurality of virtual repositories, assign items to one or more virtual repositories. Data may be stored in a temporary cache (temporary storage). A user may review and verify the cached data, modify or delete the cached data, and assign it to one or more virtual repositories. A system and method according to principles of the invention may also collate manual entries into the virtual repository.

Referring still to FIG. 1, one or more computers such as server 155 includes or has access to a database management system for managing data. One or more databases may contain aggregations of data records or files, pertaining to virtual repositories. A communications network interconnects the server 155, directly or indirectly through one or more additional computers, with the Internet 100. Interconnected computers communicate with each other through mechanisms such as interprocess communication, remote procedure call, distributed object interfaces, and various other program interfaces. The databases may be stored on one or more storage devices 160, 165, collectively the data storage 170. The database may be queried using various database access means such as SQL (Structured Query Language), a standard language for interacting with a database; Open Database Connectivity (ODBC), an open standard API for accessing a database; DCOM (Distributed Component Object Model), a set of Microsoft tools and program interfaces for enabling client program objects to request services from server program objects on another networked computer; Common Object Request Broker Architecture (CORBA), an architecture and specification which allows programs at different locations and developed by different vendors to interact in a network through an interface broker, or any other suitable methodology and protocol now known or hereafter developed. Illustratively, a client device 120 may execute one or more processes that interact with server 155 to supply, access and manage data stored on the data storage 170. Each request received by the server 155 may be submitted as a TCP/IP communication packet including an IP address and socket number. In response to valid requests, the server 155 may provide data from the data storage 170, without compromising the integrity of the database. In addition to a virtual repository, the data storage may contain a database of media (i.e., audio and/or video) fingerprints corresponding to content (e.g., streamed programs (e.g., TV programs), shows and movies).

Using an application on a portable computing device or computing device such as a tablet or smartphone, smart TV 120, a consumer may select a trigger. The user may direct the smartphone to a program on a television 125, or as a member of an audience in a movie theater 135 at a movie playing on a movie screen, or towards a device such as a radio playing broadcast, streamed or stored audio, or at a person appearing in public or at a performance or event, or at a code such as a 2d matrix code. The trigger may create a percipient sample pack (PSP). The PSP may include a user identification, location information, time information and captured media. Thus, the PSP may contain information and captured media. The user identification, location information, time information are PSP information. The captured media is PSP media. The captured media is recorded audio and/or video and/or a photograph of a target. The target may a television program (e.g., a show or movie, TV commercial), a streamed program, or a program from another source, such as a recording medium (e.g., a DVD), the Internet or a program delivery service that provides content by network communication, which may be displayed on television (TV) 125, or a movie played in a theater in which the user is seated 135; or audio that is broadcast, streamed or stored and played on a device; or a live event, game or performance; or some other subject matter that can be captured by media such as audio recording, video recording or photograph. The captured media may be a portion of the target, i.e., a portion of interest to the user. The user may be interested in the participants who appear in the captured media, the garments or accessories they are wearing, items they are using or other objects that appear in the captured media. A source TV may include PCM audio and a data pipeline supplying video, audio and data to the device.

Publicly accessible records in a virtual repository according to principles of the invention may be searchable by a user. A user may also search that user's own private records, and records of other users to which the user has been granted access permission. By way of example, a linear search may be performed by sequentially checking each field in a record in the database until the target value is found or the end of the database is reached. Alternatively, a binary search may repeatedly divide a search interval in half and compare a target value with a middle element of the interval. Alternatively, hashing may map keys to values using a hash function, allowing for constant-time retrieval of data. Alternatively, binary search trees may store keys in a sorted order, making searching efficient, with each node having two children (left and right), with keys smaller than the parent node on the left and keys larger than the parent node on the right. Alternatively, B-trees may maintain sorted data and allow for efficient search, insertion, and deletion operations with a balanced structure. Alternatively, a tree may store a dynamic set of strings or keys. These algorithms and others may be used to search the virtual repository.

A server 150, 155 may also implement a media identification module (matching engine), which receives and processes a percipient sample pack (PSP), determines if captured media contains a watermark and/or generates a fingerprint of the captured media. A watermark is a signal (e.g., an audio signal that is imperceptible to humans) that is included in the audio or video of a program. By way of example, companies that track which programs are watched by users have implemented technology that allows broadcasters and other distributors to embed watermarks in the audio. If a watermark is detected, the program may be identified from a database or similar repository that relates known watermarks to programs. The watermark may not only identify the program but also provide a timing component that indicates the part of the program. A fingerprint is a unique proxy or signature (e.g., a series of digital values, a waveform, etc.) generated from characteristics of the captured media. The fingerprint may be compared to a set of reference fingerprints corresponding to known programs. When a substantial match is found, the program and portion of the program that contains the captured media can be identified with a relatively high probability.

The matching engine sends the user identification and program information to a Virtual Repository Matching Module (VRM), which may be executed on a server 150, 155. The VRM searches a database 170 or other repository for records of users (e.g., individuals who appeared in the captured media and/or items that are managed by a user and appeared in the captured media) associated with the identified program, and, in particular, with the portion of the program that contains the captured media. The accounts of the identified users are then searched to identify records of items that appeared in the captured media. The VRM may search the database or repository for records of items managed by another user without being associated to a participant in the program or capture media and list those item records. The VRM may also search the database or repository for records of items managed by another user and the participants in the entire program associated to item records and listing or displaying the item inventory and participants shown throughout the entire program.

A hierarchical linked list is then made accessible for display on the portable computing device or computing device 120 of the consumer who selected the trigger. The list may include a first page that displays links to each user who has an account in the virtual repository. Such users may include acting professionals, news professionals, hosts, guests, and management (e.g., a producer) of a program. Selecting link for such a user leads to linked information for item records. The item records are records of items that are in the user's virtual repository and are associated with the program, and, in particular, the portion of the program for the captured media. The items may also be linked. Selecting a link for an item may lead to additional information for the item including purchasing information. By way of example, the link may lead to a site for purchasing the item. In some examples, through the site a consumer may purchase or bid in an auction to purchase the authentic item used in the program, which may come with a certificate such as a printed certificate, electronic certificate or a non-fungible token (NFT), i.e., a unique digital identifier that cannot be copied, substituted, or subdivided, that is recorded in a blockchain, and is used to certify authenticity and ownership. Alternatively, the link may lead to a retail site through which such an item may be purchased.

The location of a user may be relevant to the target. Certain programs are broadcast in certain markets at certain times. In certain embodiments of a system and methodology according to the principles of the invention, a user's location may be specified. Location may be user input or automatically determined using GPS data, IP trace or triangulation information. Some of the computing devices may be equipped with Global Positioning System ("GPS") receivers for receiving signals from GPS satellites 105-115 to determine location of the device.

Certain clients 120 may not have access to a GPS service (for example, they may lack hardware necessary to support such a service or they may be within a structure that blocks GPS signals); consequently, such GPS information may not be available for all clients 120. Also, certain GPS services do not operate or do not operate reliably in certain locations, such as indoors or other enclosed spaces. Thus, even if a user 120 does have the necessary hardware and software to support a GPS service, occasionally GPS information from the GPS service may not be available to a particular user 120.

IP trace information may include the public IP address of the user 120 and the set of IP addresses that data packets sent from the user 120 pass through to reach server 150. The public IP address of the user 120 may be determined by gathering the source IP address from the server socket receiving the user 120 connection. The list of hops through which the data packets sent from the user 120 go through may be determined by sending adaptive TTL (time to live) UDP packets to server 150 from the user 120. In order to determine if the user 120 is being an IP proxy, server 150 may correlate the list of hops with the public IP address of the user 120. In this way, server 150 may effectively discover the real public IP address of the user 120. The real public IP address of the user 120 is then matched against a database of Internet Service Providers (ISPs) which returns the probable address of the originating user 120 message. This probable address of the originating user 120 message may then be translated to a set of longitude and latitude coordinates.

Triangulation information for a user 120 may include a list of public Wi-Fi access points surrounding the user 120 as well as the signal strength of each Wi-Fi access point accessible by the user 120. The list of surrounding Wi-Fi access points, and their signal strength, may be formatted and correlated with a database of public Wi-Fi access points by server 150 to determine a probable set of longitude and latitude coordinates for the user 120. The database of public Wi-Fi access points employed by server 150 may be updated over time to reflect new information about available Wi-Fi access points.

The invention is not dependent upon location information. Certain implementations of the invention may not take location into consideration. In implementations that take location into consideration, certain types of location data may be more accurate or reliable than others. GPS information is more accurate and indicative of the correct physical location of a user 120; however, as explained above, GPS information for a particular user 120 may not always be available. Triangulation information, while not as accurate and reliable in identifying the correct physical location of a user 120 as GPS information, is more accurate and reliable than IP trace information. However, triangulation information also may not always be available, e.g., the user 120 may not be able to detect any nearby recognizable Wi-Fi access points. Additionally, while IP trace information is less accurate than either GPS information or triangulation information in determining the correct location of a user 120, it is always obtainable if the user 120 can communicate to server 150 over the Internet.

The term "service provider" is used herein to mean any entity that provides a service using a system or methodology according to principles of the invention. The service provider may be, for example, an online service provider with a web-accessible system that receives, sends, stores and processes data and instructions for managing and sharing a virtual repository according to principles of the invention. The terms "consumer" or "client" is used herein to mean any individual or entity that uses the service provider's services to manage and share a virtual repository, whether for free or in exchange for compensation. The term "user" or "end user" is used herein to mean any individual or entity that uses the system for managing and sharing a virtual repository according to principles of the invention. In many cases, a user is a consumer. However, in some cases, a consumer may have an assistant or agent use the system on the consumer's behalf. A merchant is a commercial party (e.g., a vendor of goods or services, a credit card processor or another service provider), who may access the system for performing such actions as supplying data and rewarding consumers. A merchant may also be a consumer, client, and end user. Likewise, a consumer, client, and end user may also be a merchant.

Using the computing device 120 and client software ("client") such as a browser or app, a user may create, manage and share a virtual repository according to principles of the invention.

Figure 2:
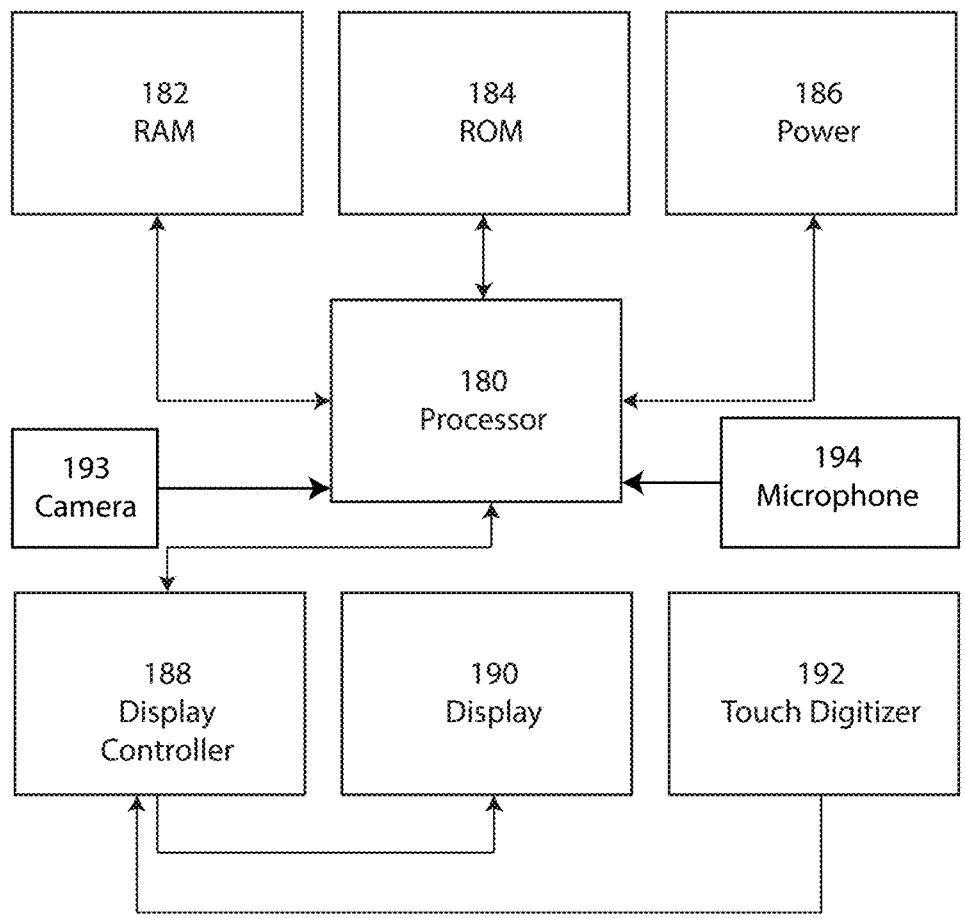
FIG. 2 is a high level block diagram of exemplary components of an exemplary portable computing device or computing device which may be used to implement and use a method and system according to principles of the invention.

Each exemplary computing device for use in accordance with principles of the invention includes a processor, memory, power supply, display, storage and user input device. Other components include a communication bus, and network communication components, such as cellular, WiFi and LAN. By way of example, and not limitation, with reference to FIG. 2, a mobile device such as a smartphone 120 may include one or more processing units (CPU's) 180, memory such as RAM 1825 and ROM 184, and a power supply 186. Additionally, the device 120 may include a display controller 188, a display 190 and a touch digitizer 192. Furthermore, the device 120 includes a camera 193 and/or a microphone 194 for capturing (recording) media (audio or video). These may comprise merely a few of the components of the mobile device 120. Various components may be implemented in hardware, software, or a combination of both hardware and software, including one or more signal processing and/or application specific integrated circuits.

The touch digitizer 192 comprises a touchscreen, an electronic visual display that the user can control through simple or multi-touch gestures by touching the screen with a special stylus/pen and-or one or more fingers. The touchscreen enables the user to interact directly with what is displayed, rather than using a mouse, touchpad, or any other intermediate device (other than a stylus, which is optional for most modern touchscreens). The touch digitizer 192 further comprises a transparent overlay covering the visual display. The overlay senses the touch of one or more fingers or a stylus. In response to a touch, the overlay produces a change in electrical properties (e.g., a change in current, voltage, capacitance or resistance). The touch digitizer interprets the commands that the changed electrical properties represent and communicates the commands to the appropriate applications. The touch digitizer 192 further comprises a display controller that receives and/or sends electrical signals from and to the visual display and overlay. Visual output may include graphics, text, icons, video, and any combination thereof (collectively termed "graphics"). In some embodiments, some or all of the visual output may correspond to user-interface objects. The display controller (along with any associated modules and/or sets of instructions in memory) detect contact (and any movement or breaking of the contact) on the overlay and converts the detected contact into interaction with user-interface objects (e.g., one or more soft keys, icons, web pages or images) that are displayed on touch-sensitive display. In an exemplary embodiment, a point of contact between touch digitizer 192 and the user corresponds to a finger of the user. The visual display may comprise LCD (liquid crystal display) technology, LPD (light emitting polymer display) technology, or LED (light emitting diode) technology, although other display technologies may be used in other embodiments. The overlay and display controller of the touch digitizer 192 may detect contact and any movement or breaking thereof, including speed (magnitude), velocity (magnitude and direction), and/or an acceleration (a change in magnitude and/or direction) of the point of contact, using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display. These operations may be applied to single contacts (e.g., one finger contacts) or to multiple simultaneous contacts (e.g., "multitouch"/multiple finger contacts). Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

A system and method according to principles of the invention use a virtual repository populated with data. With reference to FIGS. 3-9, steps of using a virtual repository to populate it with data and access data are conceptually illustrated. A user may start an application (i.e., software application) on a computing device, as in step 200. The application provides access to functions, including administrative functions 205, functions for creating a new virtual repository as in step 210, functions for selecting an existing virtual repository as in step 215, functions for browsing the user's and/or other users' shared virtual repositories as in step 220, and functions for searching for other users' shared virtual repositories as in step 225. A user may select a function.

Figure 4:
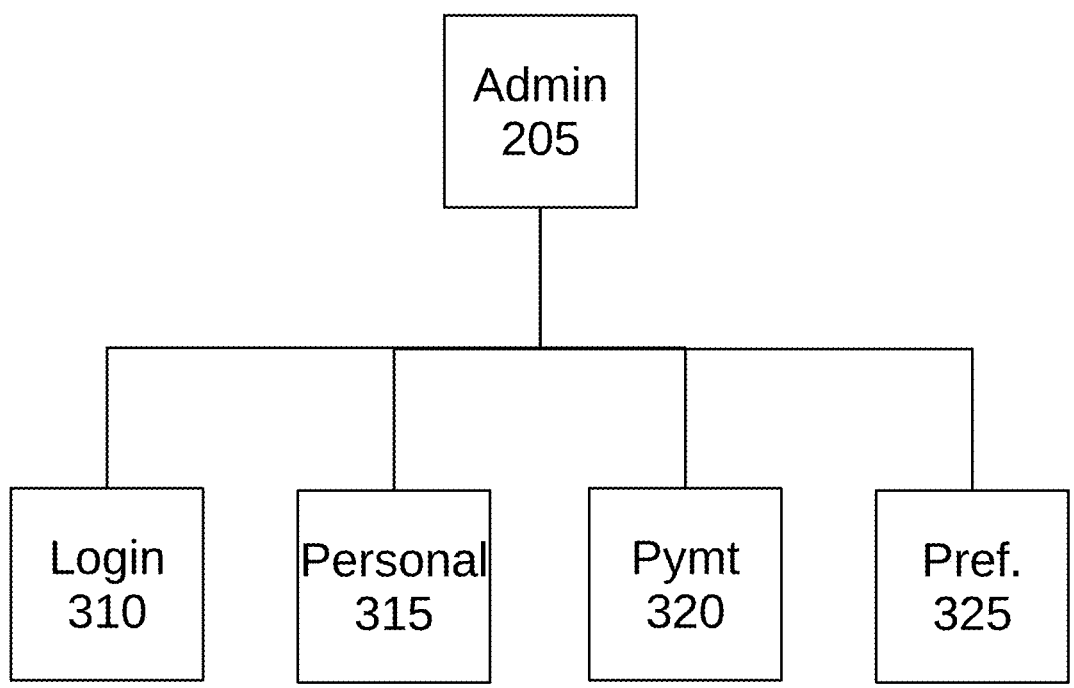
FIG. 4 is a high level flow chart of exemplary user administration steps for a method and system according to principles of the invention.

With reference to FIG. 4, administration functions 205 include functions for setting information and preferences for a user. A user may establish a login, which may include a user name and password, as in step 310. For multifactor authentication, a user may also provide a smartphone number and/or email address. A user may input personal information, such as name, address, screen name, telephone number, email address, information regarding the user's profession, a photograph of the user, and links to other information about the user, as in step 315. A user may input payment information for any commercial transactions performed using the system, as is step 320. The information may include card information, a billing address, and a default shipping address. The user may also specify preferences, including security preferences related to privacy of the user's virtual repositories, display settings, notification settings, and sound settings. Notification settings are another form of user directives.

Figure 5:
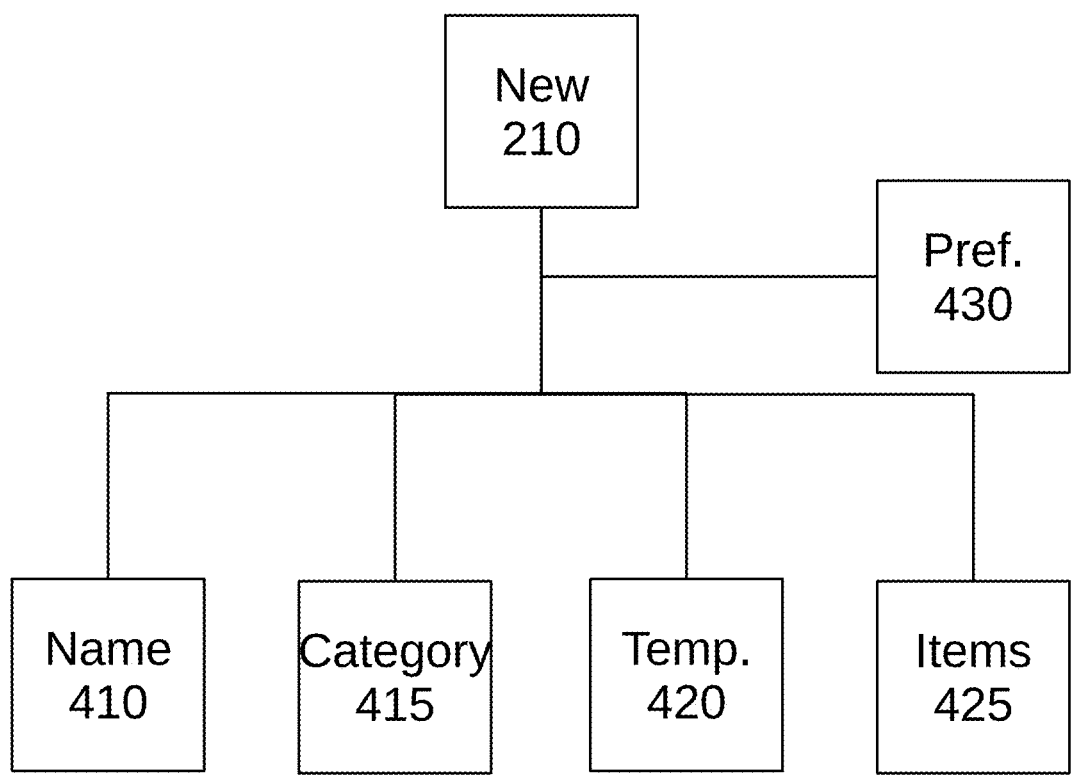
FIG. 5 is a high level flow chart of exemplary steps for creating a new virtual repository for a method and system according to principles of the invention.

FIG. 5 is a high level flow chart of exemplary steps for creating a new virtual repository for a method and system according to principles of the invention, as in step 210. A user may assign a name for the new virtual repository, as in step 410. A user may assign a category for the new virtual repository, as in step 415. A user may select a template for the presentation (display) of the virtual repository, as in step 420. Available templates may, by way of example, include a list, side-to-side scrolling presentations, top-to-bottom scrolling presentations, navigable 3D models of a space such as a closet, and even augmented reality displays of the user's actual closet. The scrolling presentations may include multiple levels (as discussed below), allowing a user to separately scroll through various subcategories of items within a virtual repository. By way of example, a three level scrolling display may allow a user to separately scroll through the user's shirts, pants and shoes. As another example, an augmented reality presentation may allow a user to walk through a closet while aiming a smartphone at the items in the closet, and receive information about each item on the display. A user may setup more than one template, for the user to select from when using the application. Item records are created in step 425. Item records may include, inter alia, item images, a description, and other information, such as an event, program or movie in which the item was used. The user may manage preferences for the virtual repository in step 430.

Figure 6:
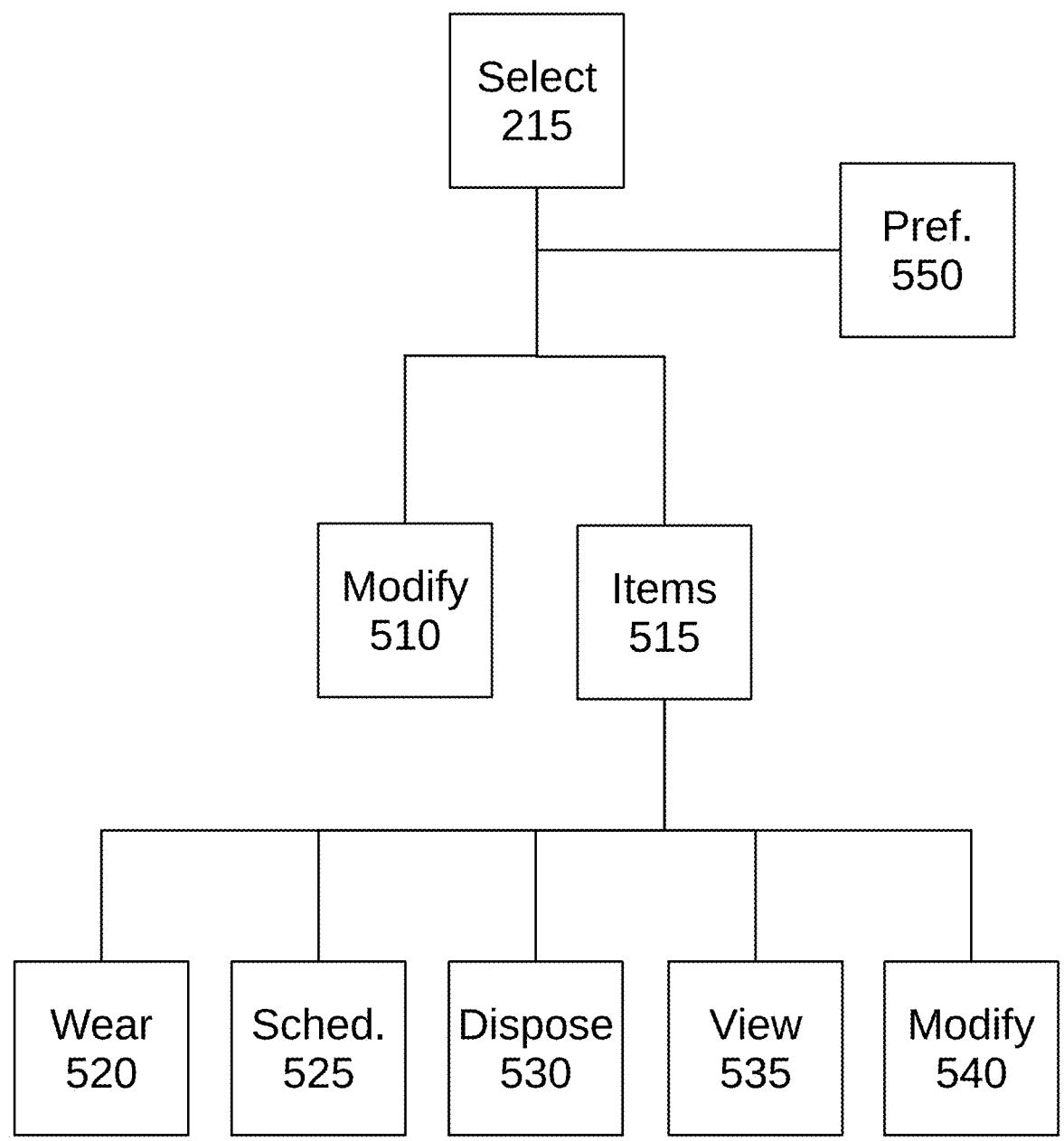
FIG. 6 is a high level flow chart of exemplary steps for managing items in a virtual repository for a method and system according to principles of the invention.

FIG. 6 is a high level flow chart of exemplary steps for managing a virtual repository for a method and system according to principles of the invention, as in step 215. Upon selecting a previously created virtual repository, the user may manage (e.g., review and edit) preferences as in step 550, modify the virtual repository's name or category as in step 510 or select or modify items, as in step 515. In the case of clothing items, an item may be selected for wearing, as in step 520. Alternatively, an item may be scheduled for wearing on a scheduled date and time, or during a specific event, such as an appearance, TV show or movie, as in step 525. An item may be disposed of (e.g., sold, discarded, donated or given away) as in step 530. An item may be viewed, as in step 535. Viewing an item may display information about the item, including use-related information. Selection for wearing and scheduling may be modified in step 540.

If a user enters into the system information about wearing (or otherwise using) each item, then the system may present a history and/or frequency of use. A system and method according to principles of the invention may save all entered dates of use, as in step 520. For example, a user may enter each date on which the user wore a particular garment. From such dates, the system may determine the last time an item was used and a frequency of use. Date of use data may alert a user to unused, infrequently use and frequently used items. A system according to principles of the invention may notify a user of items that the user did not use in a determined number of days (e.g., 100, 180 or 365 days). Knowing specific dates of use may also help a user determine if the same item should be used (e.g., worn) again. For example, a user may want to avoid wearing the same suit on a follow-up job interview, or the same dress at an upcoming event or party that will be attended by some folks who attended a previous party.

An item may be modified (i.e., stored information pertaining to the product may be modified) as in step 540. Modification may include adding comments about comfort, fit, and accessories. For example, a user may note that a garment fits loosely or tightly, or is best worn with a particular accessory. Some such notes may be accessible only by the user, and other notes may be shared with other users.

A system and method according to principles of the invention may incentivize users to input use dates for an item. Such use may be input by simply selecting the item and selecting a current use button or by selecting the item and providing a verbal command, or by entering a date. As described above, a user's location may be tracked through a device, such as a smartphone. Inputting use dates helps a user track which items are used and when, which, as discussed above, is beneficial. Additionally, use information may lead to rewards. Shared items are visible to other users. A worn item may be a shared item. A worn item also means the item is or was in-use by a user. Other users may search for an item worn by a user at an event, or on a certain date and time, and/or at a specific location, or during a movie, or TV show or public appearance. Upon finding the item, such other users may click through the item to purchase it from a merchant. Through an affiliate program, the merchant may reward the user who shared the item. Such reward may be a payment to an account of the user. To maximize such payments, users will want to regularly input use dates, share items and wear items well.

Disposing of an item, as in step 530, may entail selling, renting, donating, gifting or discarding an item, and thereupon removing the item from the virtual repository, or, in the case of renting, marking the item as unavailable during the rental term. These functions enable a user to capitalize on items.

For example, using the information about an item in the virtual repository, a selling price or auction bidding terms, and one or more current photographs of the item, the item may be marked for sale. Upon being marked for sale, the item is shared and may be searched and viewed by all other users of the system. Such other users may purchase or, in the case of an auction, bid on purchasing the item.

Similarly, a user may mark an item for donation, which may present a list of willing charitable organizations in the vicinity of the user who would be glad to receive the item. The user may select an organization from the list. A record of each completed donation may be generated for tax deduction purposes.

An item may be marked for renting. For example, a user may own a ball or bridal gown, tuxedo, a costume, skiing apparel, a wetsuit, or some other expensive and infrequently used item. The user may be receptive to renting the item to other users. By marking an item for rental, that item is searchable by all other users of the system. Such other users may rent the item.

By providing the sale, donation and rental functions, a system according to principles of the invention facilitates capitalizing on items. Items that a user does not use, or infrequently uses, may be sold, rented or donated. In each case, the user receives a benefit. In the case of sales or rentals, the user receives monetary compensation. In the case of donation, a tax reduction may be earned. In each case, the user gains the knowledge that an item has not gone to waste, but rather is put into good use.

While other systems for selling, leasing and donating items may exist, none is tied to an existing virtual repository. By tying the such systems to a virtual repository, a system and method in accordance with principles of the invention facilitates identifying unused or infrequently used items, and also facilitates posting such items for sale or rental, or donating such items to a worthy charity.

Figure 7:
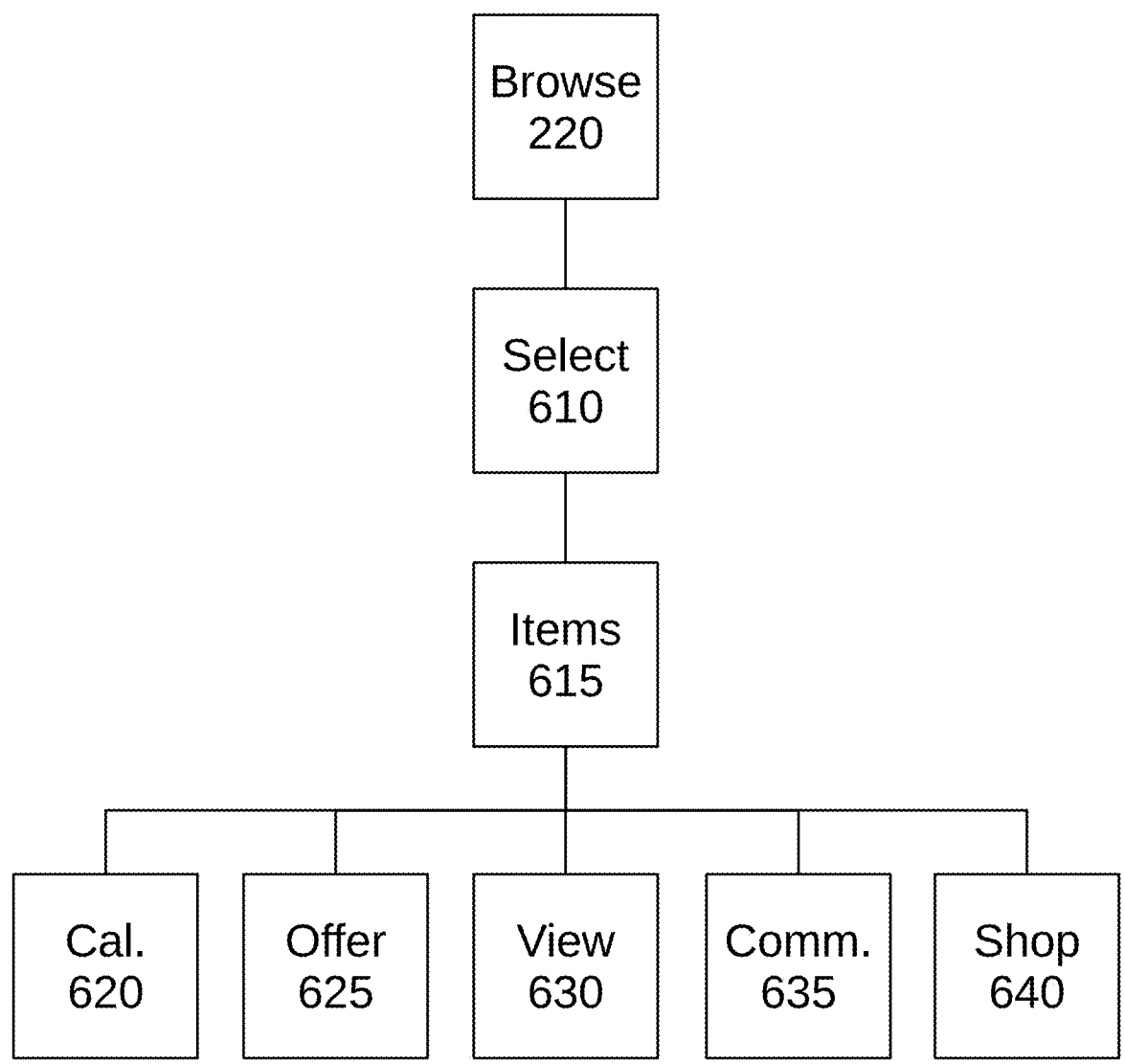
FIG. 7 is a high level flow chart of exemplary steps for performing actions relating to items in a virtual repository for a method and system according to principles of the invention.

FIG. 7 provides a high level flow chart of exemplary steps for performing actions relating to items in a virtual repository for a method and system according to principles of the invention. In particular a user may browse items in the user's virtual repositories, as in step 220. A user may select a virtual repository from a list of the user's virtual repositories, as in step 610. A user then may view and select an item in the virtual repository, as in step 615. The user may calendar the item, as in step 620. By calendaring the item, the user indicates a date on which the user intends to use (e.g., wear) the item. A user my offer to sell or rent the item, as in step 625. The terms of the sale or rental may be set by the user, within determined parameters of the system. The use may view the items, as in step 630. A photograph of each item may be stored as item data, as described above. The photograph may be user supplied or obtained from a vendor's online posting for the product. A user may enter comments about an item, as in step 635. For example, a user may describe the comfort, fit or feel of an item, or describe an event at which the item was used (e.g., worn), or enter other information (e.g., an endorsement) relating to the product. A user may locate the item in a retail establishment, as in step 640. By locating the item in an online or brick and mortar retailer, the user may shop for other similar or matching items and accessories.

The flow chart of FIG. 7 also applies to browsing shared virtual repositories and items of other users. A list of virtual repositories may be generated by a search from a search engine or from a directory. A user may search for a particular user's virtual repository, a celebrity's virtual repository, a virtual repository that contains certain items. A user may navigate through categories and subcategories of a directory to generate a list of repositories. Filters may be provided to narrow the list. A user may select a repository as in step 610. A list of shared items in the repository is presented, as in step 615. A user may select shared calendar information for a selected item, as in step 620. Such information reveals when the user used (e.g., wore) the item. A user may offer to purchase the item an item from such a list, as in step 610. A user may simply view the item, as in step 630. A user may enter comments about the shared item, as in step 635. A user may shop for the selected item, as in step 640. Purchase of the selected item may lead to a reward (e.g., compensation) for the user who shared the item.

Filtering extracts specific subsets of data from a larger dataset based on certain criteria or conditions to focus on relevant information, remove noise, and streamline analysis. Filtering entails determining criteria by which the data will be filtered. This could include numerical conditions (e.g., values greater than a certain threshold), text-based criteria (e.g., specific keywords), temporal conditions (e.g., within a certain time range), or any other relevant parameters. The dataset or data source for filtering is the data set presented to a user. SQL queries may be used to filter data based on conditions specified in a WHERE clause. Filter functions may be used to hide rows or columns of a dataset based on specified criteria.

An affiliate program may track click-throughs to merchant sites and enable payment of commissions to a user who shared the item and from which the purchase originated. To enable affiliate compensation, an affiliate link may be associated with each shared item. The affiliate link carries information that identifies the source of the click-through so commissions can be accurately payable. In one embodiment when an affiliate link is clicked, a cookie is deposited on the user's computing device. When a user completes a sale on the merchant's site, the merchant checks to see whether their cookie is present on the user's computing device. If it is, the merchant can access information from the cookie about the user that shared the item and generated the sale lead, and can then attribute the sales commission to that sharing user. Merchants can set the commission structure and cookie lifetime via the affiliate network. For instance, a merchant may decide to assign a cookie lifetime of 60 days, which means any sale made on the merchant's site by a user within 60 days of the user first visiting the merchant's site via the sharing user's repository, is commission-generating for the sharing user.

Figure 8:
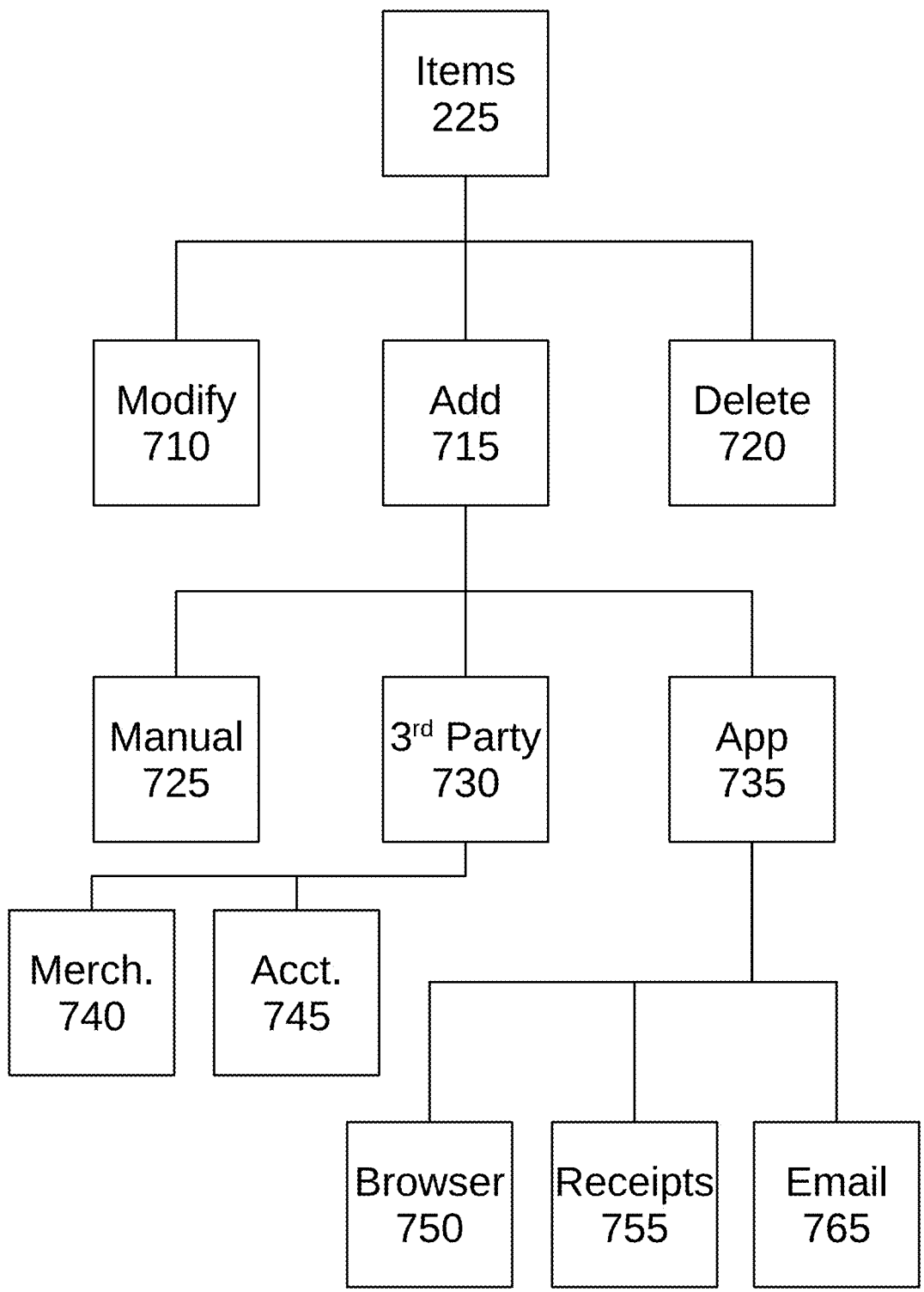
FIG. 8 is a high level flow chart of exemplary steps for adding items in a virtual repository for a method and system according to principles of the invention.

FIG. 8 is a high level flow chart of exemplary steps for modifying, adding and deleting items (step 225) in a virtual repository for a method and system according to principles of the invention. Selected items may be modified as in step 710. Modification may include editing entered content and photographs. Selected items may be deleted as in step 720. Items may be deleted automatically if sold or donated using the system. Items may also be deleted manually at any time by the user who owns the virtual repository.

Items may be added manually, by user input, as in step 725. Manual addition may entail typed user input, uploaded files, email, scanned documents, optical character recognition of documents, and verbal commands.

Items may be added from third party sources, as in step 730. Third party sources may include purchase histories from accounts accessible online. Such accounts may include online retailer and marketplace accounts (e.g., online Walmart, Amazon and Macy's accounts). Another third party source may be merchants' point of sale system data. Participating merchants may communicate purchase data for participating users to the system via an application programming interface. The purchase data may be pushed by a merchant from point of sale transactions by the user. Alternatively, purchase data may be pulled by a user from a merchant's point of sale system, via an application programming interface. Even purchase data for purchases at most brick and mortar establishments are stored on merchant servers connected to their point of sale systems.

Items may be added via applications (e.g., plugins, portal, and add-ons) that monitor a user's browser activity and emails for purchase data, as in step 735. A browser plugin may track online purchasing activity, as in step 750. Online purchases are detected via the website and user selections, including online shopping cart activity. Emails, as in step 765, may provide order confirmations, many of which may contain a hyperlink to an account on a remote server where details of the transaction are provided. Accessing a remote account may require a login (e.g., user name and password), which the user can supply to the system. Emails may also provide detailed receipts, as in step 755. Receipts may also be uploaded by a user for processing. Such processing may entail optical character recognition and determining purchase data.

Data from sources other than manual entry may be stored in a cache or temporary storage until verified by a user. The cached data may be displayed to a user in a list comprised of records (rows) and fields (columns). Thus, a system and method according to principles of the invention merges (i.e., collates) data extracted for various sources, including remote (e.g., merchant systems) and local sources (e.g., mined emails) into a cached list for possible addition to a virtual repository. The user may verify each record for entry into the virtual repository. Data for a record may be modified by a user before verification. Records may be deleted by a user. For example, a user may determine that a record does not belong in the virtual repository, such as if the purchase is a gift for a friend.

Figure 9:
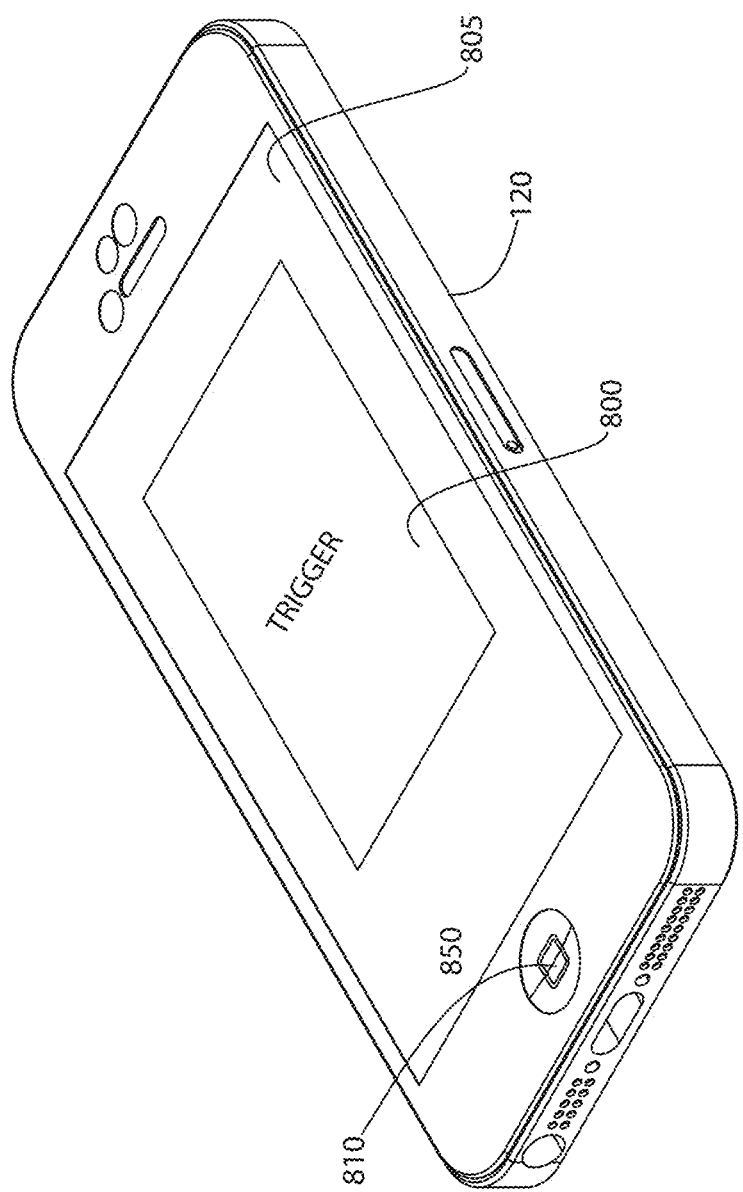
FIG. 9 conceptually illustrates an exemplary user device on which a trigger control is displayed according to principles of the invention may be used.

FIG. 9 conceptually illustrates an exemplary user device 120 on which a method and system according to principles of the invention may be used. The exemplary device includes a touchscreen 805 and a microphone 810. A camera may also be provided, with one or more lenses on the opposite side of the device. A graphical user interface 850 may be presented on a touchscreen 805. The user interface may present a trigger control 800, such as the shown rectangle. Touching the rectangle may activate the trigger operation. The trigger operation initiates the method described below with reference to FIG. 10.

Thus, a virtual repository may be populated with records corresponding to objects used at events, by people, on shows, in movies, in public, or in other settings. Users of the virtual repository enter data for the objects. The users may be individuals or entities that use or own the objects, or agents or contractors of them. By entering the data, users facilitate sharing, publicity, sales and affiliate program rewards.

Searching and navigating through publicly accessible records of a virtual repository is possible. However, using the matching engine described herein, the invention enables and facilitates automatically matching an observed (perceived) object with a record in the virtual repository for an exact match. The object may have been perceived in public, at an event, at a concert in a broadcast or streamed show, in a movie or elsewhere.

Figure 10:
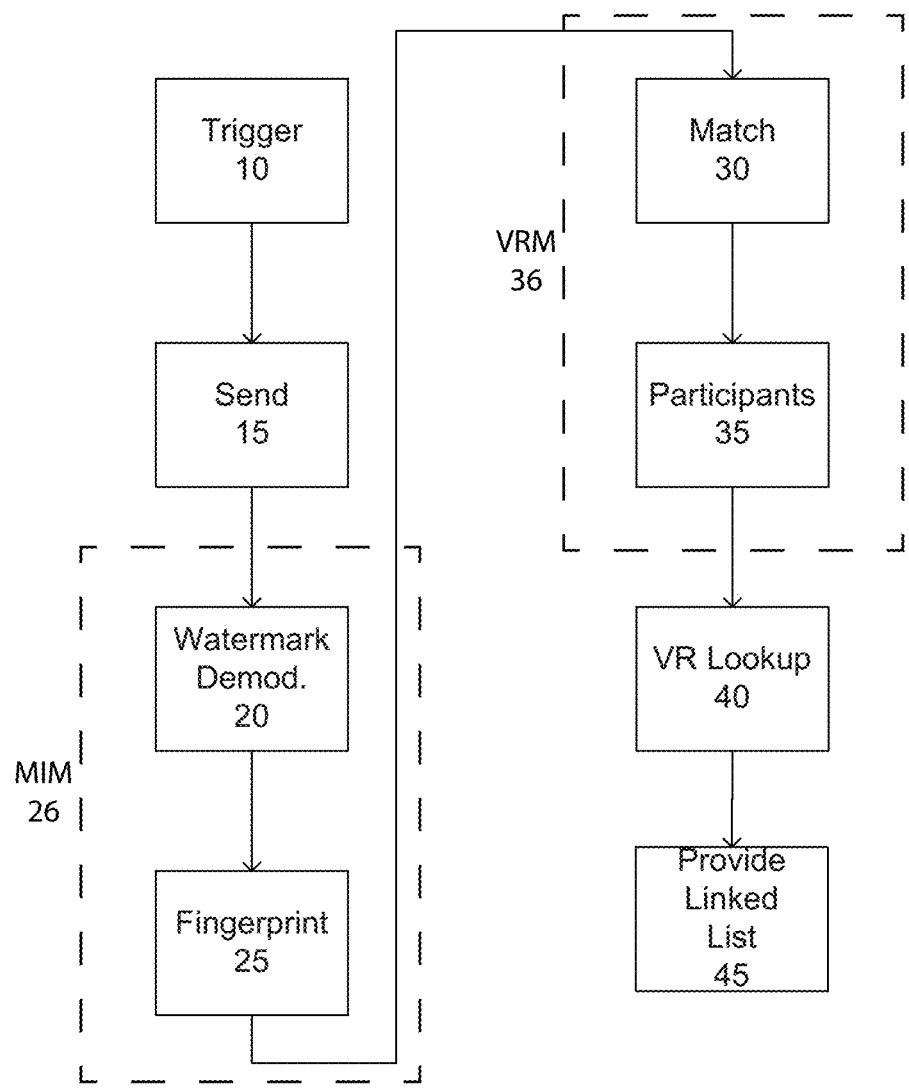
FIG. 10 conceptually illustrates components and steps of an exemplary method of media capture, fingerprinting and matching according to principles of the invention may be used.

With the virtual repository created and populated with data, including records corresponding to objects used in programs, such as TV shows, movies, events and the like, the virtual repository may be queried for such records. Referring to FIG. 10, using an application on a portable computing device or computing device 120, such as a smartphone, smart tv, a consumer selects a trigger, as in step 10. The trigger creates a percipient sample pack (PSP). The PSP may include a user identification, location information, time information and captured media (i.e., recorded audio and/or video). The application may be configured to capture audio or video, or the application may allow a user to select whether to capture audio or video. Thus, the PSP contains information and captured media. The user identification, location information, time information are PSP information. The captured media is PSP media. The captured media is recorded audio and/or video of a target. The target is a television program (e.g., a show or movie), a streamed program, or a program from another source, such as a recording medium (e.g., a DVD), the Internet or a program delivery service that provides content by network communication. The captured media is a portion of the target, i.e., a portion of interest to the user. The user may be interested in the participants who appear in the captured media, the garments or accessories they are wearing, items they are using or other objects that appear in the captured media. Captured audio may be preferred, as it does not require a clear line of sight to the display, is not lighting sensitive and consumes considerably less storage space and bandwidth than an equivalent duration of captured video.

In step 15, the smartphone application sends the PSP to a remote computing system 155, which includes a media identification module (matching engine) 26, comprised of one or more computer programs. The matching engine 26 receives and processes the PSP or the captured media of the PSP to determine if the captured media contains a watermark and/or to generate a fingerprint of the captured media.

When captured media is comprised of captured video, the media may be cropped to eliminate elements that are not part of the broadcast or streamed video of interest. By way of example, the frame or bezel of a television screen may be cropped out of (i.e., removed from) the captured video. Thus, fingerprinting will take into account only the recorded segment of the video of interest. This invention is not limited to a particular cropping methodology. In one nonlimiting example, regions of interest are detected. These may be regions that contain moving objects and/or pixel color changes. Such movement and changes may be determined by comparing contiguous frames. The cropped area may encompass a cluster of regions of interest, including moving object regions and color change regions. If cropping is employed for captured video recorded with a trigger, then similar cropping may be performed to video segments comprising a reference fingerprint database.

A watermark is a signal (e.g., an audio signal that is imperceptible to humans) that is included in the audio or video of a program. By way of example, companies who track which programs are watched by users have implemented technology that allows broadcasters and other distributors to embed watermarks in the audio. Live broadcast and streamed content may include a watermark to track content distribution from its origin to its final destination. This may be accomplished through the insertion of a unique content identification code at a distribution center. The content identification code may be a second-by-second serial number used to uniquely identify delivered content. The code may be transmitted by modulating one or more carrier wave signals to encode digital information. The carrier wave signals may comprise sounds, inaudible to humans. Demodulating the appropriate frequency range of captured sounds provides the code. If a watermark is detected, it is demodulated to extract the modulated information, as in step 20. The program (i.e., show, movie, TV commercial, or event) may be identified from a database or similar repository that relates known watermarks to programs. The database may be stored locally 170 or accessed remotely via network communication. The watermark may not only identify the program but also provide a timing component that indicates the part of the program.

A database of program (e.g., show, movie and event) fingerprints may be stored locally 170. The database relates fingerprints to programs. A program may have a plurality of fingerprints, each fingerprint corresponding to a segment of the program. The method used to generate each fingerprint in the fingerprint database is also used to generate a fingerprint for the captured media in the PSP, as in step 25. The fingerprint for the captured media in the PSP may then be compared with fingerprints in the fingerprint database to find a match, as in step 30. The match reveals the program and the portion of the program that corresponds to the fingerprint.

A fingerprint is a unique proxy or signature (e.g., a series of digital values, a waveform, etc.) generated from characteristics of the captured media. The fingerprint may be compared to a set of reference fingerprints corresponding to known programs. When a substantial match is found, the program and portion of the program that contains the captured media can be identified with a relatively high probability.

The invention is not limited to a specific fingerprint methodology. Any fingerprint methodology that efficiently generates a unique fingerprint for each captured media and for segments of each program in the database may be utilized. In one exemplary implementation the fingerprint is comprised of information (e.g., a sequence of vectors) that efficiently and accurately describe the captured media. A searching engine then compares the generated fingerprint to those in a repository of reference fingerprints, for matching, such as by using a distance metric. The closest reference fingerprint may be the match.

As used herein, searching and matching for fingerprints entails similarity searching where, given a query object, objects that are "similar" are returned from a database. Matching is not limited to exact matching. Generally, a distance function may be used to measure dissimilarity. Objects that are not dissimilar by more than a range threshold, or, are least dissimilar to the query, are then sought. The distance function measures the dissimilarity between objects. Thus, retrieving an object that is more similar is equivalent to retrieving an object that has a lesser distance.

An exemplary fingerprinting method and engine, as in step 25, converts an audio signal into a sequence of relevant features. In a first step, preprocessing, captured audio is digitized if necessary and converted to a specific format. Next, in framing, the signal is divided into frames of a determined size. The number of frames computed per second is the frame rate. Next, a linear transformation is applied to transform the set of frames to a new set of features, preferably one that reduces redundancy. By way of example and not limitation, Fast Fourier Transform (FFT), Discrete Cosine Transform (DCT), Haar Transform or Walsh-Hadamard Transform may be applied. Next, feature extraction is performed to reduce dimensionality and increase invariance to distortions. By way of example, with knowledge of the transduction stages of the human auditory system, more perceptually meaningful parameters may be extracted through a critical-band analysis of the spectrum. Mel-Frequency Cepstrum Coefficients (MFCC) may be used. A Spectral Flatness Measure (SFM), which estimates tone-like or noise-like quality for a band in the spectrum, may be used. Band representative vectors, an ordered list of indexes of bands with prominent tones (i.e. with peaks with significant amplitude), may be used. Energy of each band may be used. Other approaches from music information retrieval, which include features that have proved valid for comparing sounds: harmonicity, bandwidth, loudness, zero crossing rates, may also be used. These and other methods of characterizing the transformed content may be utilized. To better characterize temporal variations, high order time derivatives may be added to a signal model. A low resolution quantization may also be applied to the features to gain robustness against distortions, normalize, ease hardware implementations, reduce the memory requirements and for convenience in subsequent parts of the system. The result of these initial steps is sequence of feature vectors calculated on a frame by frame basis. Next, the fingerprint is modeled, such as by summarizing the multidimensional vector sequences in a single vector. By way of example and not limitation, 16 filtered energies may correspond to 30 seconds of audio ending up with a signature of 512 bits. The signature along with information on the original audio format is sent to a server for identification. Illustratively, a vector may include the average zero crossing rate, the estimated beats per minute (BPM), an average spectrum and some more features to represent a piece of audio. This approach is computationally efficient and produces a very compact fingerprint. Fingerprints can also be sequences (traces, trajectories) of features. Assuming that features of a given audio item are similar, a compact representation may be generated by clustering feature vectors. The sequence of vectors is thus approximated by a much lower number of representative code vectors, e.g., a map or table.

Video fingerprinting entails capturing video, transforming the input video data into a transform domain (e.g. Radon transform, Fourier Mellin Transform) that is invariant under geometric operations before extracting robust features from the domain. First, the input video is temporally downsampled to a reference frame rate. One or more frames are downsampled to reference spatial resolution. A sub-image is cropped out from down sampled images. A low-pass filtering operation is performed on the frame to improve robustness of extracted features.

Video fingerprinting provides a small number of pertinent features from video clips, called fingerprints, and to identify a video query by measuring the distance between a query fingerprint and fingerprints in a database. Feature extraction for video fingerprinting may entail extracting global features and/or local features. Global features mean that the fingerprints come from the whole video frame. A color histogram may be used to represent each individual frame in a captured video. A Centroid of Gradient Orientation (CGO) may be calculated for each block, and then an M-dimensional vector of the centroids may be used as a fingerprint for a video frame. Global features may be extracted from spatial domain, and/or the transform domain. For example a multi-dimensional compact Fourier-Mellin transform (CFMT) signature may be extracted for each keyframe, and matrix may be formed as a final fingerprint for the keyframes. In contrast to considering global features, local features focus on the local structure of video frame. Local features can cope with rescaling, cropping, adding logos and picture-in-picture, etc.

As one example, a Harris interest point detector may be used to extract interest points in each keyframe, and a differential feature of the local region around each interest point may then be used as the fingerprint. Extracting features not only spatially but also over time makes the fingerprints more discriminative as well as better localized. Illustratively, a spatial-temporal interest points detector may detect interest points. Local fingerprints are extracted by computing a contrast context histogram in local regions around each interest point which is to evaluate the intensity differences between the center pixel and the other pixels.

As one example, an input video clip may be converted to grayscale and resized to fixed width and height values. Then, local regions are detected in the resized video clip using a spatio-temporal interest point detector. Then, the input video clip is resampled at a fixed frame rate. Then, a local region is selected in each down-sampled frame according to the characteristic strength and scale of the interest point, and then a contrast content histogram is calculated in each selected local region. After normalizing each contrast content histogram to a set of unit vector, the unit vectors may be used as local fingerprints to represent the input video clip. During a video trigger, a television may be detected using image recognition technology. Once detected, the technology may crop the television edges and begin recording the video within the cropped edges of the television and create a Percipient Sample Pack (PSP), captured media, to send to the Media Information Module (matching engine) and then the Virtual Repository Matching Module (VRM). A fingerprint or a watermark may also be created or digitized by the detection of color patterns, Item patterns, shadows, brightness, contrast, speed of changes, speed of scene changes, speed of camera changes, wavelengths, frequencies, distance between the participants or objects all from the captured media or program from a video trigger and/or captured media by the user. Fingerprint and watermarks can be created or digitized using a combination from one or more detections from the video recording or captured media.

The matching engine sends the user identification and program information to a Virtual Repository Matching Module (VRM), where a video or audio fingerprint is then made available for searching in step 30. By way of example, video fingerprinting may relate to faces, objects, text, a scene, and a code, as contained in the media information. Audio fingerprinting may relate to speech, voices, and combined sounds, such as but not limited to music or sounds of a scene (e.g., sounds of a busy train station) as contained in the media information. The objective is to search the fingerprint database to find a match, a match between the fingerprint for the captured media and a fingerprint stored in the database for a segment or portion of a program. Any searching technique suitable for comparing or determining a distance metric between the fingerprint and a large number of reference fingerprints may be used. Distances may be computed between the feature sequence extracted from the captured audio and reference audio fingerprints stored in a repository using a distance or scoring metric. The most likely reference in the database (virtual repository(ies)) is selected. In some cases, the system may detect more than one match or reference sent over in the Percipient Sample Pack (PSP) and list them for the user on their portable computer device or computing device. The user will then select the program they are watching at the current moment to see the users, items, and/or services associated to the captured media. To efficiently complete comparisons of the fingerprint for a captured audio against possibly millions of fingerprints one or more techniques may be applied to identify the most likely reference audio fingerprints. For example, an index of certain pieces of a fingerprint may be used to generate a list of candidate reference audio fingerprints, which may then be efficiently exhaustively searched. Heuristics similar to those used in computational biology for the comparison of DNA may be used to speed up a search in the system where the fingerprints are sequences of symbols or values.

After a program and a segment of the program is identified, another database is searched to determine participants (e.g., actors, hosts, guests, producers) or item records, particularly those associated with the captured portion, as in step 35. The participant and/or item database, which may be stored locally 170 or accessed remotely, relates participants to programs and to scenes. After the participants are identified, the virtual repository may be queried.

In step 40, the VRM searches a database or other repository for records of participants, i.e., virtual repository users (e.g., individuals or items that appeared in the captured media and others associated with the captured media) associated with the identified program, and, in particular, with the portion of the program that contains the captured media. The user accounts of the identified users are then searched to identify shared records of items that appeared in the captured media. Thus, for example, records for an actor's attire worn in the scene, or for an accessory or object used in the scene and identified in a production company's virtual repository, may be identified.

In step 45, a hierarchical linked list is then made accessible for display on the portable computing device or computing device of the consumer who selected the trigger. The list may include a first page that displays links to each participant-user who has an account in the virtual repository. Such users may include acting professionals, news professionals, hosts, guests, and management (e.g., a producer) of a program for which the media was captured. Selecting link for such a user leads to linked information for item records associated with scene corresponding to the captured media. The item records are records of items that are in the user's virtual repository and are associated with the program, and, in particular, the portion of the program for the captured media. The items may also be linked. Selecting a link for an item may lead to additional information for the item including purchasing information. By way of example, the link may lead to a site for purchasing the item. In some examples, through the site a consumer may purchase or bid in an auction to purchase the authentic item used in the program, which may come with a certificate such as a printed certificate, electronic certificate or a non-fungible token (NFT), i.e., a unique digital identifier that cannot be copied, substituted, or subdivided, that is recorded in a blockchain, and is used to certify authenticity and ownership. Alternatively, the link may lead to a retail site through which such an item may be purchased. Thus, the trigger leads to items of interest used in the scene for which the trigger was activated. The items or services on the scene or captured media of the program from the second user's virtual repository is activated when the first user's computer device is triggered and activated. The items and services from the second user's virtual repository will then be sent to the first user's computer device and listed and displayed for product detail information including a purchasing and action bidding option.

Through an affiliate program, a user may earn compensation (e.g., a commission) for each item purchased through such a link. In this manner, consumers are efficiently provided links to purchase items of interest that appear in a program, while actors, production companies and others associated with a program are compensated for garnering consumer interest and facilitating sales of the items, all without any explicit marketing and without any direct communication between the consumer and user.

In sum, in one exemplary implementation, a computer-implemented method of object linking from captured media entails, on a portable computing device or computing device, creating a pack including captured media, and sending the pack to a media identification module. Through the media identification module, a first fingerprint is generated for the captured media, the first fingerprint being unique to the captured media. Fingerprint generation may, optionally, entail transforming the captured media into a transform domain. Through a remote computing system, a fingerprint database configured to relate predetermined fingerprints to a plurality of programs is accessed. A plurality of predetermined fingerprints relates to each program of the plurality of programs. Through the remote computing system, a search is performed for a matching fingerprint among the predetermined fingerprints. A distance between the matching fingerprint and the first fingerprint is less than the distance between the first fingerprint and any other predetermined fingerprint of the fingerprint database. From the plurality of programs, a matching program and program scene related to the matching fingerprint is identified. Through the remote computing system, a participant and product database are accessed. The participant and product database relates participant and item records to programs and scenes. A search is performed for a matching participant, the matching participant being a participant record related to the matching program and scene. Through the remote computing system, a virtual repository is accessed. The virtual repository is a database that relates user records to object records and relates object records to program records. A search is performed for a matching user. The matching user is the user record for the matching participant. Matching objects are identified. The matching objects are object records related to the matching user and related to the matching program. A link to each matching object is sent to the portable computing device or computing device, and may include a link to an online retailer for each matching object to the portable computing device or computing device. A non-fungible token may be associated with at least one matching object, as a certificate, which may be important if an authentic object is acquired.

In another embodiment a watermark is embedded into the captured media. The watermark may be a sound imperceptible to humans. The sound may be modulated to encode data. Through the media identification module, the watermark may be demodulated. Then the demodulated watermark may be searched in a watermark database that relates watermarks to programs and/or scenes of programs. If the program and scene are identified using this method, then fingerprinting may be unnecessary, but may optionally be carried out for confirmation.

The invention improves the functioning of a computer by providing means to automatically connect trigger information, including captured media, with object records for objects that may then be the subject of further transactions. This is an improvement in the computing and content delivery (e.g., broadcasting, streaming, movie theater) fields that did not heretofore exist. The invention is achieved by implementing sequential matching engine/VRM operations to connect object records to captured media. The sequential matching engine/VRM detects and demodulates any embedded watermark, fingerprints the captured audio or video for matching in a database of fingerprints for scenes (portions) of programs, identifies participants for the scene from a database that relates participants such as actors and producers to programs and scenes of the program, and identifies object records associated with the program or scene from the participants' virtual repository accounts. The selection of a trigger control captures media (audio and/or video), as part of a PSP, which effects a transformation, namely the identification of object records, from the PSP, for further transactions. Heretofore, no such automated means of connecting object records to a scene associated with the captured media existed. The object records enable linking for useful purposes.

Figure 11:
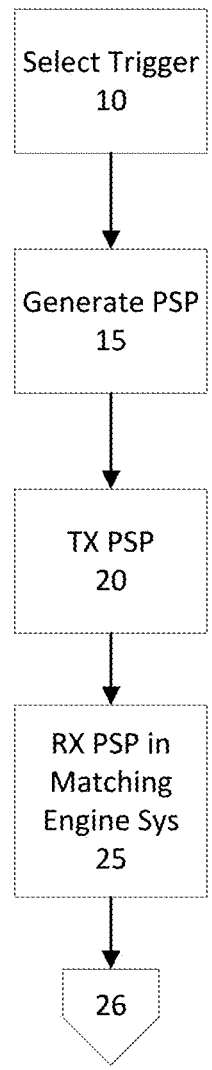
FIGS. 11-13 conceptually illustrate steps of an exemplary method according to principles of the invention.
Figure 12:
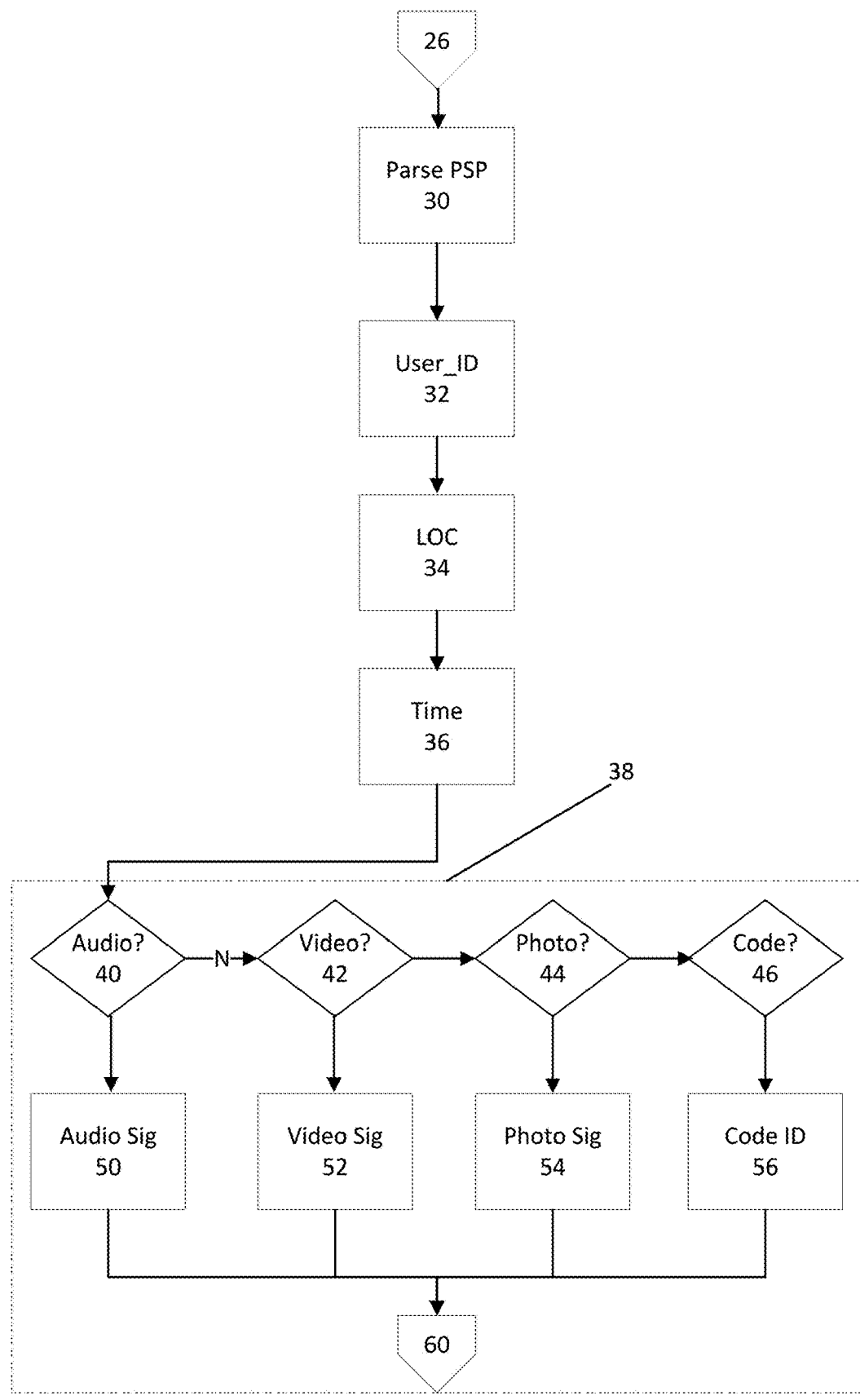
Figure 13:
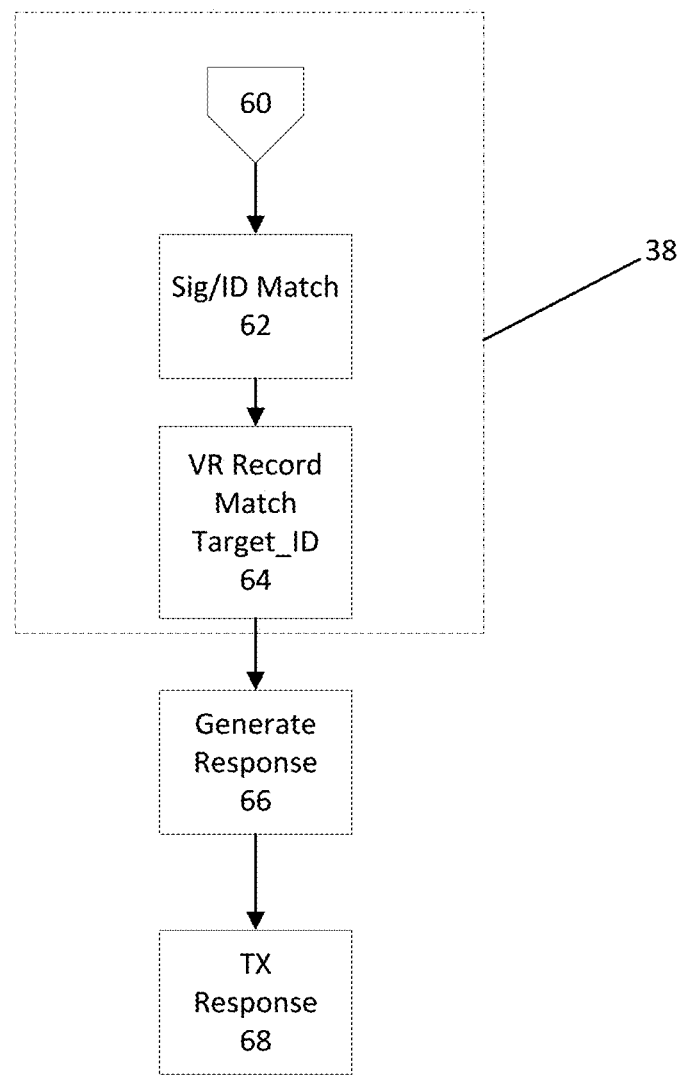

Referring now to FIGS. 11-13, an exemplary system and method according to principles of the invention, through a matching engine 38, identifies a target from a PSP, including captured information and provides a functional response 66. The PSP is generated 15 upon activating a trigger 10. The trigger 10 is a function of an app on a portable computing device or computing device. Selecting a trigger captures (records) then current time 36, location data 34, and additional information. The additional information includes a media recording, such as a sound recording, a video recording, a photo, and/or an image of a code, such as a matrix code. A subject matter of interest, i.e., the target, may be perceptible from the additional information. The trigger sends a user identification and captured information in the form of a percipient sample pack (PSP) to a remote compute system 20. A matching engine on the remote computing system receives the sent PSP 25. Off-page reference 26 in FIG. 11 links to 26 in FIG. 12 where control continues. The remote computing system parses the PSP 30. A user identification (User_ID) is determined 32 for the user that activated the trigger or the user associated with the device from which the trigger was activated. The User_ID is part of the PSP. Location information (LOC) is determined 34. Location may be determined using any location methodology including those described above.

A functional response 66 may include calendaring information for an event. The calendaring information 66 may be pushed, texted (SMS) or emailed to the recipient. The information may be added to a calendar using adding steps. For example, in Outlook a rule may be created to add all emails from a source or having a particular subject to a calendar. In gmail, a filter may be created to forward all emails from a particular source or having a particular subject to a URL associated with a Google calendar. An app may include a control for adding an event to calendar associated with app. For example, a user may supply the user's unique Google calendar URL to the app, which will then allow calendar events to be added to the calendar. Alternatively, a user may supply the user's email address. Then events may be added by email the details, which will then be processed according to the filter or rule.

In another implementation, a link to an iCalendar (.ics) file containing event details (such as event title, date, time, location, etc.) may be emailed to the user. The iCalendar file may be saved on a web server. Upon selecting the link, the recipient's email client interprets it as a request to download an iCalendar file. Depending on the email client's capabilities and the user's preferences, several things can happen. Some email clients may prompt the user to confirm if they want to download and add the event to their calendar. Others may automatically download the .ics file and prompt the user to open it with their default calendar application. More advanced email clients may directly integrate with the user's calendar service (like Google Calendar or Outlook) and add the event without any further action required from the user.

Once the iCalendar file is processed, the event details are added to the user's calendar, typically with an option to review or modify them before finalizing.

A computing device may determine time using an internal clock, i.e., a system clock or real-time clock, which is typically driven by a quartz crystal oscillator that generates electrical signals at a precise frequency. Other time sources include Network Time Protocol (NTP), a protocol used to synchronize the clocks of computers over a network by periodically querying NTP servers, which provide accurate time information based on reference sources such as atomic clocks; Global Positioning System (GPS) receivers to obtain accurate time information from GPS satellite signals; and Radio Time Signals which are time signals broadcast by radio stations, often based on atomic clocks; and user input.

Time, time information, time stamp, time code, and time data, as used herein includes a timestamp, which is data that indicates the date and time at which a particular event occurred and may be represented in a standardized format, such as Unix time (the number of seconds elapsed since Jan. 1, 1970, UTC), ISO 8601 (a standardized date and time format), or in a custom format specific to the application or system; and also includes time codes represented as a sequence of numbers or characters that encode hours, minutes, seconds, and frames, the format of which can vary depending on the standard or system being used, such as SMPTE time code (Society of Motion Picture and Television Engineers), MIDI time code (Musical Instrument Digital Interface), and LTC (Longitudinal Time Code).

Time data may be used to determine a program, scene, event, movie, location of an individual user, or other time related occurrence. The determined subject matter may then be correlated to one or more records of the virtual repository for a response.

Time is determined 36. The time is the time at which the trigger was activated. The time may be determined from a system clock on the computing device on which the trigger was activated. Additionally or alternatively, time may be determined from another source, such as, but not limited to GPS signals. Each Global Positioning System (GPS) satellite contains multiple atomic clocks that contribute very precise time data to GPS signals. GPS receivers decode these signals, effectively synchronizing each receiver to the atomic clocks. This enables very precise timing.

In the matching engine 38 on the remote computing system, the type of media file(s) is determined in steps 40-46. Such a determination may be made by file extension and/or playback. The media file is then processed to produce a fingerprint or signature (collectively a "signature") in steps 50-56. The signature may be determined using any fingerprinting or signature methodology including those described above. Control continues at off-page reference 60 in FIG. 13.

In the case of a matrix code, such as a QR code or a similar 2D barcode, a captured image may be processed to enhance its quality and readability by adjusting brightness, contrast, sharpness, and color balance to improve the clarity of the matrix code. The processed image is then scanned to detect the presence of a matrix code. This involves locating the code within the image and identifying its boundaries. Once the matrix code is detected, the encoded information contained within the code is decoded. Decoding involves analyzing the pattern of black and white modules (or squares) within the code to extract the encoded data. If a matrix code is damaged or partially obscured, leading to errors in decoding, error correction, such as Reed-Solomon error correction, may be employed to reconstruct the original data even if some parts of the code are unreadable. Then, the decoded information is interpreted to determine a Code ID.

A code may be visible or invisible. By way of example, invisible matrix codes (e.g., invisible QR codes) are designed to blend seamlessly into an existing display. The code is encoded using variations in color, shading, or patterns, making it visually indistinguishable from the surrounding elements. Instead of a solid white background, invisible matrix codes often use a transparent background, allowing the underlying design to show through. This helps maintain the aesthetic integrity of the display while hiding the matrix code in plain sight. To read an invisible matrix code, an image processing algorithm detects and decodes the matrix codes hidden within complex visual patterns.

One or more QR codes may be combined for one unified QR code. Each QR Code may correspond to items, services, events related to content (Ad, Movie, TV show). The code may be correlated with virtual repository records, facilitating responses including data from such records and links to products and/or services relating thereto.

A watermark is another type of code. A watermark is a signal (e.g., an audio signal that is imperceptible to humans) that is included in the audio or video of a program. If a watermark is detected, the program may be identified from a database or similar repository that relates known watermarks to programs. The watermark may not only identify the program but also provide a timing component that indicates the part of the program.

Generating a fingerprint or signature of a photograph involves creating a unique identifier or summary of the image that can be used for various purposes such as image matching, authentication, or indexing. The image is preprocessed to enhance certain features or remove noise. Preprocessing steps may include resizing the image to a standard size, converting it to grayscale, applying filters for noise reduction, and enhancing contrast. Next, distinctive features are extracted from the preprocessed image. These features capture the essence of the image while being robust to variations such as changes in lighting, scale, rotation, and noise. Several techniques can be used for feature extraction, including Interest Point Detection in which key points or regions are identified in the image that are likely to be distinctive, such as corners, edges, or blobs. Another technique is Descriptor Extraction in which descriptors are computed for detected interest points to characterize their appearance. Descriptors encode information about the local neighborhood of each point, typically through histograms of image gradients or other features. Common descriptors include SIFT descriptors, SURF descriptors, and ORB descriptors. Extracted features are combined into a compact representation that serves as the fingerprint or signature of the photograph. This step aims to create a unique identifier that captures the essential characteristics of the image while being invariant to certain transformations. The fingerprint may be a hash value computed from the extracted features, a compact descriptor derived from feature vectors, or a combination of both.

If a photograph or video frame includes a face, facial recognition may be applied to determine a person's identity from the digital image or video frames. The presence and location of faces within an image of a photograph or frame are detected by scanning the image and identify regions likely to contain faces using Haar cascades, convolutional neural networks (CNNs), and/or histogram of oriented gradients (HOG). Once faces are detected, they are aligned to a standardized pose or orientation to help reduce variations due to factors like head tilt, rotation, and scale. Alignment involves transforming the detected face regions to a canonical form, such as frontal view or upright position using landmark detection, affine transformations, and/or geometric normalization. After alignment, features are extracted from the face regions to create a compact representation that captures distinctive characteristics. Features may include various aspects of facial geometry, texture, and appearance such as Local Binary Patterns (LBP) which describe texture patterns in localized regions of the face, Histogram of Oriented Gradients (HOG) which represents local gradient orientations in the face image, Eigenfaces which uses principal component analysis (PCA) to extract eigenvalues representing facial features and/or Deep Learning which applies convolutional neural networks (CNNs) to learn hierarchical features from raw pixel data. Once features are extracted, they are encoded into a compact representation suitable for comparison. This step may apply normalization and dimensionality reduction techniques to enhance robustness and efficiency using vector quantization, hashing, and/or feature aggregation.

If a photograph or video frame includes an object, particularly a unique object (i.e., unique within the frame, and/or unique among all objects), object recognition may be applied to identify the object from the digital image or video frames. The presence and location of object within an image of a photograph or frame are detected by scanning the image and identify regions likely to contain objects using Haar cascades, convolutional neural networks (CNNs), and/or histogram of oriented gradients (HOG). Once objects are detected, they are aligned to a standardized orientation to help reduce variations due to factors like tilt, rotation, and scale. Alignment involves transforming the detected object regions to a canonical form, such as frontal view or upright position using landmark detection, affine transformations, and/or geometric normalization. After alignment, features are extracted from the object regions to create a compact representation that captures distinctive characteristics. Features may include various aspects of object geometry, texture, and appearance such as Local Binary Patterns (LBP) which describe texture patterns in localized regions of the object, Histogram of Oriented Gradients (HOG) which represents local gradient orientations in the object image, Eigenobjects which uses principal component analysis (PCA) to extract eigenvalues representing object features and/or Deep Learning which applies convolutional neural networks (CNNs) to learn hierarchical features from raw pixel data. Once features are extracted, they are encoded into a compact representation suitable for comparison. This step may apply normalization and dimensionality reduction techniques to enhance robustness and efficiency using vector quantization, hashing, and/or feature aggregation.

If a photograph or video frame includes a scene, scene recognition may be applied to identify the scene from the digital image or video frames. Scene recognition entails receipt of visual input in the form of a photograph or one or more frames of a video. This input consists of patterns of light and color. Relevant features are extracted from the visual input. These features may include edges, colors, textures, shapes, and spatial arrangements of objects within the scene. Algorithms for feature extraction, such as edge detection, corner detection, or feature descriptors like SIFT (Scale-Invariant Feature Transform) or SURF (Speeded Up Robust Features) may be applied. Once the features are extracted, the system compares them with patterns stored in memory or learned from previous experiences. Pattern recognition algorithms, such as deep learning neural networks, support vector machines (SVM), or decision trees may be applied for pattern recognition. Contextual cues may be used to interpret the visual input correctly. Contextual cues may include the spatial relationships between objects, the overall layout of the scene, and the semantic meaning of objects within the scene. For example, seeing a bed, a nightstand, and a lamp arranged in a particular way might suggest a bedroom scene. Contextual understanding helps disambiguate similar-looking scenes and improves the accuracy of recognition. In addition to bottom-up processing (analyzing the visual input), scene recognition also involves top-down processing. Top-down processing focuses on relevant parts of the scene, filters out irrelevant information, and uses prior information to interpret ambiguous, distorted or incomplete visual input. Based on the extracted features, pattern recognition results, and contextual understanding, the system makes a decision regarding the identity or category of the scene, a deliberate computational process. The system may learn from feedback to improve scene recognition abilities over time. Feedback is used to update the model parameters and improve performance through techniques like supervised learning, reinforcement learning, or unsupervised learning.

If an image contains text, text recognition may be performed. Text recognition, also known as optical character recognition (OCR), entails converting images from photographs, video frames or other captured displays containing printed or handwritten text into machine-readable text. Text may appear in advertisements, as subtitles, as closed captioning, on objects in an image, and in other ways. Determining the text facilitates identifying the image and its context. An image containing the text to be recognized is acquired. The acquired image undergoes preprocessing to enhance its quality and improve the accuracy of the recognition process. Preprocessing entails noise reduction, i.e., removing unwanted artifacts or distortions from the image; image binarization, i.e., Converting the image to binary format (black and white) to separate text from the background; deskewing, i.e., correcting any skew or rotation present in the image; and contrast enhancement, i.e., adjusting the contrast to improve the visibility of text. The system then identifies regions of the image that contain text by analyzing the image to locate areas with characteristic features of text, such as edges, contours, or color contrast using edge detection, connected component analysis, or deep learning-based object detection. After text regions are detected, the image may be segmented to isolate individual characters or words, separating the text regions into smaller units to facilitate recognition and improve accuracy. Feature extraction analyzes segmented text regions to extract relevant features that can be used for recognition, such as shape, size, orientation, stroke width, and texture of individual characters or components. Extracted features are then used to classify and recognize the characters present in the text regions by comparing the extracted features with predefined templates or models representing different characters. Machine learning techniques, such as neural networks, hidden Markov models (HMMs), or support vector machines (SVMs), may be used for character recognition. After character recognition, the recognized characters undergo postprocessing to improve the accuracy of the results. Postprocessing techniques may include error correction, spell checking, language modeling, and context-based analysis to refine the recognized text and correct any mistakes or inconsistencies. Output of the text recognition process is machine-readable text in the form of a digital document or text file.

In matching 64, extracted and encoded data, signatures, fingerprints, and/or features are compared against a database of known sources or enrolled templates. Various similarity metrics, such as Euclidean distance, cosine similarity, or chi-square distance, may be used to measure the similarity. A match is determined based on the closest match or a predefined threshold. The outcome of this step is a match with a stored value, id or other subject matter that is related to one or more records in the virtual repository.

A response is then generated 66. The response is transmitted 68 to the computing device of the user who activated the trigger. The response may be a functional response, which includes a link, pictogram, calendar object or one or more other user-actuatable objects.

Computer calendaring allows users to view, create, edit, and manage their schedules. Calendaring software stores schedule information in a structured format, typically in a database or file system. This data includes details such as event titles, dates, times, locations, descriptions, and any associated reminders or alerts. Users can create new events or appointments by entering relevant information into the calendaring software. This information may be entered manually through a user interface or imported from other sources, such as emails, contacts, external calendars or responses as described herein. The invention may work with most calendaring software and services. The calendaring software handles date and time management, allowing specification start and end dates and times of events, as well as recurring patterns such as daily, weekly, monthly, or yearly occurrences. The calendaring software provides notifications and reminders to alert users about upcoming events, appointments, or deadlines. These notifications can be delivered through various channels, including pop-up alerts, emails, SMS messages, or mobile app notifications. In one embodiment, a response includes a calendar object which includes data for calendaring, e.g., an event file, which includes structured data representing various attributes of an event, such as the event title, date and time, location, description, attendees, and any associated reminders or alerts. An event file may be in iCalendar (.ics) format, in vCalendar (.vcs) format, in Microsoft Outlook Calendar (.msg, .pst) format, in Google Calendar format (.xml, .ical, .json), in more than one format, and/or in a format that works with a calendar software identified by a user or detected on the user's smartphone or tablet from default app settings. System generated recommendations and predictive analysis based off purchases, calendar info, schedules, media files, virtual repository, websites, users, artificial intelligence, semantic intelligence, and machine learning. Recommendations, suggestions, reminders can be based off any topic, information, industry, product and services from the centralized system. Data Metrics are systematically, analyzed, and constantly read for both the consumer and the company to produce bi-directional, multi-directional real-time systematic recommendation, predictive analysis, purchasing, marketing, awareness and managing using artificial intelligence, semantic intelligence, and machine learning. The system can then create directives and perform an actions based on a single personal data metrics or an aggregation of data metrics to be sent to any user both company and consumer. System can also deliver marketing objects based on data metrics. The system can systematically put together itinerary for the user and determine exactly where the user is spending the most money and the least money. The system could systematically evaluate the consumer's or user's spending habits and show them how to manage their money or determine how much money to save for a vacation of one or more people based of predictive analysis and also determine or recommend which products, services or vacation packages fit their budget based off how much money they make or based off how much they spend all to save money by a certain timeframe when such event or vacation is set to begin. Proposed itinerary based on historical purchase/preferences for vacation or other travel purposes, business or personal. System generated Recommendations can pull clothes from a user's fashion closet or an of archived repository of household purchased products from each user and match it up with currently viewed products or products on sale from one of more vendor or retail stores at anytime and anywhere. These recommendation can come prior to a wedding, vacation, or any event that is schedule from the user or the system can just recommend products randomly based on newly stocked products, products that are discounted, previous purchases (purchase history), matching brands, etc. . . . user can also manually match up products. Product can be matched using the matching logic in the invention. All Products on T.V. can be displayed on television or on any digital device including a smartphone of the customer initiating the trigger for product details, likes, purchases, or comparing, matching, or systematic suggestions from products on television against products owned inside their Personal Virtual Household Product Repository (ex. Household category, Product Category for ex.—Virtual Closet, Virtual Living room).

In a gamified implementation, game elements and mechanics are included to engage users and motivate them to achieve certain objectives or behaviors or to compel certain outcomes, such as outcomes of a show, a program or a movie, or to earn a purchasing discount. The game elements and mechanics are activated pursuant to a trigger, based upon virtual repository records identified by the matching engine. Tasks are made more enjoyable, rewarding, and interactive. Users are encouraged to achieve goals and objectives. These goals can range from completing tasks, reaching milestones, acquiring skills, to fostering certain behaviors or habits. Users may earn points and/or badges for completing actions or making progress towards goals. Points serve as a measure of achievement and progress. Badges are virtual rewards awarded to users for specific achievements or accomplishments. They can signify skill levels, completed tasks, or milestones reached. Leaderboards display the rankings of users based on their performance, points earned, or other criteria. Leaderboards create a sense of competition and social comparison among users, motivating them to outperform others. Users may progress by completing tasks or achieving goals. As they advance, they may unlock new features, challenges, or content. Progression is often structured into levels or tiers, with each level presenting increasing challenges or rewards. Challenges and quests may provide users with specific tasks or missions to complete, ranging from simple tasks to more complex objectives, offering variety and excitement to users. Rewards can come in various forms, such as virtual currency, access to exclusive content, discounts, real-world incentives, bonus, gift, money. The system may provide feedback to users on their performance, progress, and achievements in the form of visual cues, notifications, progress bars, or personalized messages, reinforcing positive behaviors and encouraging continued engagement. Users may interact with each other, form teams, or collaborate on tasks within the gamified implementation. Social features such as chat, messaging, and sharing enable users to connect, compete, and collaborate with peers, enhancing engagement and fostering a sense of community. The system allows users to customize their experience by choosing avatars, themes, or preferences. Personalization enhances user engagement by tailoring the experience to individual preferences and interests.

A dating app implementation facilitate romantic or sexual connections between individual users who express common interests. As discussed above, a user may use the invention to identify people in a vicinity, a particular person of interest, or individuals who share interest in a particular target (e.g., a show, event or celebrity). Participating users may provide basic information such as their name, age, gender, location, and upload photos and write a brief bio describing themselves and showcasing their personality, interests, and preferences. Users are matched (i.e., suggestions are made) based on compatibility and shared interests. Geolocation may be employed to show potential matches who are nearby. Users may be presented with potential matches based on various criteria such as proximity, age, gender, preferences and common interests. They may indicate interest in or reject a match, with a command such as a swipe. If two users both accept each other's profiles, it's a match, and they can start communicating. Once a match is made, the users may communicate through a messaging platform by exchanging text messages, photos, and voice and video calls. For user safety and service integrity profile verification procedures may be implemented, reporting and blocking options, and moderation of content to prevent harassment, spam, and inappropriate behavior.

The matching engine or temporal data recognition provides a unique technological advancement, connecting a PSP to virtual repository records. The matching engine is contextual, implementing a matching process specific to the content of the PSP. In the case of photograph or captured (i.e., recorded) audio and/or video, the matching engine detects and demodulates any embedded watermark or codes, fingerprints the captured audio or video for matching in a database of fingerprints, relates the fingerprint to an object record in the virtual repository. A database of fingerprints may comprise a database of fingerprints for scenes (portions) of programs or movies or objects or people visible in a scene. Each scene may be related to participants for the scene from a database that relates participants such as actors and producers to programs and scenes of the program. Facial recognition and/or voice recognition may be applied. Uniquely, the matching engine enables exact matching. By way of example, an exact garment worn by a person depicted in a video or photograph may be identified, and a link for purchasing that garment from a vendor of that garment may be sent to a user who actuates a trigger, all without any direct communication with the depicted person. In sharp contrast, heretofore, prior art systems merely identify a type of garment worn by a depicted person and through a search engine query produce links to similar items, which may be legion, but not an exact match. Heretofore, no such automated means of connecting object records to a captured/ recorded subject matter existed.

Voice recognition, also known as speaker recognition, entails capturing audio input, which is then converted into a digital format. Voice and Speaker recognition is a biometric modality that uses an individual's voice for recognition purposes. Speech recognition, recognizes words as they are articulated. The audio is preprocessed by cleaning up the audio signal to remove noise and enhance the quality of the audio. Noise reduction entails filtering out background noise, echo cancellation, and adjusting for variations in volume. The audio signal is analyzed to extract relevant features, including characteristics such as frequency, intensity, duration, and spectral content of the speech sounds using Fourier Transform, Mel-Frequency Cepstral Coefficients (MFCC), and/or Linear Predictive Coding (LPC). Extracted features are compared to stored patterns or models of speech sounds created during a training phase.

An exemplary virtual repository method and system with robust item management automatically derives item data from accessed current and past transactions. The system interfaces with merchant systems to receive current and archived transaction data, scans emails for current and past transaction data, monitors browser data for online transaction data, and accepts manual input. The system establishes a communication channel with each remote disparate source. The system executes program instructions to harvest data from each local source. Data obtained from all sources is filtered, collated and stored in a cache, for user review, use, modification and approval, whereupon the data populates a virtual repository. The resulting virtual repository accurately reflects a user's real world acquisitions or use information within a user-defined category, which facilitates managing (e.g., using, sharing, disposing of) and capitalizing on (e.g., selling, leasing, promoting, donating) acquired or user populated items.

An implementation of the present invention may be embodied in hardware and/or in software (including firmware, resident software, micro-code, etc.). Furthermore, the present invention may take the form of one or more computer program products on one or more computer-usable or computer-readable storage media having computer-usable or computer-readable program code embodied in the media for use by or in connection with an instruction execution system. A computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific non-limiting examples (a non-exhaustive list) of a computer-readable medium include random access memory (RAM), a read-only memory (ROM), an erasable programmable read-only memory (EPROM or Flash memory), a hard disk drive, a solid state drive, and optical discs.

Computer program code or "code" for carrying out operations (e.g., steps) according to the present invention may be written in any programming language compatible with the corresponding computing devices and operating systems. Software embodiments of the present invention do not depend on implementation with a particular programming language.

The computer program code may be provided to a processor of a general-purpose computer, special purpose computer, or other programmable computing apparatus (e.g., a phone, personal digital assistant, tablet, laptop, personal computer, or computer server) as instructions, such that the instructions, which execute via the processor of the computer or other programmable data processing apparatus, create means for implementing the functions described herein. The computer code may be stored in a computer-readable memory that can direct a computer or other programmable data processing apparatus to function in a particular manner, such that the instructions stored in the computer-readable memory produce an article of manufacture including instruction means which implement the functions and perform the steps specified in the illustrations and described herein.

Referring now to FIG. 1, a high level block diagram of hardware components of a system according to principle of the invention is conceptually illustrated. Consistent with the present invention, users of the system use computing devices, such as a smartphones 120, tablets, laptop computers 140, personal computers, smart TVs 125 or a kiosk 145, desktop computers or servers 150, communicating in a wireless or wired mode via the Internet 100. The computing devices (i.e., clients or client devices) are equipped with software for inputting and displaying information in accordance with the methodologies described herein. Such software may comprise a web browser, a client application and/or a mobile device app. Some of the computing devices 120, 125 may be equipped with cellular wireless communication modules providing internet access via wireless cellular communication infrastructure 130. Some of the devices may be used by end users for creating and managing virtual repositories, while other devices (e.g., point of sale device 140 and server 150) may be used by merchants to supply data and provide rewards.

A virtual repository is an aggregation of data pertaining to items, which may be presented to a user in an easy to manage graphical user interface. The items of a virtual repository may fall within a category, such as clothing. The virtual repository may be shared by a user, allowing other users to access the virtual repository for viewing and other allowed actions (e.g., commenting and click-through purchasing). Specific items within a virtual repository may be shared, allowing other users to access data for those items for viewing and other allowed actions (e.g., commenting and click-through purchasing). The graphical user interface may present in data in lists, tables, navigable 2D or 3D models, or augmented reality displays. A user may create a plurality of virtual repositories, assign items to one or more virtual repositories. Advantageously, a system and method according to principles of the invention collates, in a cache (temporary storage), data received and/or extracted from multiple independent sources (described below). A user may review and verify the cached data, modify or delete the cached data, and assign it to one or more virtual repositories. A system and method according to principles of the invention also collates manual entries into the virtual repository.

Referring still to FIG. 1, one or more computers such as server 155 includes or has access to a database management system for managing product data. One or more databases may contain aggregations of data records or files, pertaining to virtual repositories. A communications network interconnects the server 155, directly or indirectly through one or more additional computers, with the Internet 100. Interconnected computers communicate with each other through mechanisms such as interprocess communication, remote procedure call, distributed object interfaces, and various other program interfaces. The databases may be stored on one or more storage devices 160, 165, collectively the data storage 170. The database may be queried using various database access means such as SQL (Structured Query Language), a standard language for interacting with a database; Open Database Connectivity (ODBC), an open standard API for accessing a database; DCOM (Distributed Component Object Model), a set of Microsoft tools and program interfaces for enabling client program objects to request services from server program objects on another networked computer; Common Object Request Broker Architecture (CORBA), an architecture and specification which allows programs at different locations and developed by different vendors to interact in a network through an interface broker. Illustratively, the clients 120, 125 may execute one or more processes that interact server 155 to supply, access and manage data stored on the data storage 170. Each request received by the server 155 may be submitted as a TCP/IP communication packet including an IP address and socket number. In response to valid requests, the server 155 may provide data from the data storage 170, without compromising the integrity of the database.

In certain embodiments of a system and methodology according to the principles of the invention, a user's location may be specified. Location may be user input or automatically determined using GPS data, IP trace or triangulation information. Some of the computing devices may be equipped with Global Positioning System ("GPS") receivers for receiving signals from GPS satellites 105-115 to determine location of the device.

Certain clients 120-150 may not have access to a GPS service (for example, they may lack hardware necessary to support such a service); consequently, such GPS information may not be available for all clients 120-150. Also, certain GPS services do not operate or do not operate reliably in certain locations, such as indoors or other enclosed spaces. Thus, even if a client 120-150 does have the necessary hardware and software to support a GPS service, occasionally GPS information from the GPS service may not be available to a particular client 120-150.

IP trace information may include the public IP address of the client 120-150 and the set of IP addresses that data packets sent from the client 120-150 pass through to reach server 150. The public IP address of the client 120-150 may be determined by gathering the source IP address from the server socket receiving the client 120-150 connection. The list of hops through which the data packets sent from the client 120-150 go through may be determined by sending adaptive TTL (time to live) UDP packets to server 150 from the client 120-150. In order to determine if the client 120-150 is being an IP proxy, server 150 may correlate the list of hops with the public IP address of the client 120-150. In this way, server 150 may effectively discover the real public IP address of the client 120-150. The real public IP address of the client 120-150 is then matched against a database of Internet Service Providers (ISPs) which returns the probable address of the originating client 120-150 message. This probable address of the originating client 120-150 message may then be translated to a set of longitude and latitude coordinates.

Triangulation information for a client 120-150 may include a list of public Wi-Fi access points surrounding the client 120-150 as well as the signal strength of each Wi-Fi access point accessible by the client 120-150. The list of surrounding Wi-Fi access points, and their signal strength, may be formatted and correlated with a database of public Wi-Fi access points by server 150 to determine a probable set of longitude and latitude coordinates for the client 120-150. The database of public Wi-Fi access points employed by server 150 may be updated over time to reflect new information about available Wi-Fi access points.

The invention is not dependent upon location information. Certain implementations of the invention may not take location into consideration. In implementations that take location into consideration, certain types of location data may be more accurate or reliable than others. GPS information is more accurate and indicative of the correct physical location of a client 120-150; however, as explained above, GPS information for a particular client 120-150 may not always be available. Triangulation information, while not as accurate and reliable in identifying the correct physical location of a client 120-150 as GPS information, is more accurate and reliable than IP trace information. However, triangulation information also may not always be available, e.g., the client 120-150 may not be able to detect any nearby recognizable Wi-Fi access points. Additionally, while IP trace information is less accurate than either GPS information or triangulation information in determining the correct location of a client 120-150, it is always obtainable if the client 120-150 can communicate to server 150 over the Internet.

Additionally, a user may input location (e.g., an address) for a device, such as a personal computer, laptop, or tablet, that may not be equipped with a GPS receiver. For a device, such as a kiosk, at a fixed location, the location of the device may be known and associated with a unique identifier (e.g., MAC address) for the device.

The term "service provider" is used herein to mean any entity that provides a service using a system or methodology according to principles of the invention. The service provider may be, for example, an online service provider with a web-accessible system that receives, sends, stores and processes data and instructions for managing and sharing a virtual repository according to principles of the invention. The terms "consumer" or "client" is used herein to mean any individual or entity that uses the service provider's services to manage and share a virtual repository, whether for free or in exchange for compensation. The term "user" or "end user" is used herein to mean any individual, person, or entity that uses the system for managing and sharing a virtual repository according to principles of the invention. In many cases, a user is a consumer or person. However, in some cases, a consumer may have an assistant or agent use the system on the consumer's behalf. A merchant is a commercial party (e.g., a vendor of goods or services, a credit card processor or another service provider), who may access the system for performing such actions as supplying data and rewarding consumers. A merchant may also be a consumer, client, and end user. Likewise, a consumer, client, and end user may also be a merchant.

Using a computing device 120 and client software ("client") such as a browser or app, a user may create, manage and share a virtual repository according to principles of the invention.

Each exemplary computing device for use in accordance with principles of the invention includes a processor, memory, power supply, display, storage and user input device. Other components include a communication bus, and network communication components, such as cellular, WiFi and LAN. By way of example, and not limitation, with reference to FIG. 2, a mobile device such as a smartphone 120 may include one or more processing units (CPU's) 180, memory such as RAM 182 and ROM 184, and a power supply 186. Additionally, the device 120 may include a display controller 188, a display 190 and a touch digitizer 192. These may comprise merely a few of the components of the mobile device 120. Various components may be implemented in hardware, software, or a combination of both hardware and software, including one or more signal processing and/or application specific integrated circuits. The touch digitizer 192 comprises a touchscreen, an electronic visual display that the user can control through simple or multi-touch gestures by touching the screen with a special stylus/pen and-or one or more fingers. The touchscreen enables the user to interact directly with what is displayed, rather than using a mouse, touchpad, or any other intermediate device (other than a stylus, which is optional for most modern touchscreens). The touch digitizer 192 further comprises a transparent overlay covering the visual display. The overlay senses the touch of one or more fingers or a stylus. In response to a touch, the overlay produces a change in electrical properties (e.g., a change in current, voltage, capacitance or resistance). The touch digitizer interprets the commands that the changed electrical properties represent and communicates the commands to the appropriate applications. The touch digitizer 192 further comprises a display controller that receives and/or sends electrical signals from and to the visual display and overlay. Visual output may include graphics, text, icons, video, and any combination thereof (collectively termed "graphics"). In some embodiments, some or all of the visual output may correspond to user-interface objects. The display controller (along with any associated modules and/or sets of instructions in memory) detect contact (and any movement or breaking of the contact) on the overlay and converts the detected contact into interaction with user-interface objects (e.g., one or more soft keys, icons, web pages or images) that are displayed on touch-sensitive display. In an exemplary embodiment, a point of contact between touch digitizer 192 and the user corresponds to a finger of the user. The visual display may comprise LCD (liquid crystal display) technology, LPD (light emitting polymer display) technology, or LED (light emitting diode) technology, although other display technologies may be used in other embodiments. The overlay and display controller of the touch digitizer 230 may detect contact and any movement or breaking thereof, including speed (magnitude), velocity (magnitude and direction), and/or an acceleration (a change in magnitude and/or direction) of the point of contact, using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display. These operations may be applied to single contacts (e.g., one finger contacts) or to multiple simultaneous contacts (e.g., "multitouch"/multiple finger contacts). Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Figure 3:
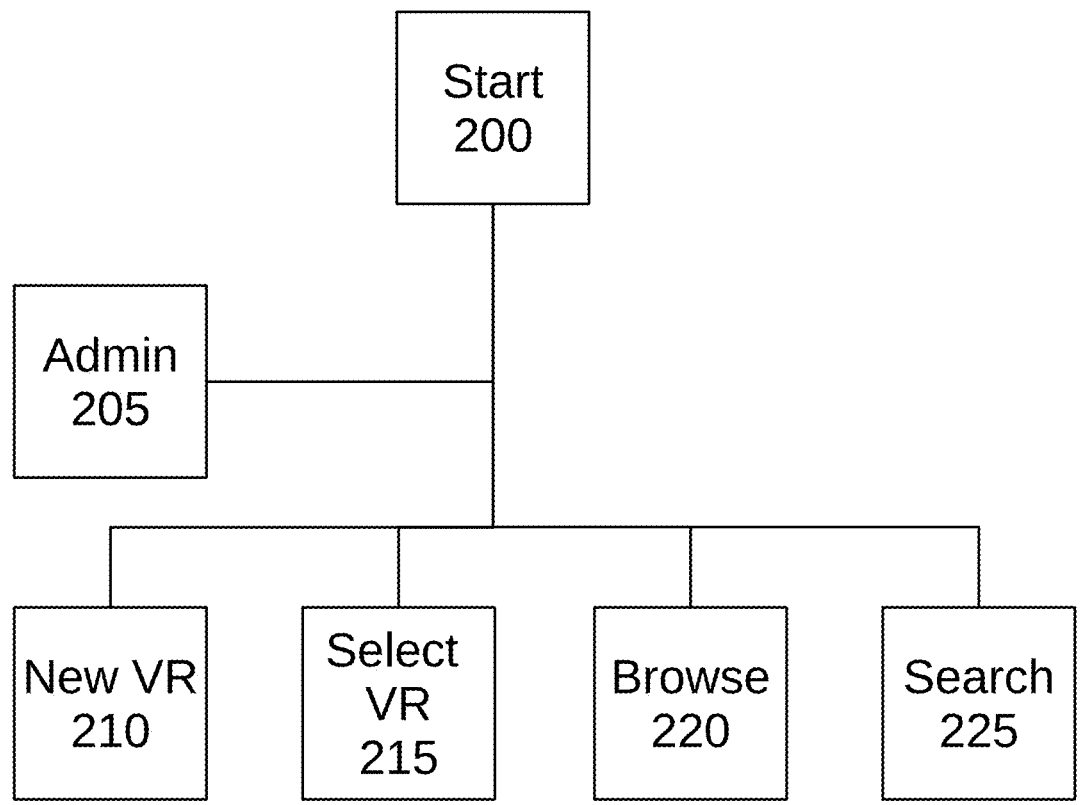
FIG. 3 is a high level flow chart of exemplary steps of using a method and system according to principles of the invention.

FIG. 3 provides a high level flow chart of exemplary steps of using a method and system according to principles of the invention. A user may start an application (i.e., software application) on a computing device, as in step 200. The application provides access to functions, including administrative functions 205, functions for creating a new virtual repository as in step 210, functions for selecting an existing virtual repository as in step 215, functions for browsing the user's and/or other users' shared virtual repositories as in step 220, and functions for searching for other users' shared virtual repositories as in step 225. A user may select a function With reference to FIG. 4, administration functions 205 include functions for setting information and preferences for a user. A user may establish a login, which may include a user name and password, as in step 310. For multifactor authentication, a user may also provide a smartphone number and/or email address. A user may input personal information, such as name, address, screen name, telephone number, email address, information regarding the user's profession, a photograph of the user, and links to other information about the user, as in step 315. A user may input payment information for any commercial transactions performed using the system, as is step 320. The information may include card information, a billing address, and a default shipping address. The user may also specify preferences, including security preferences related to privacy of the user's virtual repositories, display settings, notification settings, and sound settings, as in step 325.

FIG. 5 is a high level flow chart of exemplary steps for creating a new virtual repository for a method and system according to principles of the invention, as in step 210. A user may assign a name for the new virtual repository, as in step 410. A user may assign preferences 430. A user may assign a category for the new virtual repository, as in step 415. A user may select a template for the presentation (display) of the virtual repository, as in step 420. Available templates may, by way of example, include a list, side-to-side scrolling presentations, top-to-bottom scrolling presentations, navigable 3D models of a space such as a closet, and even augmented reality displays of the user's actual closet. The scrolling presentations may include multiple levels (as discussed below), allowing a user to separately scroll through various subcategories of items 425 within a virtual repository. By way of example, a three level scrolling display may allow a user to separately scroll through the user's shirts, pants and shoes. As another example, an augmented reality presentation may allow a user to walk through a closet while aiming a smartphone at the items in the closet, and receive information about each item on the display. A user may setup more than one template, for the user to select from when using the application.

FIG. 6 is a high level flow chart of exemplary steps for managing a virtual repository for a method and system according to principles of the invention, as in step 215. Upon selecting a previously created virtual repository, the user may manage (e.g., review and edit) preferences as in step 550, modify the virtual repository's name or category as in step 510 or select or modify items, as in step 515. Preferences may be set 550. In the case of clothing items, an item may be selected for wearing, as in step 520. Alternatively, an item may be scheduled for wearing on a scheduled date and time, as in step 525. An item may be disposed of (e.g., sold, discarded, donated or given away) as in step 530. An item may be viewed, as in step 535. An item may be modified 540. Viewing an item may display information about the item, including use-related information.

If a user enters into the system information about wearing (or otherwise using) each item, then the system may present a history and/or frequency of use. A system and method according to principles of the invention may save all entered dates of use, as in step 520. For example, a user may enter each date on which the user wore a particular garment. From such dates, the system may determine the last time an item was used and a frequency of use. Date of use data may alert a user to unused, infrequently use and frequently used items. A system according to principles of the invention may notify a user of items that the user did not use in a determined number of days (e.g., 100, 180 or 365 days). Knowing specific dates of use may also help a user determine if the same item should be used (e.g., worn) again. For example, a user may want to avoid wearing the same suit on a follow-up job interview, or the same dress at an upcoming event or party that will be attended by some folks who attended a previous party.

An item may be modified (i.e., stored information pertaining to the product may be modified) as in step 540. Modification may include adding comments about comfort, fit, and accessories. For example, a user may note that a garment fits loosely or tightly, or is best worn with a particular accessory. Some such notes may be accessible only by the user, and other notes may be shared with other users.

A system and method according to principles of the invention may incentivize users to input use dates for an item. Such use may be input by simply selecting the item and selecting a current use button or by selecting the item and providing a verbal command, or by entering a date. As described above, a user's location may be tracked through a device, such as a smartphone. Inputting use dates helps a user track which items are used and when, which, as discussed above, is beneficial. Additionally, use information may lead to rewards. Shared items are visible to other users. A worn item may be a shared item. Other users may search for an item worn by a user at an event, or on a certain date and time, and/or at a specific location. Upon finding the item, such other users may click through the item to purchase it from a merchant. Through an affiliate program, the merchant may reward the user who shared the item. Such reward may be a payment to an account of the user. To maximize such payments, users will want to regularly input use dates, share items and wear items well. The first user selects the affiliate link on the first computing device for which the second user is awarded (i.e., receives something of value, such as a commission).

Disposing of an item, as in step 530, may entail selling, renting, donating, gifting or discarding an item, and thereupon removing the item from the virtual repository, or, in the case of renting, marking the item as unavailable during the rental term. These functions enable a user to capitalize on items.

For example, using the information about an item in the virtual repository, a selling price or auction bidding terms, and one or more current photographs of the item, the item may be marked for sale. Upon being marked for sale, the item is shared and may be searched and viewed by all other users of the system. Such other users may purchase or, in the case of an auction, bid on purchasing the item.

Similarly, a user may mark an item for donation, which may present a list of willing charitable organizations in the vicinity of the user who would be glad to receive the item. The user may select an organization from the list. A record of each completed donation may be generated for tax deduction purposes.

Items may be marked as exclusive or memorabilia. These items may also be sent to or extracted or purchased from a virtual repository or database to include, but not limited to a certificate of authenticity, certificate of exclusivity, certificate of ownership, or NFT (Non-Fungible Token) labeled or referred to as Exclusive or certificate, associated with a purchase number sent to the user or purchaser, in the order the item was originally purchased from the original source and/or purchased for resell in a secondary market. Each exclusive item may be associated with item records from a user repository and merchant. Each physical item, certificate of authenticity, certificate of ownership, certificate of exclusivity and NFT (Certificates) for resell or from the original source or merchant may be marked with a purchase order number. (e.g. 1 of 200, 15, 300, IV.) The physical exclusive numbers may or may not be associated to the certificates. Results, links, hyperlinks within the principles of this invention may be associated with a purchase order number (an order in which the consumer purchased the item or service from the source or merchant, e.g. 2, #2, 2 of 100, #2 of 100) that is associated with a timestamp and associated to an inventory. An inventory may be a total count of a specific item available. The order of purchase may be based on the order of the timestamp of the purchase. The earlier the timestamp, the earlier purchase order number or certificate the consumer will receive closer to "1". Rewarding those users who are the first to purchase. The later the timestamp, the order number is infinite. The purchase order numbers are associated with timestamps and repository data in the numerical order the items were purchased from its source. These timestamps are associated to the items purchased from TV shows, movies, TV series, events, or in-person and may be linked to repositories and the user interface by API. Winnings, compensations, gifts during gaming may also be associated with an exclusive item. For example, a user may only participate in gaming or betting to receive the exclusive item associated with a specific sporting event, celebrity, or teams where the gaming or betting or bidding are being viewed by TV, mobile device, or in-person. Items or certificates for resell may be transferred to another user repository upon a completed purchase, by gift, by donation, or by winning. Physical items may be sent by some form of delivery (e.g. mailed or in-person) or picked up.

An item may be marked for renting. For example, a user may own a ball or bridal gown, tuxedo, a costume, skiing apparel, a wetsuit, or some other expensive and infrequently used item. The user may be receptive to renting the item to other users. By marking an item for rental, that item is searchable by all other users of the system. Such other users may rent the item.

By providing the sale, donation and rental functions, a system according to principles of the invention facilitates capitalizing on items. Items that a user does not use, or infrequently uses, may be sold, rented or donated. In each case, the user receives a benefit. In the case of sales or rentals, the user receives monetary compensation. In the case of donation, a tax reduction may be earned. In each case, the user gains the knowledge that an item has not gone to waste, but rather is put into good use.

While other systems for selling, leasing and donating items may exist, none is tied to an existing virtual repository. By tying the such systems to a virtual repository, a system and method in accordance with principles of the invention facilitates identifying unused or infrequently used items, and also facilitates posting such items for sale or rental, or donating such items to a worthy charity.

FIG. 7 provides a high level flow chart of exemplary steps for performing actions relating to items in a virtual repository for a method and system according to principles of the invention. In particular a user may browse items in the user's virtual repositories, as in step 220. A user may select a virtual repository from a list of the user's virtual repositories, as in step 610. A user then may view and select an item in the virtual repository, as in step 615. The user may calendar the item, as in step 620. By calendaring the item, the user indicates a date on which the user intends to use (e.g., wear) the item. A user my offer to sell or rent the item, as in step 625. The terms of the sale or rental may be set by the user, within determined parameters of the system. The use may view the items, as in step 630. A photograph of each item may be stored as item data, as described above. The photograph may be user supplied or obtained from a vendor's online posting for the product. A user may enter comments about an item, as in step 635. For example, a user may describe the comfort, fit or feel of an item, or describe an event at which the item was used (e.g., worn), or enter other information (e.g., an endorsement) relating to the product. A user may locate the item in a retail establishment, as in step 640. By locating the item in an online or brick and mortar retailer, the user may shop for other similar or matching items and accessories.

The flow chart of FIG. 7 also applies to browsing shared virtual repositories and items of other users. A list of virtual repositories may be generated by a search from a search engine or from a directory. A user may search for a particular user's virtual repository, a celebrity's virtual repository, a virtual repository that contains certain items. A user may navigate through categories and subcategories of a directory to generate a list of repositories. Filters may be provided to narrow the list. A user may select a repository as in step 610. A list of shared items in the repository is presented, as in step 615. A user may select shared calendar information for a selected item, as in step 620. Such information reveals when the user used (e.g., wore) the item. A user may offer to purchase the item an item from such a list, as in step 610. A user may simply view the item, as in step 630. A user may enter comments about the shared item, as in step 635. A user may shop for the selected item, as in step 640. Purchase of the selected item may lead to a reward (e.g., compensation) for the user who shared the item.

An affiliate program may track click-throughs to merchant sites and enable payment of commissions to a user who shared the item and from which the purchase originated. To enable affiliate compensation, an affiliate link may be associated with each shared item. The affiliate link carries information that identifies the source of the click-through so commissions can be accurately payable. In one embodiment when an affiliate link is clicked, a cookie is deposited on the user's computing device. When a user completes a sale on the merchant's site, the merchant checks to see whether their cookie is present on the user's computing device. If it is, the merchant can access information from the cookie about the user that shared the item and generated the sale lead, and can then attribute the sales commission to that sharing user. Merchants can set the commission structure and cookie lifetime via the affiliate network. For instance, a merchant may decide to assign a cookie lifetime of 60 days, which means any sale made on the merchant's site by a user within 60 days of the user first visiting the merchant's site via the sharing user's repository, is commission-generating for the sharing user.

FIG. 8 is a high level flow chart of exemplary steps for modifying, adding and deleting items (step 225) in a virtual repository for a method and system according to principles of the invention. Selected items may be modified as in step 710. Modification may include editing entered content and photographs. Selected items may be deleted as in step 720. Items may be deleted automatically if sold or donated using the system. Items may also be deleted manually at any time by the user who owns the virtual repository.

Items may be added 715. Items may be added manually, by user input, as in step 725. Manual addition may entail typed user input, uploaded files, scanned documents, optical character recognition of documents, and verbal commands.

Items may be added from third party sources, as in step 730. Third party sources may include merchants 740 and purchase histories from accounts accessible online 745. Such accounts may include online retailer and marketplace accounts (e.g., online Walmart, Amazon and Macy's accounts). Another third party source may be merchants' point of sale system data. Participating merchants may communicate purchase data for participating users to the system via an application programming interface. The purchase data may be pushed by a merchant from point of sale transactions by the user. Alternatively, purchase data may be pulled by a user from a merchant's point of sale system, via an application programming interface. Even purchase data for purchases at most brick and mortar establishments are stored on merchant servers connected to their point of sale systems.

Items may be added via applications (e.g., plugins and add-ons) that monitor a user's browser activity and emails for purchase data, as in step 735. A browser plugin may track online purchasing activity, as in step 750. Online purchases are detected via the website and user selections, including online shopping cart activity. Emails, as in step 765, may provide order confirmations, many of which may contain a hyperlink to an account on a remote server where details of the transaction are provided. Accessing a remote account may require a login (e.g., user name and password), which the user can supply to the system. Emails may also provide detailed receipts, as in step 755. Receipts may also be uploaded by a user for processing. Such processing may entail optical character recognition and determining purchase data.

Data from sources other than manual entry is stored in a cache or temporary storage until verified by a user. The cached data may be displayed to a user in a list comprised of records (rows) and fields (columns). Thus, a system and method according to principles of the invention merges (i.e., collates) data extracted for various sources, including remote (e.g., merchant systems) and local sources (e.g., mined emails) into a cached list for possible addition to a virtual repository. The user may verify each record for entry into the virtual repository. Data for a record may be modified by a user before verification. Records may be deleted by a user. For example, a user may determine that a record does not belong in the virtual repository, such as if the purchase is a gift for a friend.

FIG. 9 conceptually illustrates an exemplary user device 120 on which a method and system according to principles of the invention may be used. A graphical user interface 850 may be presented on a display 805. The user interface may present information and graphics pertaining to virtual repositories, items and user accounts. Various user-selectable controls 850 may be displayed for user control. A microphone 810 may accept voice commands. A voice command is associated with user identification verification or authorization. A computing system or personal digital assistant may verify the identity of a user and authorization of a user command to make sure that user is, for example, the age of consent, authorized to proceed, authorized to make a purchase, authorized to interact with the media file and computing system, all through a voice biometric. For example, if a 10-year-old wants to purchase an item or tickets to an event they heard on the radio or seen on television, they will be denied if the authorization is not cleared or verified to proceed. Verification and authorization may be used through one or more biometrics within the invention. Modern operating systems include a voice-user interface that makes spoken human interaction with a device possible, using speech recognition to understand spoken commands and typically text to speech or speech to text to play an audible reply.

Figure 14:
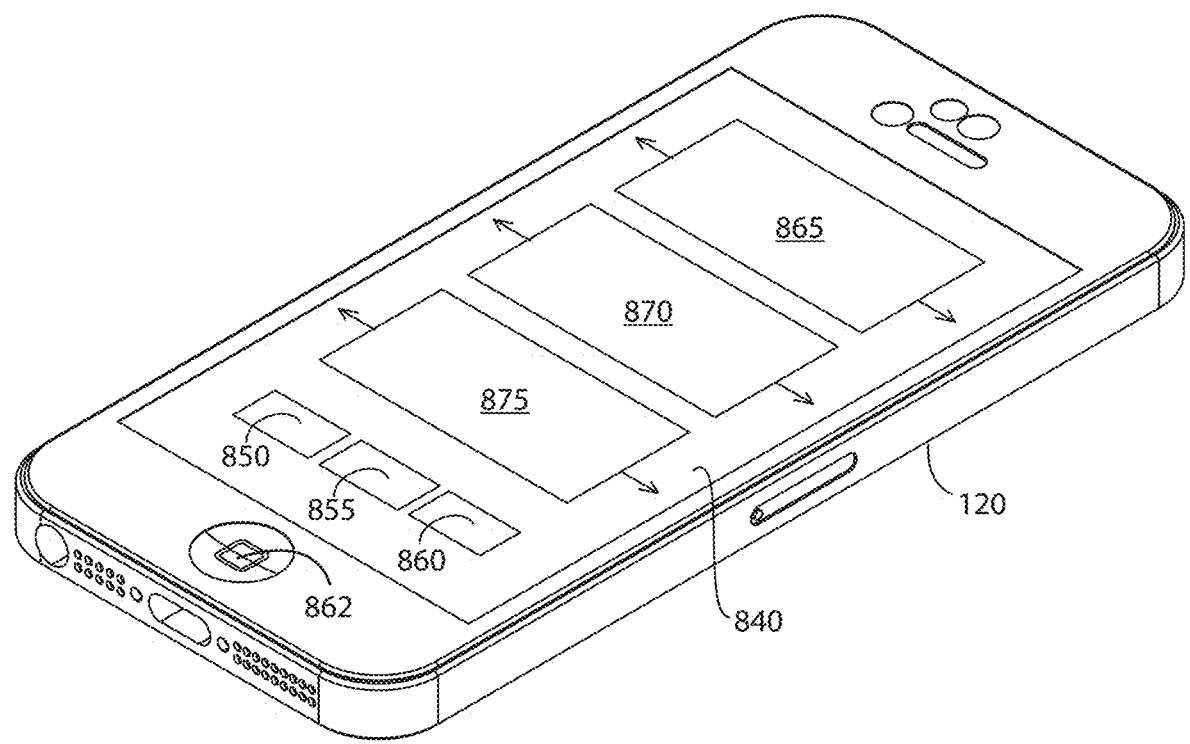
FIG. 14 conceptually illustrates an exemplary user device on which a method and system according to principles of the invention may be used.

FIG. 14 conceptually illustrates another exemplary user interface on the user device 120 on which a method and system according to principles of the invention may be used. This graphical user interface 840 may include three levels 865-875 of display and user input controls 850-860, along with a microphone 862 for audio recording and voice commands. Different items may be displayed on each level. By way of example, data and images pertaining to shirts may be displayed on the top level 865; data and images pertaining to pants may be displayed on the middle level 870; and data and images pertaining to shoes may be displayed on the bottom level 875. The different levels may represent different virtual repositories, such as a repository for shirts, another repository for pants, and another repository for shoes. Alternatively, the different levels may represent different categories of items within a particular virtual repository.

A user assigns the number of levels and the virtual repository, category, or specific items to be displayed at each level. Such assignment may be made by a command or touch gesture relating to the level. For example, a swipe upwardly on a level or a voice command ("assign levels") may command the system that the user wishes to assign a virtual repository, category, or specific items to be displayed at the level. Upon receiving the command, the system presents controls for making the assignments.

Figure 15:
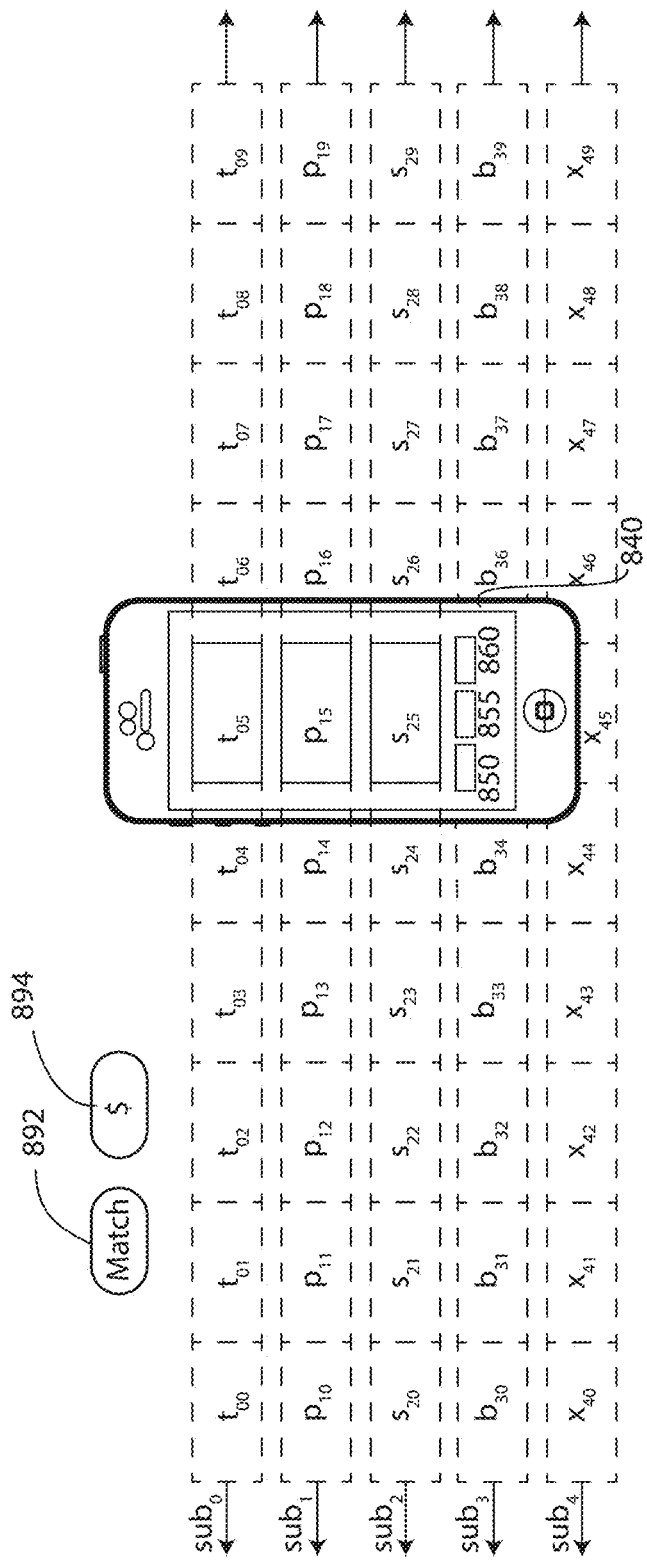
FIG. 15 conceptually illustrates an exemplary user interface on a user device on which a method and system according to principles of the invention may be used.

With reference to FIG. 15, each level of the user interface may present data pertaining to an item, which may include a pictogram of the item. Swiping to the left may load for display the next item to the left in a continuous list. The list is continuous, because swiping past the beginning presents the end of the list, and swiping past the end of the list presents the beginning of the list. Thus, the list behaves like a reel. Swiping to the right may load the next item to the right in the continuous list. In the displayed exemplary embodiment, the top list includes data for items $t_{00}$ through $t_{009}$, the middle list includes data for items $p_{00}$ through $p_{009}$; and the bottom list includes data for items $s_{00}$ through $s_{009}$. Selectable icons for various commands may be presented, including, by way of example and not limitation, a lock icon 880 for security options, a share icon 882 for sending a link or a pictogram to an intended recipient, a heart icon 884 for rating the item, a binocular icon 886 for focusing on the item (i.e., obtaining details) and a flag icon 888 to mark the item for further review. A match control 892 may command the system to match items, such as men's dress shirts, with dress pants and dress shoes from the available items. A $ control 894 may invoke financial functions, including selling, renting and purchasing functions. These are non-limiting examples of controls and logic of a user interface.

Figure 16:
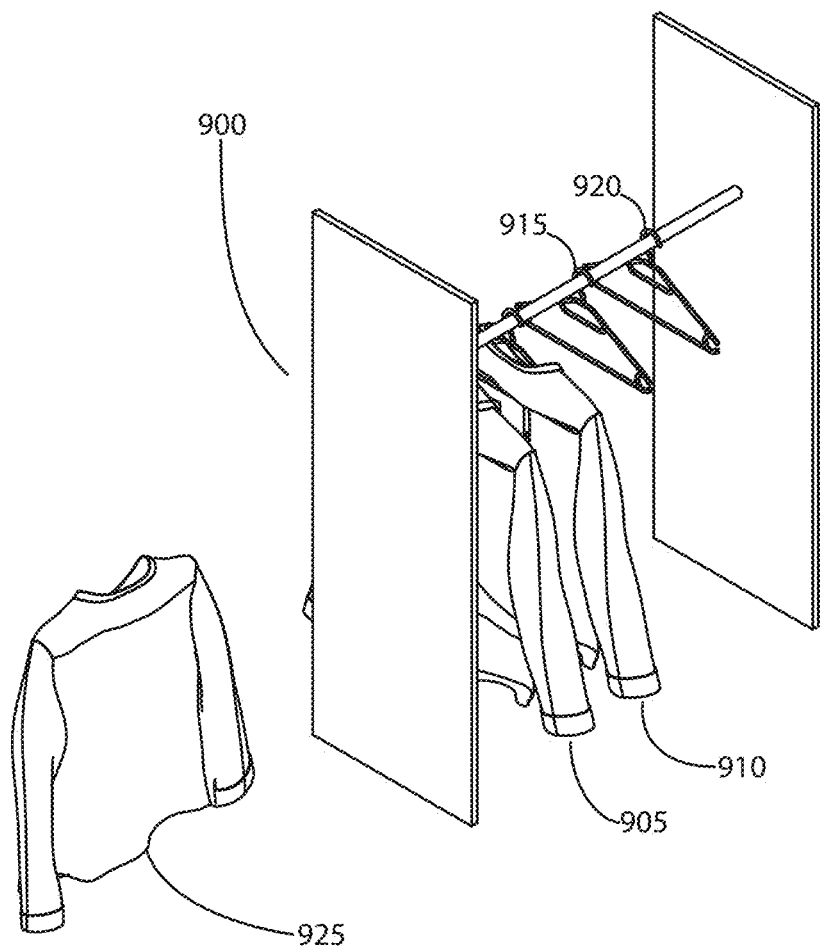
FIG. 16 conceptually illustrates an exemplary virtual display for a method and system according to principles of the invention.

FIG. 16 conceptually illustrates an exemplary 3D virtual display for a method and system according to principles of the invention. The exemplary virtual display resembles a closet 900 containing shirts 905, 910, 925. The closet includes hangers 915, 920 on a hanger rod. An empty hangar may represent a shirt that has been removed and not available for use, such as a shirt sent out for dry cleaning. Mousing over a shirt or hanger displays details about the item and a photo or pictogram. Clicking on the details displays editable details and controls for the item. Removing a shirt from the closet, such as shirt 925, may indicate that the shirt is or will be worn. Mousing over the removed shirt displays details about the item and a photo or pictogram. Clicking on the details displays editable details and controls for the item. The shirts may be colored to represent the color of the actual item. The shirt icons may come in several styles (e.g., polo, henley, t-shirt, dress shirt, etc. . . . ). The angle of viewing may be changed by touch gestures or voice commands.

Figure 17:
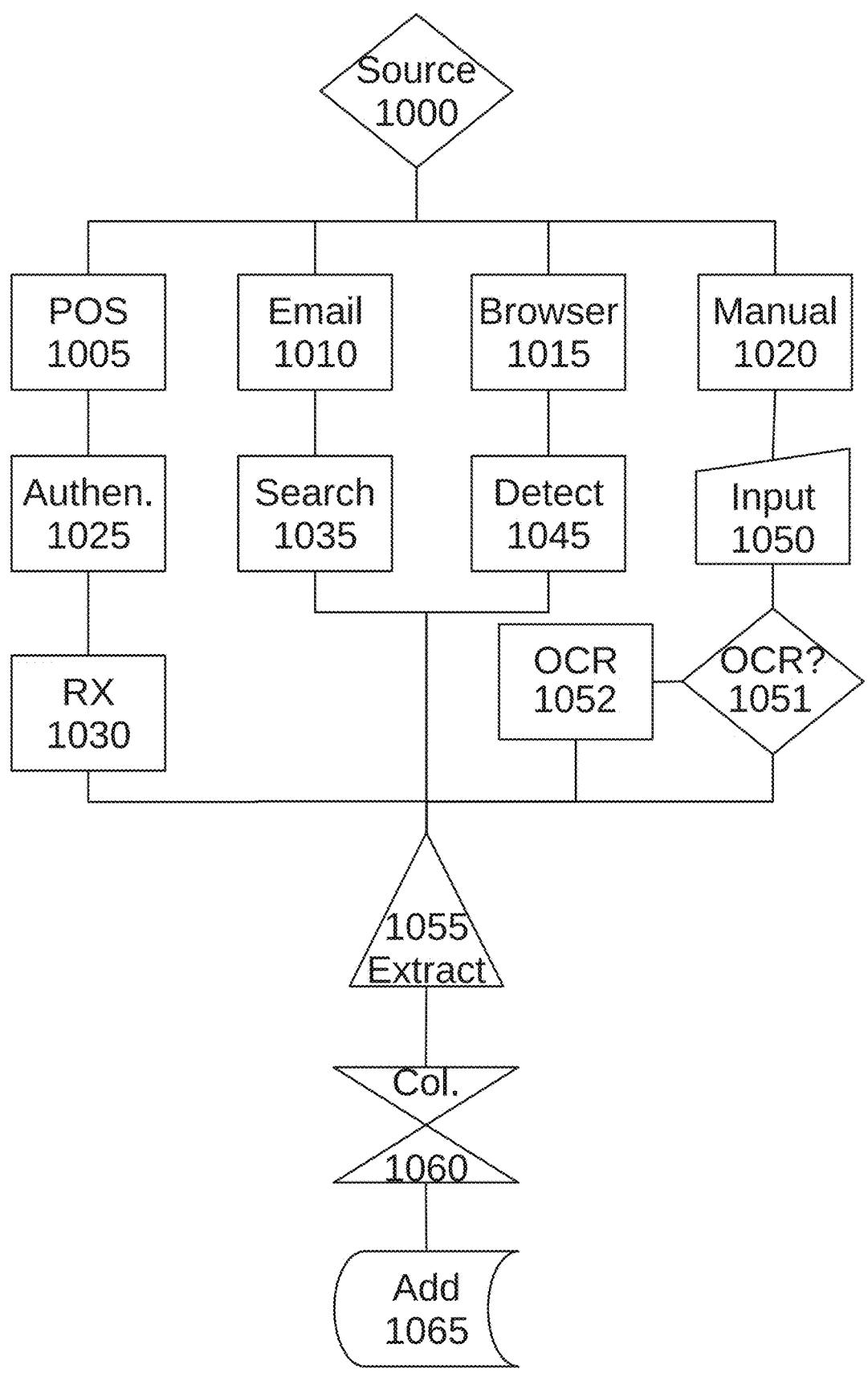
FIG. 17 is a high level flow chart that conceptually illustrates steps of an exemplary method of populating a virtual repository with item data according to principles of the invention.

FIG. 17 provides a high level flow chart that conceptually illustrates steps of an exemplary method of populating a virtual repository with item data according to principles of the invention. If a source is available for supplying data as in step 1000, then steps are undertaken to extract and collate the data. Data from a point of sale transaction may be supplied through a participating merchant's server, as in step 1005. As in step 1025, in the case of pushed data the merchant's server may authenticate the merchant and user for which the data is being supplied. Such authentication may comprise a unique login and user id. In the case of pulled data, the virtual repository system may provide authentication to the merchant's server. Then, the user's data is received, as in step 1030. After receipt, the relevant fields of data are extracted, as in step 1055 and the extracted data is collated into a record, as in step 1060. Thereafter, the record may be cached for user review, editing and validation before being incorporated into a virtual repository as in step 1065.

Similarly, data may be obtained through emails, as in step 1010. Emails may be periodically searched for receipts, order confirmations and the like. Data may be extracted from receipts attached to emails as in step 1055. Some emails may provide links to follow for details about an order. The system may follow the links, using the user's login information for the account on the merchant's system, to access the purchase data and extract the relevant data, as in step 1055. Again, the extracted data is collated into a record, as in step 1060. Thereafter, the record may be cached for user review, editing and validation before being incorporated into a virtual repository as in step 1065.

Similarly, data may be obtained from browser activity 1015. A browser plugin or add-on may monitor for purchase activity by identifying online shopping cart features or purchase controls, as in step 1045. Data may be extracted from scripts for displayed screens, as in step 1055. Again, the extracted data is collated into a record, as in step 1060. Thereafter, the record may be cached for user review, editing and validation before being incorporated into a virtual repository as in step 1065. As such browser activity may also result in an emailed receipt or confirmation order, care is taken to prevent duplicate entries to a virtual repository.

Data may also be obtained by manual entry 1020. Using an available input device, a user may enter and/or upload data, as in step 1050. If an image of a scanned or photographed receipt or purchase order is uploaded, optical character recognition may convert the image to text for extraction, as in steps 1051 and 1052. Data may be extracted from the processed upload, as in step 1055. Again, the extracted data is collated into a record, as in step 1060. Thereafter, the record may be cached for user review, editing and validation before being incorporated into a virtual repository as in step 1065.

Figure 19:
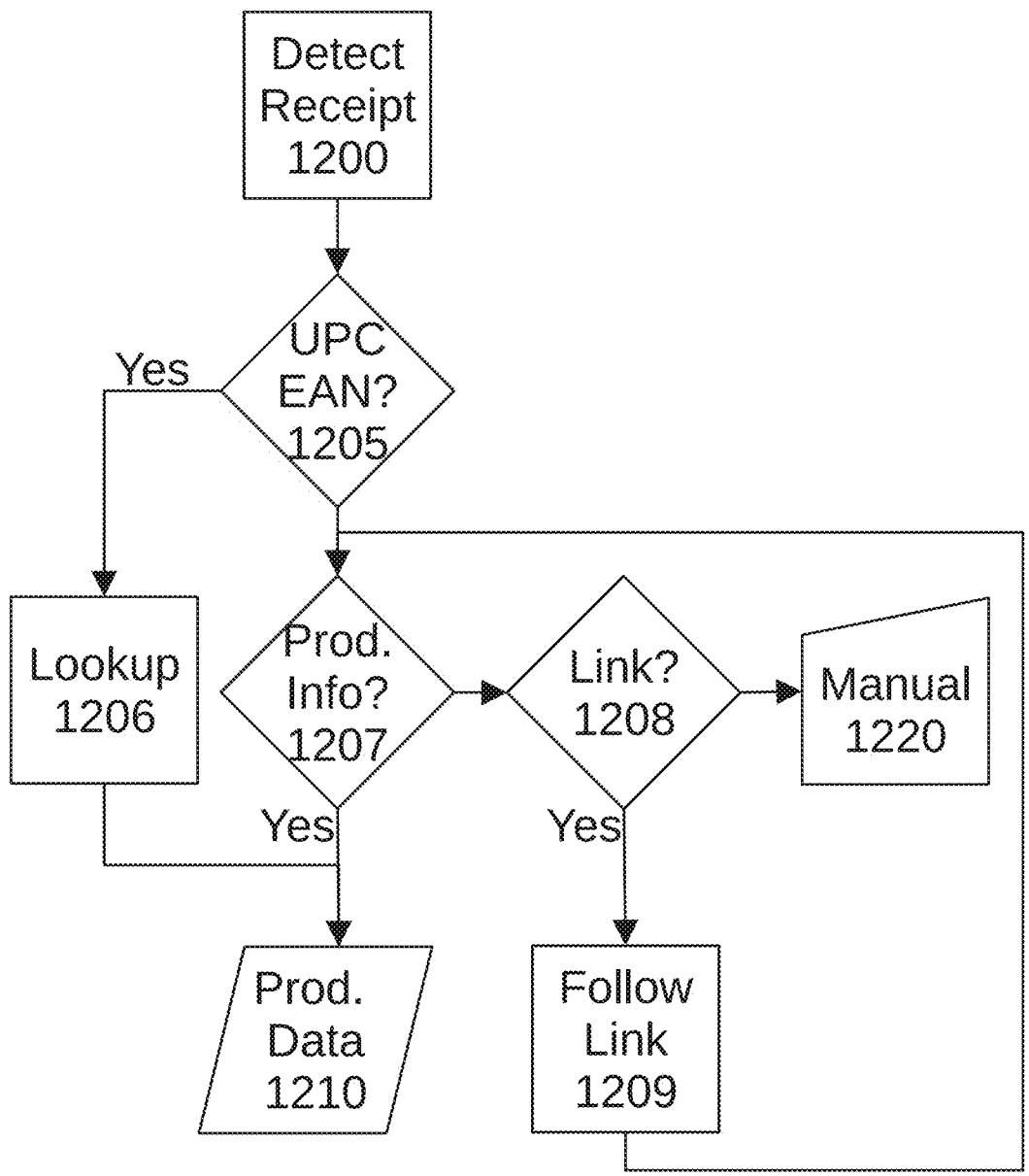
FIG. 19 is a high level flow chart of steps of determining product data, from a transaction, for use in a virtual repository according to principles of the invention.

FIG. 19 conceptually illustrates steps of processing receipts to extract relevant data for collation according to principles of the invention. A detected receipt 1200 may be a receipt attached to an email, an order confirmation in an email, or an uploaded receipt. The receipt may be a text document, or an image of a receipt, such as a scanned or photographed receipt. In the latter case, optical character recognition may be performed to make the data system readable. In step 1205 the receipt is reviewed for a standard industry code, such as a UPC or EAN code for the product. Such codes follow standard formatting. If either code is detected, then the product data may be looked up, as in step 1206 from a standard industry lookup database. Product data may then be obtained from the retrieved data, as in step 1207. If the receipt is devoid of such codes, then the receipt or email is reviewed for product data, such as a merchant name, product identifier, product name, price and date, as in step 1215. If such information is available and detectable in the receipt, then the information may be extracted for use in the system, as in step 1230. Extraction entails identifying the information using keyword and pattern recognition, and saving and associating the identified information with the type of information (e.g., saving a numerical value as a price, and saving a name as a merchant, and saving an alphanumeric code as a product id). In some cases, an email may not have an attached receipt and may not contain product information. Instead, the email may contain links directed to transaction information on a remote server, as in step 1208. In such cases, the link is followed, as in step 1209. If the followed link leads to the product information, the product information is identified and extracted in steps 1210. However, in some cases, the link for the order may lead to separate links for each product in the order. In such case, each product link is followed. If the followed link leads to the product information, the product information is identified and extracted in steps 1210. Following links may require the user's login for an account on the remote server, which the user may supply to the system or enter as needed during the operation. A user may also manually enter data from a receipt as in step 1220.

Figure 18:
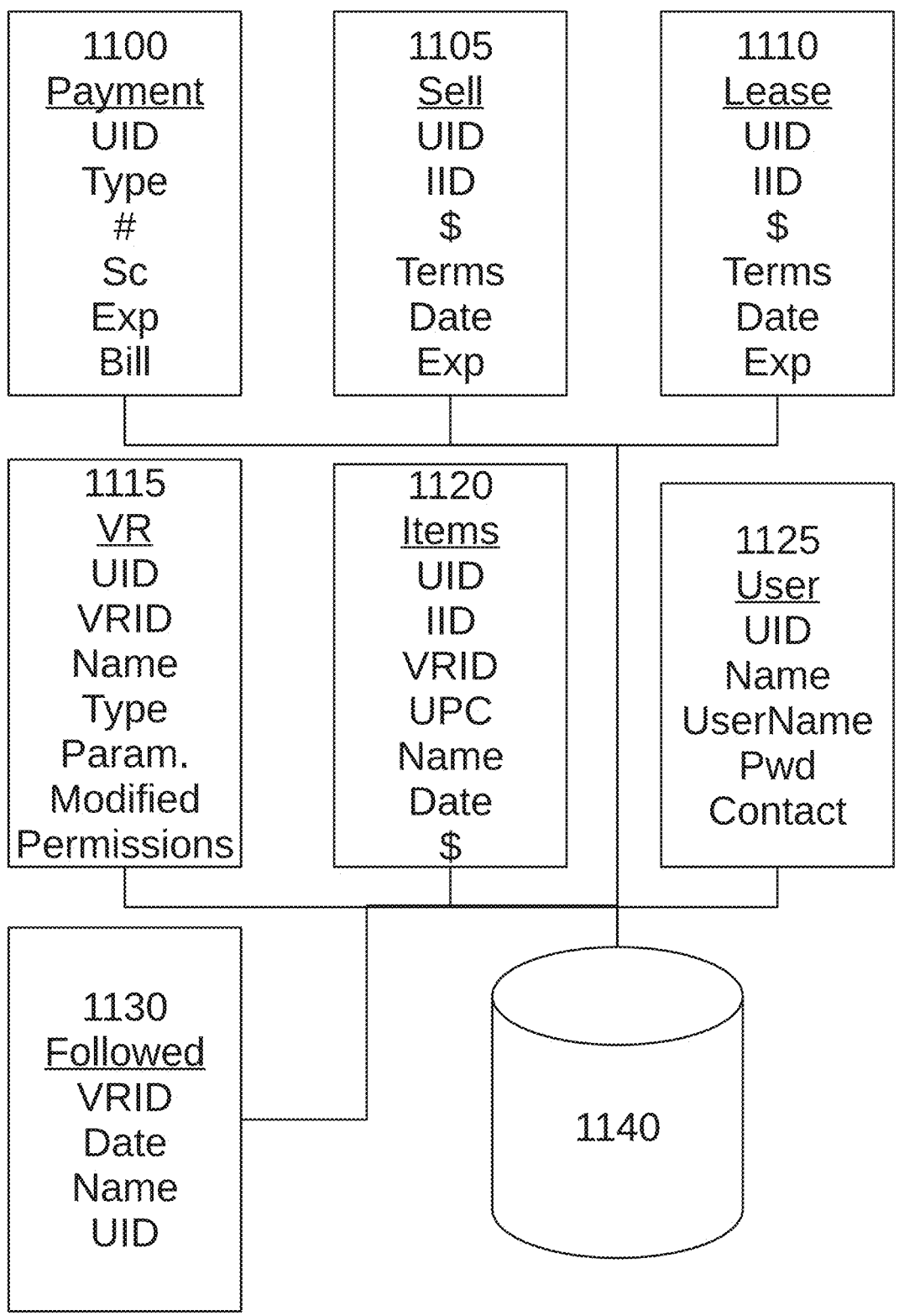
FIG. 18 is a high level data model that conceptually illustrates exemplary data for a virtual repository with item data according to principles of the invention.

FIG. 18 is a high level data model that conceptually illustrates exemplary data for a virtual repository with item data according to principles of the invention. The data is stored on a data storage device 1140, which may comprise one or more mass storage devices on a remote server, such as 155-170 in FIG. 1. The data may be stored as records in tables of a relational database. Identifications (id)s are unique uniform identifiers assigned to records in the system. Each of a user, virtual repository and item is assigned a unique uniform identifier. The unique uniform identifier may be used to retrieve records pertaining thereto.

Examples of categories (tables) of data include payment data 1100. By way of example and not limitation, the payment data includes a user id to associate the information with the particular user. The payment data includes a type, such as a credit or debit card or an ACH account. The payment data includes an account number. The payment data includes a security code and expiration in the case of cards. The payment data also includes an address such as an account holder or billing address. Such payment data may be used for a user to make purchase using the system. The payment data may be stored by a secure third party system, or securely by the virtual repository system.

As another example of categories of data, are selling records 1105. By way of example and not limitation, the selling records may include data pertaining to items sold by a user using the system, including the user id, item id, amount, terms of sale, date and expiration in the case of a pending offer to sell. Similarly, records of rentals 1110 may be kept, including such data as the user id, item id, amount, terms of rental, date and expiration in the case of a pending offer to rent.

As another example of categories of data, are virtual repository records 1115. By way of example and not limitation, the virtual repository records may include the user id, a virtual repository id, a name for the virtual repository, a type description for the virtual repository, data for parameters for the virtual repository, dates last modified, and permissions (e.g., sharing permissions) relating to the virtual repository.

As another example of categories of data, are item records 1120. By way of example and not limitation, the item records may include the user id, an item id, a virtual repository id, a product code such as a UPC code, a name for the item, and a date for the item, among other data. Such other data may include descriptions, comments, affiliate program links, photographs and pictograms for the item.

As another example of categories of data, are user data 1125. By way of example and not limitation, a user data record may include the user id, a name, a user name, a password and contact information, including a mailing address, email address, telephone numbers, repository data, and the like. Other data may include biographical information, comments, and photographs.

A user may follow other shared virtual repositories and/or items. A user may purchase other items or services from another user's shared repositories. By way of example and not limitation, a celebrity user may share his or her virtual repository. Other users may follow the shared virtual repository. Following allows a user quick access to the shared virtual repository, by selecting it from a list of followed virtual repositories. The list may be sorted in order of frequency of visit, last visited, alphabetically, or chronologically. Followed records 1130 may include a virtual repository id, one or more dates (e.g., dates first followed, last visited dates, dates of each visit), a repository name, and the following user's id.

A trigger is an important aspect of an exemplary implementation of the invention. A trigger is a user command, a request, seeking data for a target. The target is another user. The item data sought may be item data for items in current use by the target, item data for items in use by the target at a specific event, or item data owned by the target. The item data includes only data shared by the target.

The trigger may be any of various types of user input. The trigger may be a control selection using a graphical user interface. The trigger may be typed or text data. The trigger may be a voice command or gesture input on a touch sensitive device. The trigger may be a photograph, a video, video data, audio data, a speaker, a face, biometrics of any kind, a QR code of any kind, a barcode, a voice recording uploaded to the system or created using the system. The trigger may be a scanned (e.g., photographed) product code or inputted product identification. The trigger is not limited to any particular format or means of input.

A trigger may be specific or contextual. A specific trigger identifies at least the target user. A specific trigger may also include additional information, such as a time and location. A contextual trigger indicates an occurrence from which a target may be selected or determined. By way of example and not limitation, such an occurrence may be an event, a location and time, a broadcast show or commercial, an advertisement.

In one nonlimiting example, the command is a selection of a target or a target's shared virtual repository or items. Items may be item records, items may be services, Item records may be gaming or games associated to the virtual repository or repository. For example, a user may be interested in what items are included in a celebrity's shared virtual repository, or what shared items are currently in use by a celebrity. In such case, the user may select a link to the target's shared items or virtual repository. The link may have been included in search results, or previously saved (e.g., bookmarked) by the user, or found by navigating through an index, or found in some other manner that identifies the target. Displaying items from an entire scene in a movie, event, tv show or tv series, user, or commercial by just identifying partial items in the scene that matches the user's repository. For example, recognition technology may only identify the face of one user in a scene of five users but may identify the couch and the dog. Recognition technology in this invention may identify one or more matching objects to determine or correlate many matching item records of a virtual repository or video or audio data as results. This might be enough by a confidence score through the Temporal Data Matching Engine or Multi-Authentication Recognition to identify all users and all items in the scene of the movie, tv show, tv series, or event and send the results back to the first user. The photo or video recording or scan by camera or smartphone or smart TV only needs to match partial items to receive a valid high confidence score to determine the matching items in that particular scene associated to that timestamp or time code. A confidence score can determine the accuracy or inaccuracy, or probability or validation of request during a trigger. High score determines that your request or fingerprint is more correct with accurate results and valid and a low score determines inaccurate results during the trigger.

In one nonlimiting example, services associated with a virtual repository may also include, but not limited to buildings with leasing options or purchasing options to office space, residential space, businesses that sell services and location information. The user might be interested in detail information of the type of dog or cat in the captured media and the breeder of the dog or cat in the captured media with location and purchasing information. The user might be interested in a movie shown as a video trailer in a TV commercial and would like a reminder to see the movie or a reminder to purchase tickets or an option to purchase pre-sale tickets now. Those are several examples of captured services from a program or video program. All virtual repository information may be associated with product, service, user details, participant details, or gaming details, product or services links or product or service codes, or entertainment information. Gaming information may be associated with entertainment information, movies, tv shows, events, sporting events, or an object, marketing object, or matching object or item records. Gaming may be an item or item record. An object or matching object may be an item or item record. Services may be an item or item record. An object or item record may be a numerical timestamp, time code, time value, or duration value. An object, Item record, or matching object may be a movie or television show scene or event data. A matching object or object or item record may be a participant or user, participant or user details may include an image, product details, movie details, TV show details, streaming data, program data, scene information, video data, audio data, gaming data, pattern data, user data, repository data, database data, merchant data, event data, location data, business information, personal information, numerical timestamp, directives, colors, sizes, prices, services details, entertainment or TV guide schedule information, company logos, time code, time code, television or streaming channels, product categories, brand and retailer information. A user may also be a participant. A user may also be a viewer. Each user account may come with user personal information or business information. All users, repositories, item records, items, and objects may be recognized by scan, photo, video recording camera using a recognition engine including, but not limited to one or any combination of the recognition technologies: pattern recognition, object recognition, location recognition, event recognition, screen recognition, biometric recognition, time code recognition, image recognition, scene recognition, text or typing recognition, video recognition, sound recognition, voice recognition, speaker recognition, logo recognition, Icon recognition, speech recognition and face recognition. Recognition technology may be automatically processed or implemented in the camera or smartphone. An event trigger may also initiate or trigger event recognition. Event recognition may use location and event data to perform recognition. Location recognition may use location data and event data to perform recognition. A location trigger may also initiate or trigger location recognition. All recognition technology may be triggered to perform immediately upon video recording or audio recording or upon triggering time code or object for real-time results. In the current invention, video recognition may have the same meaning as image recognition and vice versa. Image recognition may have the same meaning as object recognition. Sound recognition may have the same meaning as speaker, audio, voice and speech recognition and vice versa. Video and audio recordings and photos are triggers.

During a video trigger, a television, screen, or monitor may be detected using image recognition technology. Once detected, the technology may crop the television, screen, or monitor edges and begin recording the video within the cropped edges of the television, monitor, or screen.

Use of Artificial technology that can Identify spoken words by a speaker and identify those words or directives via a Temporal Data Matching Engine. Once keys words, Logo's, or key phrases or the understanding of the sentence are identified, the system will identify the particular item or service or event from the repository associated to the spoken words and the second user and deliver the item record results to a first user on command by any trigger or systematically. Temporal Data Matching Engine uses one or any combination of identifiers, including simultaneously, but not limited to a recognition matching engine, directive matching engine, repository matching engine and/or a trigger matching engine. The Temporal Data Matching Engine is associated with time data, time codes or timestamps and user data related to item records. The Temporal Data Matching Engine delivers results to users within the principles of the invention. The Temporal Data Matching Engine may be associated with artificial intelligence, semantic intelligence, and machine learning. All matching engines may be associated with a database. All directives may be associated with the directive matching engine. In this invention, a computer system may communicate with a user with or without Artificial Intelligence integrated and all users initiating directives, or a voice command may correspond with the computing system and the computer system or personal digital assistant, and a personal digital assistant may also be communicating and become responsive to ongoing directives or hold a conversation with a user until the directive is satisfied. A voice command may be associated with user identification verification or authorization. A computing system or personal digital assistant may verify or validate the identity of a user and authorized a user command, for example, but not limited to, the age of consent, authorized to proceed, authorized to make a purchase, authorized to interact with a media file and computing system, all through a voice biometric. For example, if a 10-year-old wants to purchase an item or tickets to an event they heard on the radio or seen on television, they will be denied if the authorization is not cleared or verified to proceed. Verification and authorization may be used through one or more biometrics within the invention. In this invention, a directive is a form of recognition technology. All triggers may be associated with the trigger matching engine. All repositories or virtual repositories may be associated with the repository matching engine. All recognition technologies may be associated with the recognition matching engine. All directives may be associated with a directive processing or matching engine. All item records, marketing objects, matching objects, matching engines, and marketing directives may be associated with The Temporal Data Matching Engine. The term "Temporal Data Recognition" may be used in this invention to describe a one or more recognition technologies performing simultaneously or a combination there of. All recognition technologies performing are associated with one or more triggers.

In another example, a user may trigger plated food as an image. Each plated food may be made up of one or more ingredients, fruits, vegetables, spices, and/or consumer products (e.g. branded ketchup, branded pasta, branded chicken, canned baked beans etc. . . . ) to complete a plated meal. Plated may have the same meaning as a bowl, dish, or any other tool or material that sits food items. Food may also mean meal. Each plated food may be associated with an image or photo or video. Each plated food may be associated with text. Each plated food is an item record. Each item record of plated food may be associated with a user repository or database. Each plated food may be associated with a user. After scanning, video recording, or taking a photo of the plated food, a user may be delivered one or more item records including images in detail that created the plated food or meal as results in accordance with the principles of the invention. Triggered plated food may be in-person or from a video or photo. Each trigger in-person or from an establishment may use a location trigger to identify the name of the establishment and street address. Each plated food may be associated to the user repository or database and the physical location and name of an establishment. Each plated food and item detail may be associated with a physical address, name of an establishment, and other apps leading to the merchants that sell the items. All plated food results or food items may come with one or more recipes.

A hierarchical linked list is then made accessible for display on the portable computing device or computing device of the consumer who selected the trigger. The list may include a first page that displays links to each participant-user who has an account in the virtual repository. Such users may include acting professionals, news professionals, hosts, guests, and management (e.g., a producer) of a program for which the media was captured. Selecting link for such a user leads to linked information for item records associated with scene corresponding to the captured media. The item records are records of items that are in the user's virtual repository and are associated with the program, and, in particular, the portion of the program for the captured media. The items may also be linked. Selecting a link for an item may lead to additional information for the item including purchasing information. By way of example, the link may lead to a site for purchasing the item. In some examples, through the site a consumer may purchase or bid in an auction to purchase the authentic item used in the program, which may come with a certificate of authenticity such as a printed certificate, electronic certificate or a non-fungible token (NFT), i.e., a unique digital identifier that cannot be copied, substituted, or subdivided, that is recorded in a blockchain, and is used to certify authenticity and ownership. Alternatively, the link may lead to a retail site through which such an item may be purchased. Thus, the trigger leads to items of interest used in the scene for which the trigger was activated. The items or services on the scene or captured media of the program from the second user's virtual repository is activated when the first user's portable computer device or computing device is triggered and activated. The items and services from the second user's virtual repository will then be sent to the first user's portable computer device or computing device and listed and displayed for product detail information including a purchasing and action bidding option.

In some examples, through the site a consumer may purchase or bid in an auction to purchase the authentic item used in the program, which may come with a certificate of authenticity such as a printed certificate, electronic certificate or a non-fungible token (NFT), i.e., a unique digital identifier that cannot be copied, substituted, or subdivided, that is recorded in a blockchain, digital wallet, and is used to certify authenticity and ownership of the user, item, and the proof of purchase associated to the program or/and professional actor wearing the item and NFT may include the inventory or/and inventory count in numerical order in which the item was purchase from the program. The NFTs may be valued like memorabilia. For example, valuing the first, second, and third item purchased from the program more valuable than the ninety-eighth, ninety-ninth, and one hundredth item purchased from the program (e.g., Product Number, #1 of 100, #15, 20 of 150, 25). The NFTs are sent to the user, owner, or/and purchaser through a digital or computerized system after the purchase of each item from the program. The NFT may include user or professional actor, brand of item, retailer selling the item, category of the item (e.g., shirt, jacket), program name (e.g., Mission Impossible, Legally Blond, Denver Nuggets vs Boston Celtics sporting event), product name, product purchase number, color, size, price, date, time, and current owner (user that made the purchase or user whom which the item was purchase for). Alternatively, the link may lead to a retail site through which such an item may be purchased. Each item purchased from an event, program, or video may and also come with the item marked with the purchase number in the order in which it was purchased. For example, a LeBron James jersey may be tagged or marked with a #5 of 100 anywhere on the jersey itself. These items are printed, made, created, or designed from a computerized machine that could be sent the exact number in order of each item purchased from TV, a program, or an event. The items purchased may be #5 of 100 of the same item record, the same size item or all items purchased from a specific event, program or video. Order number may also be from a series of some sort like the NBA finals which will have 7 games or a Netflix series that may have 10 episodes.

Through an affiliate program, a user may earn compensation (e.g., a commission) for each item purchased through such a link. In this manner, consumers are efficiently provided links to purchase items of interest that appear in a program, while actors, production companies and others associated with a program are compensated for garnering consumer interest and facilitating sales of the items, all without any explicit marketing and without any direct communication between the consumer and user.

In another example, a user may be interested in what items a person in the vicinity of the user is using (e.g., what a person is wearing). Illustratively, a target in the vicinity of a first user may be wearing attire or an item of apparel or accessory that interests the user. The first user may select a control for identification of all other users in the first user's vicinity who have shared items or shared virtual repositories. Location information (e.g., GPS data) from the first user's device may be used to determine the first user's location. The "vicinity" may comprise an area within a determined range of the location. The determined range may be set by default or set and/or adjustable by the first user. If there is more than one other user in the first user's vicinity, the first user may be presented with a list of links to shared user data, from which the first user can browse and/or select a target.

Alternatively, the first user may photograph or video a target. From the location information from the first user's device, and the photograph, the first user may be presented with a list of links to shared user information, from which the first user can select the target. An implementation using facial recognition may filter the list to shared user information for one or more users who match the photograph.

In some implementations, after a target is identified, the system determines if the identified target is a user. If the person is a user, then the system may provide one or more links to shared data of the targeted user. Such shared data may include shared personal information, shared item data and a shared virtual repository. In other implementations, it is clear that a target is a user, and, therefore, this determination is unnecessary. For example, a user may select a target from a search of other users.

As described above, a user may purchase items that are shared by a target. Also, as described above, the target may receive a reward, e.g., an affiliate fee, from a vendor for items purchased by a user. Thus, a system and method according to principles of the invention potentially rewards targets for sharing item and virtual repository data, improves sales by merchants who reward referral business from targets, and facilitate purchasing decisions by consumer-users who admire a target's items and/or virtual repository.

Referring again to FIG. 1, a device such as a tablet 135, smartphone 120, computer 140 or smart television 175, may display an image or a video (media) selected by a user. For example, in one implementation, the media may be an advertisement, commercial, a broadcast or streamed program, video or movie. An icon, link, button, and/or other similar selection mechanisms may be provided, as a trigger, to enable a user to select a scene or page, and/or to mark (e.g., with a cursor) a face of a person in the media. The selection device may be a remote control in the case of television, a paired smartphone, in the case of a smart TV, or any available input device in the case of a computer, tablet or smartphone.

A video may be a broadcast television program, a program streamed on demand or some other motion picture recording. An image or photo may be a photo taken with a user's device, or a photo accessed by a user from an accessible source (e.g., a photo obtained from the Internet) or a photo provided to the user's device by another person (e.g., a photo transmitted to the user by email or SMS).

Identifying information may facilitate identification of subjects of a video or photo. By way of example, in the case of a broadcast program, the broadcaster (e.g., ABC, CBS, NBC, FOX, etc. . . . ) locale and time of broadcast may be used to identify the program. Such information is available from broadcasters, guides (e.g., television program guides) and data aggregators such as GraceNote. The identification of all individuals appearing in an identified program may also be determined from information available for the program, from such sources. Similarly, in the case of a movie, the identification of all individuals appearing in an identified movie may be determined from information available for the movie, movie databases. Knowing the identity of individuals appearing in the video facilitates identification of the person of interest to the user, whether by facial or speaker recognition, or by user selection from a list of actors, actresses, performers, hosts, guests, news anchors, reporters, and the like.

In one embodiment, a database/repository 170 includes temporal data for movies and television programs. Temporal data correlates time with appearing individuals, users, and item records from video data. Thus, all appearing individuals are associated with time values indicating when the individuals appear in the video. The time value may be relative (e.g., relative to the start of the video at 0.0 hr, 0.0 min, 0.0 sec) or, for a broadcast program, actual time (e.g., at 3:45 pm EST). In this manner, determining the time of a scene of interest to a user reveals the individuals appearing in the scene. In this manner, the list of individuals may be greatly reduced from the full cast. Such reduction facilitates identifying a person of interest.

In the case of a photo, metadata may include location and time data. A database API may include event data, identifying an event, attendees, performers, locations, and times. The data may also include user location data, including historical location information and times. In this manner, a user appearing in the photo may be readily identified with or without facial recognition.

In one embodiment, information regarding a selected scene is provided to the user. By way of example and not limitation, a database of program information may contain the names of actors in each program. For a television program the time, location and channel may be used to determine the program. The time and location may be determined from a user's computing device. The tuned channel may be determined from a smart TV, smart cable box or smart satellite receiver via communication with a paired smart phone or other computing device, or by user input.

In another implementation, facial recognition may be applied to all faces in a selected scene or to a selected face in a scene. A copy of the scene or a copy of the image of the selected face may be communicated from the device (e.g., tablet, smartphone 120, computer, or smart television 125) to a server (e.g., server 155) for facial recognition processing using facial recognition software.

Facial recognition software may include facial recognition technologies used for verification and identification. Typical verification tasks may determine that people are who they claim to be before allowing entrance to a facility or access to data. In such cases, facial recognition software compares a current image to images in a database. Some facial recognition software may use one or more of four basic methods: appearance-based, rule-based, feature-based, and/or texture-based. Appearance-based methods measure the similarities of two or more images rather than attempting to extract facial features from the images. Rule-based methods analyze facial components (e.g., the eyes, nose and mouth) to measure their relationship between images. Feature-based methods analyze the characteristics of facial features (e.g., edge qualities, shape and skin color). Texture-based methods may examine the different texture patterns of faces. For each of these methods, facial recognition software may generate a data store using algorithms to define and store data. When an image is supplied for identification, the facial recognition software processes the image and compares it with the information from the data store. As a non-limiting example, Microsoft Azure's Face is an AI service that performs facial recognition and may be embedded into software in accordance with principles of the invention. Toshiba offers a facial recognition engine and development kit that may be used to perform the facial recognition function in accordance with principles of the invention. Amazon's Rekognition can perform facial recognition and much more, including object and scene recognition in accordance with principles of the invention. These and or other facial recognition technologies may be used to perform facial recognition of selected scenes and/or images of faces, in accordance with the principles of the invention.

In another embodiment, a user may play a sound recording or stream, which is another form of media. A speaker in the recording or stream may be identified by manual input from the user, or by speaker recognition.

In another implementation, voice recognition, and more particularly speaker recognition may be used to determine the identity of a speaker in a recording. An exemplary speaker recognition process compares a speech sample against previously created voice prints to determine the best match(es). Technologies used to process and store voice prints include frequency estimation, hidden Markov models, Gaussian mixture models, pattern matching algorithms, neural networks, matrix representation, vector quantization and decision trees. Noise reduction algorithms can be employed to improve accuracy. As a nonlimiting example, Microsoft Azure's Speaker Recognition is a speech service that verifies and identifies speakers and may be incorporated into software. Other non-limiting examples include GoVivace's Speaker Identification software and Oxford Wave Research Ltd.'s Vocalise speaker recognition software.

Figure 20:
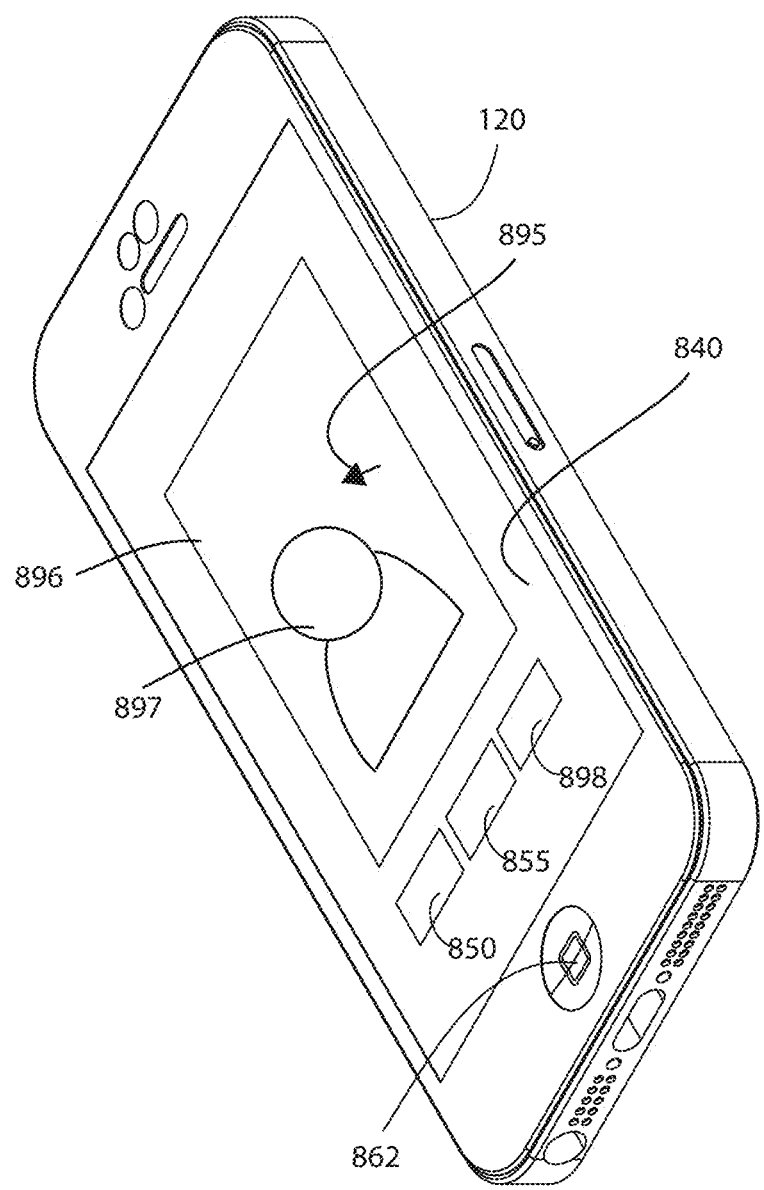
FIG. 20 conceptually illustrates a device (e.g., smart phone) with a displayed media (e.g., video or photo) showing a person and a control for initiating video and/or sound recognition to identify the person for use with a virtual repository according to principles of the invention.

Referring to FIG. 20, a display 840 of a device 120 may display image/video 896 or play a sound recording or stream. Display 840 may include mark face icon, link, button 898, and/or other similar selection mechanisms, which upon selection may enable a user to mark (e.g., in one implementation, with cursor 895) a portion of the face 897 of image/video 896. In the case of a sound recording or stream, the selection mechanism may mark a speaker. If the face is marked with cursor 895, facial recognition may be performed on the image/video 896. If a sound recording or stream is marked, recognition technology may be performed. In one implementation, recognition technology may be performed on image/video 896 with recognition software provided in the device (e.g., via processing logic and storage of device 120). In another implementation, recognition technology may be performed on image/video 896 with recognition software provided on a device communicating with device 120 (e.g., a remote computing system 155 via network communication). Likewise, speaker recognition may be performed on the device 120 or on a remote device 155. Any computer device such as a smart TV or in-video mobile screen may also be used in the current invention. A user may use the following as triggers: a remote control, cursor, touch sensor on a touchscreen or overlay, time code, a pause button of the program, a voice command, a personal digital assistant, and directive including an opt-in of any form (example: A check box, "allow" selection) to receive systematic notifications. Each user will opt in once they publish their products and give our system access to their location all the time or at the time of activating the trigger button. The location may be used to know the exact location inside an event, home, or at an establishment.

In lieu of facial or speaker recognition, a user may enter or select a name of the person in the image/video 896. If the user knows the name of the person, and/or the image/video 896 is poor resolution, and/or facial recognition is unavailable, user entry of the person's identity is a viable option.

Results of the facial recognition of image/video 896, or speaker recognition, or user entry, may be provided on display 840. Results may include a list of the person(s) matching the face shown in image/video 896 or identity entered by the user. For example, in one implementation, results may include a celebrity name and/or image and an indication of the closeness of the match of celebrity (e.g., a 98% chance that celebrity matches with image/video 896) to the processed image/video 896. The displayed name and/or image may be a link and/or pictogram, leading to the celebrity's shared virtual repository and/or shared items.

Results may be arranged in various ways. For example, in one implementation, the results may include a disambiguation list if an entered identity may correspond to more than one person. The disambiguation list may include a list of names and/or images, which may be links and/or pictograms. As another example, results may include a list of matching persons in descending order from the closest match to a person matching within a predetermined percentage (e.g., 50%). A user may select a person from results to display a shared virtual repository or shared items of the person.

In each example, the results list includes names of people who are users of a system according to principles of the invention. The results list omits non-users. Thus, a system according to principles of the invention may determine if a named person or facially or voice recognized person is a user.

An invitation for a non-user identified by user entry or facial or voice recognition may be generated by the system. The invitation is a message to the non-user, inviting and encouraging the non-user to become a user of the system. The invitation may be sent by the requesting user, and/or by the system. The invitation may be sent to the non-user's known email address and/or social media account(s).

A system according to principles of the invention may also determine if a named person, or facially or voice recognized person is a user with a shared virtual repository and items. If a named or recognized user lacks a shared virtual repository and items, the list may include a control (e.g., icon) to invite the user to share his/her virtual repository and items.

In another aspect of an exemplary implementation of the invention, a location-based trigger is used. A location-based trigger uses location information from a user's device and user repository information. Such location information is described above. The trigger may be activated by user command (e.g., selection of a control). The system determines if other users are at the same location, or in the vicinity. The determination is made using location information from each user's smart phone or similar device. If other users are at the same location, or in the vicinity, the system provides a results list or graphical display, for display on the user's device. In one implementation, the results include a list of users at the location and/or in the vicinity. The list may identify users by name and/or photo. The displayed name or photo may be a link or a pictogram that directs to the displayed user's shared virtual repository and/or items.

Illustratively, a user may be in a public space, such as a bar, a mall, a store, a street, a restaurant, a park or the like. The user may see another person who is wearing clothes that interest the user. The user may initiate (e.g., select) a location based trigger control. Upon receiving a location based trigger command, the system receives the user's location information from the user's device. The system then searches its location records for all other users at the location or in the vicinity of the location. As discussed above, the vicinity is a system or user-defined range, such as, for example, a 250 m radius. GPS-enabled smart phones are typically accurate to within about 4.9 m (16 ft.) radius under open sky. However, their accuracy worsens near buildings, bridges, and trees, and indoors.

As long as a user does not disable location tracking, the system receives location information from each user's device (e.g., each user's GPS-enabled smart phone). In one implementation, the system maintains location records for a user indefinitely or for a determined time and in determined time increments. Historical location records are useful for identifying a user who was present at or in the vicinity of a location, but recently left.

Upon determining the users at and in the vicinity of the location, at the current time and recently, e.g., up to five minutes earlier, the system generates results for display on the device of the triggering user. The results may be displayed in a list or graphically. A list may include user names and/or photos linked to each user's shared virtual repository and or items. Tools may be provided to sort and filter the list. By way of example and not limitation, sorting tools may sort the results according to spatial proximity (e.g., distance from location) of each identified user, and/or according to time, i.e., temporal proximity, and/or according to fame as described below, and/or according to another distinguishing category (e.g., gender, race, age range, height range, etc. . . . ).

Fame may be measured according to follower activity. The system may track each visit to a user's shared virtual repository and items by other users. The higher the number of such visits, the greater the popularity of the user's shared virtual repository. Such number of visits may be used as a measure of fame. Another measure of fame tracked by the system may be the number of unique users who visit the user's shared virtual repository and items. The higher the number of such unique visitors, the greater the popularity of the user's shared virtual repository. As another measure of fame, the system may track affiliate rewards (e.g., compensation) to a user. As discussed above, affiliate rewards are received by a user for click through purchases from the user's shared virtual repository and/or items. The higher the number of such purchases, the greater the fame. The measure of fame may also be a composite (combination) of visits, unique visits and affiliate rewards, which would not only indicate traffic to a virtual repository, but traffic that results in sales. The system may also track when such visits and/or affiliate awards are made, to distinguish among past popularity, current popularity and consistent popularity. Each measure of fame may be limited to recent visits, e.g., visits in the past 30, 90, 120 or 180 days. Celebrities will likely earn high levels of fame.

Categories for filtering and sorting results (e.g., a results list) may include gender, race, approximate age (e.g., range of ages such as 40-49), height (e.g., range of heights such as 6' or greater), proximity (e.g., outer limit such as within 100 m radius), fame (e.g., top 100) and other distinguishing categories. By way of example and not limitation if a user is interested in the clothing worn by a nearby Asian woman, who happens to be a user, and appears to be about 30 years old and about 5' 4", the interested user may filter all males, all non-Asians, all people 40 or over, and all people over 5' 10". If the woman was within 10 m of the user, the interested user may also filter all people more than 25 m away. Such filters allow a cushion for error in approximation. As another example, the user may be primarily interested in any famous users in the vicinity. Thus, the interested user may filter, from the result list, all users who have a determined level of fame or less, or all users but the top 5, 10, 50 or 100 most famous users, leaving only the most famous users in the results list.

In each case, a results list includes links (or pictograms) that direct to shared virtual repositories and/or items of a sharing user. A user who follows such a link (i.e., a following user), may purchase one or more shared items, provided that the shared items are available from linked merchants. Such purchases may be initiated by selecting purchase links associated with the items. The selection may direct to a merchant website where the item may be purchased. Via an affiliate program, as described above, the sharing user may be rewarded for the purchase. In this manner, sharing users are rewarded for promoting items, such as by including items in their shared virtual repository, and by wearing or using items in public where other users may acquire an interest upon witnessing the user and/or the items being worn or in use. The sharing user becomes a live advertisement for the items. Traffic to a merchant's website may appreciably increase due to such advertising. Sales of the shared items are also likely to increase.

Another type of trigger is a product trigger. Upon selecting a product trigger control, a user may input identifying information for a product. The information may be a brand and product code, a universal product code (UPC), a European article number (EAN), or other identifying information for a product. The system database 170 may include, for each user, item identifying information. The prospects of affiliate rewards from product triggers and earning fame encourage users to supply such identification information. Upon receiving the identifying information for a product from the triggering user, the system references records in the database 170 to determine users associated with shared items that are the same as the identified product. The system then returns, to the device of the triggering user, a results list and related data. The results list identifies other users who possess the product and have shared item information for the product. The results list may be sorted and filtered by the triggering user. In this manner, the user may determine if many users possess the product, if celebrity users possess the product, what other products such users possess, where such users are located, what are their age, gender, race, and other information relating thereto. The user may also purchase the product through another user's shared virtual repository, to give the other user an affiliate reward or reward such as a monetary compensation or points associated to a monetary compensation. Users may develop reciprocal relationships to foster affiliate rewards among the users.

In another aspect of a method and system according to principles of the invention, a user may research one or more other users. Such research may entail querying (e.g., searching) database records or exploring through indices. Such results in a list may be sorted and filtered to focus interest, as described above. A user interested in researching footwear popular among other like users would likely find that young men in a rural farming community favor different footwear than young men in a major metropolitan area. Illustratively, a user may search for users who possess Adidas Yeezy sneakers. The user may filter the search results by locale, user age, and any other filtering criteria. The results will show how popular such sneakers are among the listed users, after filtering. In another filtering example, displaying the results on the first computing device, filtering the results on the first computing device, the filtering including other item records related to the time codes or scene names of the video data different from the first trigger results on the first computing device.

In another aspect of a method and system according to principles of the invention, a user may enter information for an event, appearance, show, or program (collectively, an "event") into the database 170. By way of example, a celebrity user may appear at an event. Information about the event may be entered after the event is scheduled. The information may include a name for the event, a location for the event, a date and time for the event, and any other information to describe and distinguish the event. Such user may also specify items in the user's shared virtual repository that the user will wear or use during the event. Such user may also specify that the event information be immediately shared, but that information regarding items used/worn by the user at the event not be shared until the event occurs. In this manner, other users may research the event and the participating user, and that user's shared virtual repository and items. Illustratively, a celebrity may appear as a guest on a talk show, an event. The celebrity, or an assistant for the celebrity, may input information about the event and specify the attire worn by the celebrity during the event, with the attire being items from the celebrity's shared virtual repository. Using a system according to principles of the invention, fans of the celebrity may follow the celebrity's shared virtual repository, and consider purchasing one or more of the items worn by the celebrity during the event.

In another aspect of a method and system according to principles of the invention, a user may enter a directive. A directive may identify another user (e.g., a celebrity), a virtual repository, an item or other identifiable classificatory division of subject matter that is of interest or desired by the user providing the directive. The directive identifies the user, the subject matter of interest and provides an instruction. The instruction may request notification when another user's (e.g., a specific celebrity's) virtual repository is changed, or when another user (e.g., a celebrity) schedules an event, or when some other condition is satisfied. A directive may be persistent, valid until canceled. Thus, for example, a user may request notification whenever a celebrity schedules an event or changes her virtual repository.

Figure 21:
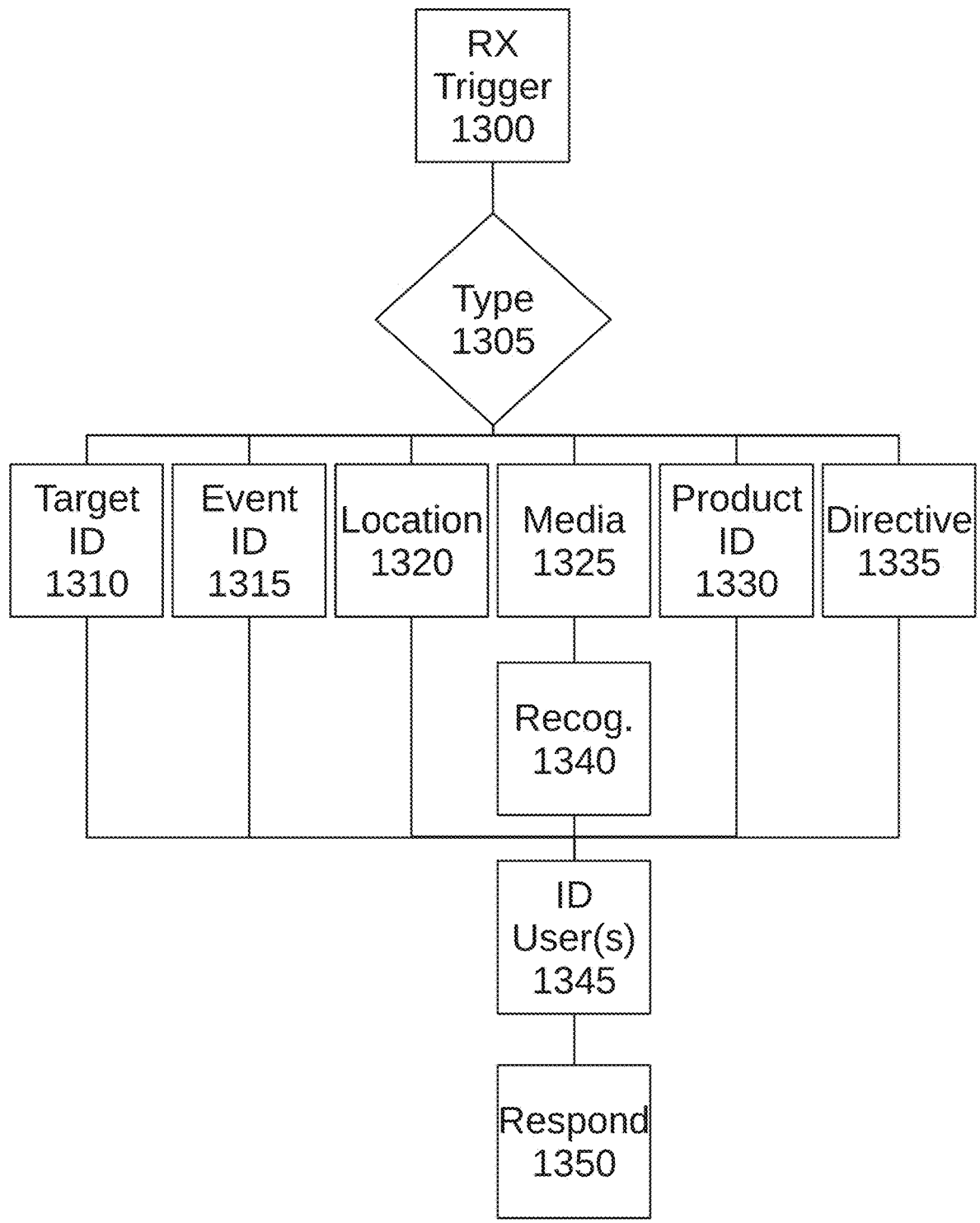
FIG. 21 is a high level flow chart of steps of an exemplary triggering process for use with a virtual repository according to principles of the invention.

Referring to FIG. 21, a high level flow chart is provided for an exemplary triggering process according to principles of the invention. The process entails receiving a trigger, as in step 1300. The type of trigger is determined in step 1305. A target trigger provides a target identification, which is the identification of a user of interest, as in step 1310. An event trigger identifies an event attended by a user, as in step 1315. A location trigger identifies a location of a user, seeking identification of other users in the area, as in step 1320. A media trigger provides media (e.g., an image such as a photo, a video or a sound recording) from which a displayed or speaking person is to be identified, as in step 1325. A product trigger provides an item identification, which is of interest to the requesting user, as in step 1330. A directive, identifies the user, the subject matter of interest and provides an instruction, as in step 1335. In the case of a media trigger, as in step 1325, facial or speaker recognition may be performed, as in step 1340. In each case a one or more users may be identified in response to the trigger, as in step 1345. In response to the triggering user, a results list is provided, as in step 1350. The results list may list one or more other users.

Implementations consistent with principles of the invention may identify media based on facial and/or voice recognition results for the media, and may display identification information based on the facial and/or voice recognition results. By using media identification (e.g., facial recognition technology to identify a person(s) in images and/or video, and/or voice recognition technology to identify a person(s) in audio, e.g., a sound byte from a recording), a person(s) may be identified and shared virtual repository data may be displayed on a device.

The computer system may receive, via the computer network, a second directive, which includes second directive data with a second subject matter responsive to the first interest and a second time associated with the second subject matter. The computer system determines if the second directive includes second subject matter responsive to the first interest. The computer system enters the second directive data in at least one database on the computer system. The computer system then communicates the second directive data to the plurality of users via the computer network. The second directive data may include an assent, a conditional assent, or a counter-proposal.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Data may be supplied to the database through other sources. As an example, a data feed may be provided for the database to receive updated data from supplier (e.g., vendor and/or designer) data sources (e.g., databases). By way of example and not limitation, a CSV data feed may be used to load a CSV file to load product information from a supplier's database. The file may contain all data for all products from the supplier's database. Alternatively, the file may contain data for products that have changed since the last CSV file provided.

Data may also be supplied to the database through synchronization or asynchronous. One-way file synchronization, i.e., mirroring, may also be employed to update data copied into the database from a supplier's data sources. Consistency among data from a supplier's source to the target data storage may be established by timestamp synchronization. In this implementation, all changes to the source data are marked with timestamps. The time of all synchronizations are stored, at the source, at the target or at both locations. Synchronization proceeds by transferring all data with a timestamp later than the previous synchronization.

A supplier or business may also provide a portal (e.g., an enterprise information portal) (EIP), as a framework for making product information available, managing marketing directives, managing consumer directives and satisfying directives. An administrator of a system according to principles of the invention may access the supplier's data through the supplier's EIP. Additionally, a system according to principles of the invention may automatically access the supplier's data through the supplier's EIP, such as by using a crawler to systematically browse the portal to update indexes and data in the database. Web Crawler or bot may also browse the internet or website for source data or user data. Web Crawler or bot may act with a directive to automatically populate a virtual repository or database with website information, user data, data feeds, media files with or without time or dated related content or information. All bi-directional directives and matching of all directives to the user, consumer, marketing object, object, object record, item, subject matter, company, vendor, source or purchasing system may also be systematically generated, suggested, recommended, notified, distributed, or satisfied using a graphical (Graph) database such as an AWS Neptune database or virtual repository.

All directives may be associated with a condition, financial deposit and expiration date when the consumer needs the directive to be satisfied. For example, a consumer can initiate a singular directive or a menu (plurality) of directives that are associated with the subject matter of interest from a search or a pictogram which can be system generated from the database or/and directly from the vendor or source that is carrying the product or service associated with the pictogram. The consumer can select one or multiple directives and select a condition and/or a financial deposit, and/or an expiration date when the directive needs to be satisfied. If the consumer searches for Justin Bieber, the search will deliver results of a pictogram of Justin Bieber. The pictogram of Justin Bieber may be associated with a menu of directives system generated from the pictogram that is associated with the subject matter of interest or from a marketing object where the menu of directives was manually or systematically inputted via portal from the source or company of the marketing object associated to the consumer directive. One of the directives may say "notify me when this Justin Bieber is on television", one may say "notify me when this Justin Bieber is appearing in concert here", one may say "create a demand for a Justin Bieber concert nearby and send it to an aggregation of his followers, and one may say "show me a demand by another follower who created a demand for Justin Bieber to appear in concert nearby. One directive can trigger another directive or action. For example, the directive that said "create a demand for a Justin Bieber concert nearby and send it to an aggregation of his followers" can trigger a directive or action or option that says "send this directive with a good faith deposit or deposit to increase the chances of the concert taking place". It can also trigger a directive that says "I would only want to attend this Justin Bieber concert if we can attend the concert within the next 5 months". A deposit associated with a directive for example could be a certain amount individually required by the system, the celebrity, promoter or the consumer via portal, to create a demand to be sent out to an aggregation of the celebrity's followers. The system, celebrity, promoter, or consumer can also have an accumulation of money collected as the deposit or trigger for the concert to take place or for the concert to be considered. All deposits may be held in an escrow account or bank account until the celebrity agrees to accept the deposit and/or agree to a concert date before that expiration date set by the consumer. If concert date expires or the celebrity Justin Bieber in this example declines the deposit money, then all money is returned back to each consumer that participated in the aggregation. This reverses the process on how promoters get people to attend concerts. This process creates the demand first. Normally the concert is created and then the promoter goes out the get consumers to attend the concert through marketing. In this process, the demand is created first by an aggregation of followers, users or consumers in this case with a deposit from each user who wants to see a specific celebrity in concert, 200 k is collected as a deposit from the aggregation of followers or consumers, then the artist is notified. This can be done for every city and every state which in essence in creating the tour for each and every music artist in this example. This example and process can be applied to every subject matter or every pictogram associated with directives no matter the industry. The system can collect the aggregation of users who selected the same product, the same condition to be satisfied like a shirt and a condition of 50% off to be satisfied. If the user also selects that he or she want to put down a deposit of $40 dollars to guarantee the product, then the system will search for all users or the aggregation of users who selected that they want that specific shirt and the they want it at 50% off with the minimum guarantee deposit of $40 dollars. Once the system, using Artificial Intelligence and/or a web crawler within the system gathers all users, the system via a web portal will notify the company or companies carrying the product for example and say we have 3000 users across the country that would like to buy this shirt if you can drop the price by 50% or a certain price point and we also have for example $30,000 dollars collected as a deposit waiting for you in an escrow. Do you want to make the deal? If the company accepts the offer, then the company will automatically send the promo code to discount the product to those users, but if they company decides not to accept the offer, then the money held in escrow will be returned back to the users. Via the company's portal within the system, all companies can select how many shirts they want allocated to receive for example the 15% off promo code, 30% off promo code, 50% off promo code and the response or distributions off the promo codes can be instant as the consumer directive is initiated from the user on which discount the user would like. The system will automatically know the number of discounts allocated for each product and the number of aggregated users wanting each selected discount. This process can be used for each subject matter selected and each consumer directive selected with a condition to be satisfied.

The system all works the same in different variations to all participants to receive system generated necessary information. All sources may be connected in a multi-directional process. For instance, one company's or consumer's directive, command, request, event, product, and/or condition change can trigger another company or consumer to initiate directives, commands or requests to another company or consumer. The creation of new directives and/or commands based on previously created directives and commands can be done simultaneously or instant.

Elastic Search technology can be used in the invention. In this invention, sources, suppliers, business, company, user, vendor, merchant and agency may have the same meaning.

Personalized Commercials via television and mobile device (FIGS. 9 and 15). Within the current invention, to provide personalized commercials to consumers, you will first need a centralized computer system of products and services connected to data feeds and portals from many companies, vendors, merchants or sources. The process can also be integrated using the products and services associated with websites or systems of any company, vendor, or agency.

Each product or service in the database will come with actions, questions, directives where any user can synchronize and link a product or service to themselves and a filters not limited to the time and date in which you would like to purchase the product or service. Within the time and date you are looking to purchase the product, the companies or vendors of those products and services can send you personalized commercials through your household television, mobile devices, or any television set that is located near the current location you are currently residing or where your personal mobile digital device is located.

For television sets, this is how it works: If you have an household of five family members and each member synchronized and linked a product or a service to themselves for example the first member wants to know when BestBuy is having a 50% off sale on a 50" Samsung T.V. set or needs any 50" Samsung T.V. at a price point of $400 dollars from the original $800 dollar price tag within 30 days, and second member wants to be notified about Pop Concerts in the area, and the third member tells the system that she is having a "baby boy" that is due in 6 months and send a directive to notify her and send a matching marketing object when baby products are 60% off. Once these items, directives, and actions are selected, then they are linked to each family member or consumer. Each company, like advertising agencies, production companies, and radio, T.V. networks, through their portal or system linked to the system within the invention will also know instantly that this consumer only known by their unique ID number is looking to purchase or what they might be interested in. Advertising agencies and production companies in the meantime will be producing marketing videos for these advertising company's or companies worldwide to be sent to networks and companies such as Comcast. However, the process can also be done just using the individual networks without using companies such as Comcast. Advertising agencies, production companies, retail companies, or any company can buy commercials time slots locally or nationally on any network during shows, movies, sporting events, or news viewings.

These companies, the network like NBC, or our centralized computer system can now send personalized commercial to the household television sets or smart television sets. Each consumer's information is collected and sent to the company when the consumer sends a directive or sync and link a product or service therefore notifying the centralized computing system and the company their age and gender so each network, company, or our centralized computer system knows exactly what channel to deliver the personalized commercial. Commercials queued up distribution, will be sent to the channel the user or users are currently viewing and only during the 2 to 5 minute commercial time and if the user changes the channel, the system will hold the commercial in queue and distribute it to the next channel the user is watching. However, the system may show the commercial on the channel that the user just changed, if the changeover of channels occurs within a certain time period. It may be too late to stop the commercial, but the system may notice that the system never distributed the commercial when the user was viewing the previous channel, and save the commercial for the next commercial break on the next channel. This process can be repeated. Two or more commercials or videos, can be timely chronologically synchronized to fit the commercial time slot. This works perfectly with Comcast because their shows can be paused within a certain amount of time, therefore it doesn't matter if shows for multiple viewers finishes at different times. The number of commercials in queue for each user who selected a marketing directive will come with a ticker that counts distributions as they go out, or place them on hold. Each ticker count may be linked to an accounting system for payments. For example, if you have a teenager in the household and they are watching a television show for teens on NBC, then send the commercial about any pop artist that may be coming to see a concert in the area they are currently residing and the exactly digital device whether mobile or a television set GPS location the consumer is located. If the user, travels to New York, then the company, centralized computer system or network can send the commercial to the user's television set whether they are staying in a hotel room or watching television at a restaurant bar. The sync and link of products and services follows the consumer wherever they go using the location based GPS location of the consumer's digital mobile device. Consumer and consumer marketing directives can also be located to trigger nearby digital device (ex. television set) by a beacon when entering these physical locations. Depending what channel the consumer has the television set on and the age and gender, decides what commercial is being shown. If one television set is on in the household, then all personalized commercials can be shown. What is shown on television or what personalized commercials can be shown, can also be based on which consumer's digital mobile device is closer to the television set at home by proximity or GPS. This means a GPS trigger connected or integrated to the television set or digital mobile device will always ping each other or be set up to trigger when two or more devices are closer to each other.

When this trigger occurs, then it also triggers the synced and linked products of the consumer or family members and their devices, which then triggers the portal or system centralized computer within the invention, the company, and/or the network to deliver systematic personalize commercials to the consumers or household members. This process of triggers always happens when GPS location of consumer's digital device is in proximity of the location (company) of the product, service, or location of another digital device. Personalized commercials can always just go to their mobile digital devices. Personalized commercials can also be shown before music videos, movie trailers, movies, shows etc. . . . whether on television or any digital mobile device.

These television sets will be computer chipped, encrypted, and have triggers and GPS synchronization like smart phones and for companies to know what channels and shows and what time the users are watching. (Smart televisions) Personalized Commercials can always go to the consumer's digital devices after directives are associated with conditions. Commercials or videos can always be sent to the user's devices with the satisfied marketing directives or marketing objects are sent to the consumer. Televisions can also be linked to consumer personal phone number to complete the process within the invention.

This entire process is multi-directional and chronologically systematically synchronized to all devices, systems, directives, products and services of consumers and companies using predictive analysis for pin point timely product and commercial placement and commercial programming. Network programming system may be interchangeable. This means commercials and commercial time slots can change on the fly systematically or manually.

Networks will have a systematic system linked to the centralized computer system of the invention which are linked to company's videos or products and services also linked to the centralized computer system for systematic releases and distribution of commercials to the consumers or television sets nearby their digital devices or on their mobile digital devices based on triggers, sync and linked directives and actions on products, and GPS location. Commercials can be sent to the user's personalized news feed.

In another embodiment: Since the television may be a smart T.V., each television may also be synchronized and linked to the consumers or user's smartphone for displaying or streaming commercials to the consumer via a television and radio at a time of the commercial time slots for each program. For example, if the consumer or user receives advertisement commercials to their smart phones or computer devices, those advertisement commercials may also be shown on the consumer's television set or a nearby television during the commercial break. Televisions may use a beacon technology, Bluetooth technology, GPS, WiFi, or any kind of technology to recognize if the consumer is near the television set. Recognizing is always constant when television is on. One television set, radio, or the computer within the television set, can be mapped to many different consumer's digital programmed computing devices, in essence turning any and each consumer's digital programmed computer device to that of its own. Signing them off once they are not nearby. Directives are stored in the database and accessed from a database. However, all and different commercial advertisement can be retrieved and stored in a queue for streaming. The television, radio or computer within the television may mix in its own marketing agency's commercials matching directives and subject matter of the first user for streaming with commercials coming directly from the marketing agencies, or commercials coming directly from the retail companies or brands themselves. Each company and network may push a commercial alone without using the networks like Comcast, CNN, FOX or marketing agencies etc. . . . , each company can stand alone. Television or radio computer programmed devices collecting users using nearby WIFI. Once the Smart T.V. recognizes who is in proximity of the television, it will search for those consumer's marketing directives to determine what commercials and how many commercial to stream or play as a video.

For mobile smart phones, mobile digital devices: the entire process of distributing personalized commercials to consumers or user or companies can also be done using scrolling chronological synchronized news feeds. These news feeds very similar to Facebook, Instagram, Snapchat can all receive personalized commercials directly from any company, advertising agencies, or production companies or individuals by creating or initiating marketing directives or selecting actions with or with time-sensitive conditions, conditionally or unconditionally. Any created, initiated or selected marketing directive can be associated or trigger a commercial to be distributed to the consumer or user who created, initiated, or selected the marketing directive. Marketing directives can come with time sensitive dates when a marketing object needs to be received. Commercials associated with the product, service, or marketing directive can be sent to the consumers or user's news feed or calendar within the mobile digital device (ex. Smart phone). Commercials or videos, advertising associated with the product, services, topic, or information created, initiated, or selected as a marketing directive by any user, can be distributed to that user in real-time or soon as practical. Directives are linked to products and services of any company, agency, or vendor's website or system. Payment from the any company may be paid out with each matching commercial distribution to the user's directive.

Each consumer's information (unique Id, age etc. . . . ) is collected for data purposes and sent to the company when the consumer creates, initiates, selects a marketing directive or sync and link a product or service therefore notifying the system and the company their age and gender so each advertising agency, production company, or our centralized computer system knows exactly what user to deliver the personalized commercial to. Commercials queued up distribution, will be sent to the calendar, digital device, and news feed of the user or users who have recently sent out a marketing directive. Systematic distributions! Each marketing directive may trigger a different commercial for distribution. All users who select the same interest or marketing directive, may get delivered the same video commercial or ad.

If a user initiates, selects, creates or triggers a marketing directive or synchronized and linked a product or a service to themselves wanting to know if BestBuy is having a 50% off sale on a 50" Samsung T.V. set or needs any 50" Samsung T.V. at a price point of $400 dollars from the original $800 dollar price tag within 30 days, and wants to be notified about Pop Concerts in the area, and tells the system that she is having a "baby boy" that is due in 6 months and send a directive to notify her and send a matching marketing object when baby products are 60% off. Once these items, directives, and actions are selected, then they are linked to the user and any advertising agency, marketing company, or any company advertising videos or materials associated with these products or services will be systematically distributed to the user. Commercials or material are distributed when the marketing directive of the user matches the marketing object of the company/business. The user gets advertising commercials associated to exactly what they want or is looking to buy.

The centralized computing system will have a multi-directional systematic distribution system. This entire process is multi-directional and chronologically systematically synchronized to all devices, systems, directives, products and services of consumers and companies using predictive analysis for proper product and commercial location and time placement and commercial programming.

One exemplary implementation of the invention comprises a consumer-driven centralized marketing system ("CMS"). One such CMS comprises a centralized processing engine comprising one or more digital computing processors, a directive repository comprising one or more computing storage devices and a marketing object repository comprising one or more computing storage devices the same as, or different from, the directive repository storage devices.

It is contemplated that the term "directive", as used herein, may comprise instructions such as, but not limited to, computer software, stored on, and received from/to computing storage devices. Such instructions may also comprise instructions sent/received to/from a user. Participating users may submit directives to the processing engine. A directive may initiate processing. Directives may comprise one or more instructions pertaining to a delivery of one or more electronically-deliverable marketing object. Directives may further comprise a consumer directive or a marketing directive. A consumer directive may comprise one of a plurality of directive types including a location directive, a personal information directive, a general directive and a specific directive. One personal information directive may provide user information such as, but not limited to, gender, race, age, income level, profession, and personal interests. Such information may be used by the systems as described herein to facilitate the creation and delivery of related marketing objects. A general directive comprises a directive which remains active in the systems until the general directive is canceled. Specific directives and marketing directives identify users for receiving a marketing objects. In one embodiment, the centralized processing engine is adapted to save the information associated with each directive as data and/or a record in a database which may be referred to herein as a directive repository.

A marketing object may be provided by a user or a third party. One marketing object may comprise one or more marketing items, such as, but not limited to, coupons, announcements, advertisements, promotional codes, job postings, resumes, personal profiles, and other marketing items known in the art. It is contemplated that the centralized processing engine may save the information associated with each received marketing object as data and/or a record in a database. When a marketing object is provided to the system by a user, the marketing object may be associated with a marketing directive provided by the user, wherein the marketing directive may specify to whom, and when, the marketing object may be distributed. Similarly, the consumer directive may instruct the system to deliver certain types of marketing objects to the user via the system. Directives and marketing objects ("MO") may comprise information (also referred to herein as conditions or conditional information) related to the delivery of the directive/MO such as, but not limited to, (i) a date and a time for one or more users to receive the marketing object associated with the directive and (ii) a company to distribute a marketing object.

Notifications of marketing objects may be generated when a specified condition is satisfied. Conditions and notifications vary according to the subject matter. By way of example, a user may be notified when a product becomes available, is on sale (i.e., at a discount, time and date to receive product), or is offered by a vendor at or below a certain price, or is available as a refurbished or open-box item. A user may be notified when a vendor introduces a new product or a newer version or the next generation of a product. A user may be notified when tickets to an event are offered for sale. A user may be notified when a celebrity makes an appearance locally or on television, or is interviewed, or appears in a newly released movie, or makes a public announcement. A user may be notified of each show or movie at a particular venue. These are non-limiting examples of conditions and notifications.

A user may specify a condition for notification using a user interface with form fields. The fields vary according to the subject matter to which the notification pertains. In the case of product, fields may include a selling price below which a user is willing to purchase the product, availability at a specified venue, coupons, public announcements, and other variables pertaining to the marketing and sale of a product. In the case of a celebrity, the conditions for which notifications may be provided may include television appearances, in-person appearances, shows, announcements and the like.

A user's calendar may be updated with a notification. This is especially useful for time constrained notifications, such as notifications of conditions that will exist for a limited time (e.g., sales, live performances, coupons with expiration dates). Illustratively, an .ics iCalendar file or other compatible calendar file or data stream may be sent (e.g. pushed) to a user's calendar app on the user's client computing device to populate the local calendar with the date-related and/or time-related notification information. The process may be automated, requiring no user intervention.

First user marketing directive associated with a subject matter and condition matching the second user consumer directive and subject matter associated with a marketing object when satisfied, then distributed with a link to facilitate a purchase to the first user.

First user marketing directive associated with a subject matter and a condition searching for the second user matching consumer directive and marketing object in the meantime sending the first user commercial advertisement associated to the matching subject matter prior to the matching marketing object distribution associated with a link to the first user to facilitate a purchase.

The marketing object is an image, file, stream or data that will be forwarded to each user with a consumer directive that matches a marketing directive. The marketing object may be stored in the database.

A computer implemented consumer-driven centralized marketing methodology comprising steps of: receiving from a first user via a first programmed computing device a first directive, said first directive including a condition and identifying the first user and identifying a subject matter of interest to the first user, the condition comprising a condition from the group consisting of a price condition for the subject matter of interest, a pricing discount for the subject matter of interest, a topic for the subject matter of interest; Storing the first directive in a database on a second programmed computing device at a first time; Receiving from a second user via a third programmed computing device a marketing directive, said marketing directive identifying a marketed subject matter and including a marketing object; Storing the marketing directive in the database on the second programmed computing device at a time other than the first time; Subsequently, using the second programmed computing device, determining if the subject matter of interest of the first directive matches the marketing directive and subject matter and if the condition is satisfied, in the meantime sending the first user commercial advertisement associated to the matching subject matter prior to the copy of the matching marketing object distribution associated with a link to the first user to facilitate a purchase of the marketing object; If the subject matter of interest of the first directive matches the marketing subject matter and the marketing directive and the condition is satisfied, then making available to the first user, via network communication, from the second programmed computing device to the first programmed computing device, a copy of the marketing object associated with a link to facilitate a purchase of the marketing object.

Time bound provisioning is available. All directives may be time bound. In other words, a directive may be active for a limited period of time, defined in hours, days, weeks, months or years. For example, a general directive may be time bound for a year. The user associated with the general directive may receive a reminder of the time limit prior to the expiration, giving the user a chance to re-provision or remove the time limit. As another example, a merchant user may impose a time limit on a marketing directive for a coupon. The marketing directive may expire on a determined date.

Unit provisioning is also available. For example, a merchant may want to limit a marketing directive to a maximum of 100 or 1000 or 100000 users or transactions. In this case, after the unit limit is reached, the marketing directive expires. The unit limit is reached when the number of copies made available to users equals the unit limit or when the number of transactions using the marketing directive (e.g., using a coupon provided with the marketing directive) exceeds a unit (e.g., transactional) limit. For fairness, in one implementation, the limited number of users may be determined randomly, or using a random selection algorithm, from all users with consumer directives to which the marketing directive is responsive. Alternatively, the limited number of users may be selected based on seniority of their consumer directives—first posted, first served. These and other user selection criteria may be employed if a unit limit must be applied. In the case of a transactional unit limit, the limit may be applied on a first come first served basis, Buying products in real-time from television or radio. Actions or directives can also be selected to interact with television to receive information from a particular product or service to buy from a phone instantly. Celebrities, promoters, designers, television networks, television shows (e.g., QVC) radio networks may use such functionality to promote their shows and the products featured in their shows. A user may be notified of the date and time that a televised or radio broadcasted event, performance or appearance is occurring, or a product is being displayed on TV or discussed on radio. The notification may include a calendar entry. Concomitantly, the system may include a list, for each show or program, of products that appear in the show or program by time and date. The list may be linked to the notification and calendar entry provided to the user. A television show's calendar may synchronize with the user's calendar on their phone in real-time or the system. When an action or directive is selected the product shown in real-time will have a control or options for the user to select in real-time on their phone displaying the product on one or more strips in order to make a purchase.

User's may be alerted, prompt, or notified on products or services associated with marketing or consumer directives during or prior to commercials coming on television or the radio for viewing or purchasing purposes. Companies, advertising agencies, or any company may have their products or services shown on a television show, movies, news, and commercial synchronized networks programming time slots 24/7 and their data feeds or portals to these products and services in the centralized computing system of all things. Once a television show or radio commercial, event, or product is triggered, a list can appear with images showing products on that particular program, show, or movie for the user to select. These images and product details will also trigger the data feed or portal or website matching the products that particular hour or time shown with the products or services within the centralized computer system or repository. The process is chronological synchronized between all devices, all consumers, network programming systems, data feeds, and portals. The networks may also issue a data feed to companies for product syncing with their programming. Companies or networks during producing or prior to airing of the shows, events, news, or movies may have their own portal and website where they could list products they purchased from another storefront or the centralized repository within the invention. Within the centralized repository of products from multiple data feeds from various companies, the producers, directors or Production Companies of the shows or networks can access the website or application to purchase products they will be using in the production of their show, programming event, news event, or movie. Once the products are purchased, these products will be categorized, archived or save within their inventory within their own website of purchased products.

Businesses satisfying conditions and bi-directional system (Reference FIG. 9). Business users, Merchants or Vendors directives can be created systematically for Marketing Object condition change awareness based on consumer marketing directives and marketing objects can be distributed manually or automatically once the directives are matched or based on the user's time-sensitive need.

In these claims, the company can create marketing directives to trigger when a specific condition is satisfied. A satisfied conditions for the business for example will be if a consumer selected a marketing directive to be notified when a specific product was 60% off. When the consumer or consumers associate this condition of 60% off with a marketing directive, then the businesses' condition is satisfied. Since both the business and the consumer are both looking for certain conditions to exist, this is called bi-directional marketing directives. This process can be done systematically or automatically. For Example, the business could have a "Shirt" that has been in inventory for 60 days and is considered "not selling". If the business decides to issue a marketing directive to systematically send a marketing object to any consumer or consumers that also issues a marketing directive to be notified if that same "shirt" is 60% off, then this will be considered bi-directional marketing directives. Mutual matching satisfied directives! This matching directive can also come with an automatic purchase from the consumer if the consumer directive is met. It can also come with directions or shipping instructions on whom to send it to. Similar products alike "color or style" or similar price to the marketing object sent to the consumer can also be delivered to the consumer. A specific size of a product can be issued to those consumers with the same size in inventory. For the Business, a counter proposal from the consumer can be issued.

A user may specify or select a time and/or date on when they need to receive any satisfied marketing object. Multiple price points can be set by the business. A specific shirt style even with different color and styles can be set a directives for marketing objects to go out to the right consumer marketing directive that matches. For example, the business could have 150 shirts total for sale to anonymous customer. 50 shirts set at 40% off and 50 set at 30% off, with 20 of the 150 being white shirts, 50 being black shirts, and 80 being blue shirts and with the same percentage of shirts divided up to small shirts, medium shirts, and large shirts. The marketing objects can be set to go out to those consumers who selected marketing directives any of the percentage discounts or price points. The merchant, business, or company can limit the number and amount of discounts or promos distributed. Bi-directional directives can also systematically for entertainment options, television or any other industry or subject matter. All bi-directional directives and matching of all directives to the user, consumer, marketing object, subject matter, company, vendor, source or purchasing system can also be systematically generated, distributed, or satisfied using a graphical (Graph) database such as the AWS Neptune database.

The system all works the same in different variations to all participants to receive system generated necessary information. All sources may be connected in a multi-directional process. For instance, one company's or consumer's directive, command, request, event, product, and/or condition change can trigger another company or consumer to initiate directives, commands or requests to another company or consumer. The creation of new directives and/or commands based on previously created directives and commands can be done simultaneously or instant. Elastic Search technology can be used in the invention. In this invention, sources, suppliers, business, company, user, vendor, merchant and agency may have the same meaning.

Network or television programming and retailer's product details via data feeds, API, can be synchronized with the system within the invention and with the user's mobile digital device, remote etc even if coming from a satellite . . . . This synchronization can come with a trigger for the user to initiate for displaying products shown on television or heard on radio stations into their mobile digital devices, data feeds or calendars at the same time they are watching the television or listening to the radio. Each network, celebrity, personal stylist, designer, retailer or any source will have a portal which has access to the repository of archived purchases or universal virtual closet for selecting items or products they want users to access for product details while they are on television or at events. Any source may select any item within the virtual household for wearing purposes or select something from the repository of archived purchases or household repository they want to display on others phones or digital device when those users or viewers trigger the show at the time the product is shown from synchronization or the time or timeframe the Fashion Advertising Model is saying they are wearing the products or items. Synchronizations are associated with a timecode, triggers, a timeframe, and timecode recognition. In this invention, timeframe also means timecode, timestamp, or timecode recognition. In this invention, synchronization are associated to item records or items in a virtual repository associated to a media file synchronized by time. Synchronized item records or items may be triggered by timecode recognition. For example, if a specific celebrity like Justin Bieber selects products from his virtual closet that he is wearing today at 7 am and then selects the network and/or show he is wearing those products on, then anyone who inquiries about Justin Bieber, can know exactly what he is wearing on that show at that particular time and day. The celebrity (Fashion Advertising Model), just like any other source or Fashion Advertising Model will have a portal or Page that lets them select the products they are wearing today and the network, show, or event they are wearing it on or the location they are wearing it at, and the day and time they are wearing the products. Most celebrity location awareness will be determined by the calendar of the event the celebrity will be appearing. The chronological synchronized programming of the networks or television programs may be synced with user's mobile digital devices. User's may be alerted, prompt, or notified on products or services associated with marketing or consumer directives during or prior to commercials coming on television or the radio for viewing or purchasing purposes. Companies, advertising agencies, or any company may have their products or services shown on a television show, movies, news, and commercial synchronized networks programming time slots 24/7 and their data feeds or portals to these products and services in the centralized computing system of all things. Once a television show or radio commercial, event, or product is triggered, a list can appear with images showing products on that particular program, show, or movie for the user to select. These images and product details will also trigger the data feed or portal or website matching the products that particular hour or time shown with the products or services within the centralized computer system or repository. The process is chronological synchronized between all devices, all consumers, network programming systems, data feeds, and portals. The networks may also issue a data feed to companies for product syncing with their programming. Companies or networks during producing or prior to airing of the shows, events, news, or movies may have their own portal and website where they could list products they purchased from another storefront or the centralized repository within the invention. Within the centralized repository of products from multiple data feeds from various companies, the producers, directors or Production Companies of the shows or networks can access the website or application to purchase products they will be using in the production of their show, programming event, news event, or movie. Once the products are purchased, these products will be categorized, archived or save within their inventory within their own website of purchased products. Once the products are categorized, any company, network, producer, director, or production company can access or select any product they will be using on their show, event, news, or movie before or during production or filming, and/or they could select products that will be shown during programming prior to the program being aired on television or radio. Each company, production company or producer or director will have to sign up for an account to the centralized system and repository of products as described in the invention.

Within the production companies, networks, producers, or director's account or website, they will have a matching interactive synchronized chronological calendar of programs being aired, to that of the television or radio networks calendar of programs being aired. The purpose of this is so these producers, directors, or Production Company, or networks could match up the products being displayed on the particular show and sync it with the time and date the actual show, movie, or event will be shown or aired. Once again, all consumers will have a trigger to sync to the program to display the products they are viewing, inquiring, or want to purchase. Each product displayed comes with product detail information, a price, and where it can be purchased. Products can display by selecting the show anytime or during the time shown or trigger of the mobile digital device syncing with the television set or radio station.

In this invention, commercials, shows, movies, program, events, and news are equal to or the same as video, video data, video streaming when delivering or distributing advertising, content, products or services to the user, customer, or consumer. The term or word "program" may include a televised program, broadcasted program, video program, audio program, or streaming program. The term "time value" may have the same meaning as timestamp, time information, or time code.

Computer system 1800 may also include an input device 1833. In one example, a user of computer system 1800 may enter commands and/or other information into computer system 1800 via input device(s) 1833. Examples of an input device(s) 1833 include, but are not limited to, an alphanumeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1833 may be interfaced to bus 1840 via any of a variety of input interfaces 1823 (e.g., input interface 1823) including, but not limited to, serial, parallel, game port, USB, FIREWIRE, THUNDERBOLT, or any combination of the above.

In particular embodiments, when computer system 1800 is connected to network 1830, computer system 1800 may communicate with other devices, such as mobile devices and enterprise systems, connected to network 1830. Communications to and from computer system 1800 may be sent through network interface 1820. For example, network interface 1820 may receive incoming communications (such as requests or responses from other devices) in the form of one or more packets (such as Internet Protocol (IP) packets) from network 1830, and computer system 1800 may store the incoming communications in memory 1803 for processing. Computer system 1800 may similarly store outgoing communications (such as requests or responses to other devices) in the form of one or more packets in memory 1803 and communicated to network 1830 from network interface 1820. Processor(s) 1801 may access these communication packets stored in memory 1803 for processing.

Examples of the network interface 1820 include, but are not limited to, a network interface card, a modem, and any combination thereof. Examples of a network 1830 or network segment 1830 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1830, may employ a wired and/or a wireless mode of communication. In general, any network topology may be used.

Information and data can be displayed through a display 1832. Examples of a display 1832 include, but are not limited to, a liquid crystal display (LCD), an organic liquid crystal display (OLED), a cathode ray tube (CRT), a plasma display, and any combinations thereof. The display 1832 can interface to the processor(s) 1801, memory 1803, and fixed storage 1808, as well as other devices, such as input device(s) 1833, via the bus 1840. The display 1832 is linked to the bus 1840 via a video interface 1822, and transport of data between the display 1832 and the bus 1840 can be controlled via the graphics control 1821.

In addition to a display 1832, computer system 1800 may include one or more other peripheral output devices 1834 including, but not limited to, an audio speaker, a printer, and any combinations thereof. Such peripheral output devices may be connected to the bus 240 via an output interface 1824. Examples of an output interface 1824 include, but are not limited to, a serial port, a parallel connection, a USB port, a FIREWIRE port, a THUNDERBOLT port, and any combinations thereof.

In addition or as an alternative, computer system 1800 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 155 shown in FIG. 1, may comprise a cloud computing system. In one such system, front-end systems such as input devices may provide information to back-end platforms such as servers (e.g. computer systems 155) and storage. Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Products purchased with Apple Pay/Samsung Pay/Payment systems/credit or debit card/cash from any merchant or vendor storefront online or brick and mortar physical location and products saved and categorized in the household repository of the purchaser or user.

Centralized System of online products from one or more merchants and vendors, and product details including the product image and the product code/UPC. CSV files, FTP files, Data feeds, Software development kits (SDK) and API's of merchants and vendors may be used to create one centralized system.

Our centralized system of online products and product details may integrate Apple Pay, Samsung Pay or any other electronic computerized credit card or payment system to transmit money from customer payment system and merchants.

Our Universal repository of all household purchased products, details and attributes is integrated with the centralized system of online purchased products and the customer payment system of Apple Pay, Samsung pay, credit card or any other electronic or digital computerized payment system.

The customer/user/Influencer uses an integrated Apple Pay or Samsung Pay, Credit Card, or payment system on an electronic or digital computerized UI for banking transactions or a plastic credit card to shop and purchase products from any online store or physical store location using a point of sales device, rewards system.

At checkout, the customer/user gives the merchant or vendor the product they are choosing to purchase.

The merchant or vendor (storefront) scans the UPC/Barcode or enters in the UPC/Barcode of the products the customer/user chose to purchase into its own internal system which is recording the product details including the product code, color, size, measurement, dimensions, price, or other attributes pertaining to each product.

The vendor or merchant completes all product scanning in their internal system calculating the final details including the final price.

The customer/user using a digital computerized device/UI of the integrated payment system or credit card scans his or her UI showing the barcode with the merchants or vendors infrared scanner or point of sales device to create a payment transaction of banking details to receive an approval of funds for the vendor or merchant from the customer.

The customer/user uses a credit card with a chip reader to create a payment transaction for an approval of funds for the merchant or vendor.

The customer/user uses cash to make a purchase (Merchant or vendor will use a phone number, email address, or rewards card of the customer to record and send product details to our integrated centralized system of products and integrated universal household repository of purchased products)

At check out at merchant, vendor, or brink and mortar storefront, the user uses his or her credit or debit card, electronic computerized credit card, or payment system to transmit payment for products for fund approval.

Once funds are approved, the final transaction and details of the products are created, recorded and saved in the internal system of the merchant or vendor.

Once funds are approved, the final transaction and details of the products are created, recorded and saved in the internal system of the invention and categorized in the virtual closet or household repository. SlideBuy for the company use and the customer use. Products in the invention via a database can be matched and saved internally during payment transactions. If the system within the current invention doesn't carry the product, the product can still be recorded and saved via merchant rewards system or point of sales system via SDK. During payment transactions system will look to match up product code at the merchant with the product code in our internal system and if there is no match, then product may not be recorded. There may be three or more systems talking to each other to complete transactions: internal system of the invention or centralized products, Apple Pay or Samsung pay system of centralized products and the internal system of the merchant or vendor brick and mortar.)

Each product comes with product details or attributes including the color(s), size, and image labeled or tagged by the brand or retailer before the product was purchased or registered by the user or owner. Once a physical product is purchased, a copy of the product details including the image, size and color is stored into the proper category in the personal virtual household product repository (ex. Virtual closet, T-Shirt) for each owner or member. For this reason, any product can be compared, suggested, or recommended to match against any other product that has contrasting or matching attributes for marketing, promotional, or advertising purposes to help facilitate a purchase.

Each online store associated to products can be triggered by any member or owner for the purpose of advertising, marketing, selling, or purchasing.

Any Virtual household product repository can be shared amongst members and any member can view, click, like, or purchase any product from any other member's household product repository. Members can also manually or systematically match up or be suggested products from their own personal household product repository to match or be suggested products from any other household product repository from any other member or centralized database of online stores and products. Any member can purchase any product from other member's virtual household product repository. Products can be searched, compared, suggested, recommended, or matched up by store name, brand name, product name, product category, household category, size, color, price, and other keywords or attributes from the product details.

Any product in the Virtual household product repository of any personal member could be matched up, compared, or suggested to any other product from their own personal repository or any other member's repository by a trigger button associated to a specific product and product details (product name, color, size, brand, attributes, etc. . . . ) or a trigger button associated to the online store which could be associated to the physical location that's linked to the online store, and a trigger button associated to trigger the database of other members nearby using geo location/locational services to trigger their repository and a trigger button associated to smart T.V's, T.V. network show information, cable boxes, satellite boxes all associated to other members and their repositories.

Any product in the virtual household product repository can be made "private" where other members cannot view or access the product. They can also be made "public". They can also be deleted. They can also be selected to initiate an online sale of the actual physical product which can come with a flat fee or a bidding system until the product is sold to the highest bidder. They can also be linked to the url or redirect from the online store that actually sold the product or any url link with similar attributes of the first product.

The virtual household repository can also be used to select products any owner or member wants to market or advertise by showcasing the product or wearing the product to facilitate "likes" and "purchases" from other members. Each product selected may be associated with the day and time product was selected, product details, store name, store link, brand name, color, size, a physical location, Television Networks and television show details like cast, channel, time the show is aired. Also by customer ID, a Fashion Calendar, a points system and a way for the member or advertiser to earn money from other members liking or purchasing the product advertised by the first member or the member who selected the products.

All products that are purchased from the platform whether from the database of online stores or the database of products are first sent to the notification page of the member. All Products pre-populated from purchase history from any store that is linked to each member via credit cards data, email, phone number, or rewards number are also sent to the notification page of each member. Once a copy of the product details for each product purchased is sent to the notification page, the user could add it to their personal virtual household product repository via a trigger button that will categorize the product under the correct "household category" and then the correct "product category" within the personal repository.

Pushing and categorizing purchased products to the personalized household repository:

System within the invention, household repository, virtual closet and other features can integrate with the websites, rewards system, point system, check out systems, or point of sales systems of vendors and other companies. For example: If a user purchased a product from a vendor's website or stores or within the centralized system within the invention, the product that was purchased may distribute an image and product details to the user who purchased the product via his or her Household Repository or to another user's (friend or family) personalized household repository. User will have option "button" for the product purchased to categorize into their own virtual closet or archived household purchases or a friends or family's virtual closet or archived purchases by prompting the contact list of friends and push a button that allows that product purchased to go to the friend's or contact's virtual closet or repository of archived purchases. The button will also come with a snooze button that tells the system to delay the message, push the product(s) to their friends or family member's own virtual closet or repository of archived purchases and options to give the distribution or notification of the product purchased at least for example 5, 10, 20, 30 days before alerting the friend or family member about the product. Then the user who for example, If the user is buying a product for his girlfriend's birthday a month from now, the user will have the option to delay the response for 30 days that will ask his girlfriend if she would allow this product to be categorized in her own virtual closet. The girlfriend or recipient will have a button "accept" that allows her to accept or reject. (prompting message sent with product) user's product or service info may be categorized in the financial system or tax organizing system within the invention for correct and accurate categorization. Product detail information, images may also be access by the household repository of purchased products or virtual closet by integrating with the credit card system, point of sales device, merchants' services, phone number, email addresses, gift cards, reward cards, rewards system, loyalty program and/or coupons systems of the vendors, stores, or merchants within the invention. When integrating with the Merchant's or vendor's rewards system or loyalty program using a Software Development Kit (SDK), credit card information, reward card information, phone numbers or/and email addresses may also allow the system within the invention to access the purchasing history of every member or buyer of the merchant or vendor. The integration of the rewards system of the merchant or vendor may allow the system within the invention to access the purchasing history of each member or buyer and add or populate those product details including the image that was purchased to the household repository or virtual closet of each user, influencer, or member within the invention by matching email addresses and phone numbers to populate the product details to the correct household repository or virtual closet of each user. The integration of the rewards system, loyalty program or point of sales system of the merchant or vendor allows the system within the invention to also populate and categorize the current purchases to the member's or user's household repository or virtual closet by primary and subcategories by accessing and product details including image and price by identifying the user and product details by credit card, rewards card, email address, and phone number that matches the phone number and email address with the system of the invention. Product codes will be used to recognize the product detail from the merchant's rewards or loyalty program system and matching it in our internal system within the invention. In this invention, Repository of Archived previous purchases, virtual repository, repository, database, universal repository of purchased products, household repository of purchased products, universal household repository, universal household repository of previous purchased products, household repository, archived purchases, archive purchases, archived system, purchasing history, personalized repository, personalized household repository, personalized household product repository, personalized household product repository of purchased products, virtual household product repository, household product repository, household repository, or repository are all one is the same or can be treated as equal meaning. In this invention, user, member, advertiser, person, individual, customer, consumer, consumer-based advertiser, influencer, follower, fashion model, fashion advertising model, consumer advertiser, may be one is the same or can be treated as equal meaning.

Provide the users with an option to add, update or delete the items which will help them to finalize their closet without much effort.

Trigger 6—Using Facial Recognition or Facial and Image Recognition to determine attire worn by another user/influencer on television or scanning their face in person to determine attire using facial recognition or Facial and Image to determine attire:

Facial Recognition or Facial Recognition Trigger Addition to the Virtual Household Product Repository How does this work on T.V. for any show or movie:

Addition: Trigger for television shows and movies on networks and movies from theaters can also be used with facial recognition, Image recognition, or cursor technology.

When a user is in front of the T.V., whether from a remote control or a Smart phone or any digital device, the user could trigger a button and at the precise moment of the trigger for example at 30 minutes 54 seconds, and 8 milliseconds into the movie or show, for a user to know what someone is wearing on T.V or what product is being shown on T.V.

The system will first trigger the facial recognition technology to determine the which actors or actresses or people or products that are being shown at the precise time of the trigger. Or the names, customer bio, or customer ID (including Image or photo of the customer or actor) of each person on television can be manually placed or set at the precise moment or time of any trigger moment throughout the duration of the movie or show or sporting event or commercials.

Then the system will determine the customer ID (including Image or photo of the customer or actor) of each person on television at the time of the trigger or the company ID or owner ID (customer ID) of the person or company that owns the products on T.V. at the time of the trigger.

(image recognition technology can also be triggered as a third. In Step to determine products on T.V. . . . image recognition technology can be associated to the repository and customer ID)

The system will then trigger the Household Repository, then Household Category, then Product Category (for example Virtual Closet, Virtual Living room) of each customer ID identified on television from the facial recognition technology to determine what product(s) the customer selected to wear or be shown on television at the precise time of the trigger. Each product or pictogram selected by the customer or each product categorized as a Household Category and Product Category inside the Virtual Household Product Repository, are associated to one or more URL links to be re-directed to the store, source, merchant or brand the product(s) were purchased and the product details including all attributes but not limited to size, color, gender, price, measurements and image. Including a way to purchase the product.

All URL links are associated to product details (including the image) which are associated to one or more stores, merchants, sources or brands within the database. Each store, merchant or brand are associated to each personal Virtual household product repository which is associated to each customer ID.

Customer or actor's photo or image is associated to the customer ID which is associated to the virtual household product repository which is associated to the household category which is associated to the product category of each product shown on television that is owned by the customer.

All Products on T.V. can be displayed on television or on any digital device including a smartphone of the customer initiating the trigger for product details, likes, purchases, or comparing, matching, or systematic suggestions from products on television against products owned inside their Personal Virtual Household Product Repository (ex. Household category, Product Category for ex.—Virtual Closet, Virtual Living room).

The television or cable box or satellite can also recognize the person in front of the television through a beacon or smartphone to smart T.V. and geolocation technology associated to radius technology to determine how many people are in front of the television and which person is the closes. The cable box or Smart T.V. can recognize the Smartphones of each person closes to the TV using geo location technology which is associated to each customer ID which is associated to each Personal Virtual household Product Repository of the customer which is associated to product URL Links which is associated to the store or merchant database.

Time or clock meter during the duration of the show or movie is associated with the facial technology and associated with the image of the person or product on T.V. which is associated with the Customer ID or Company ID in the database which is associated to the Personal Virtual Household Product Repository of each owner or actor or actress of the products and associated to URL links to each store that is associated to the store and product database.

We use an FTP file or API that populates a database to give us times and dates movies, shows or sporting events will start and end, celebrity ID's, celebrity, movie and show BIO's. This show and movie information within the database or from a third party API may be synchronized with the network television information seen by the user in real-time.

User smart phone (for ex. Comcast on the go) can be linked to the comcast box or television to determine who is front of the T.V. to trigger Customer ID and Virtual household product repository.

Each Personal Virtual Household Product Repository can be triggered for matching, comparing, or suggesting products from the store against the products owned by the customer in the repository.

Products can also be delivered or shipped directly from a warehouse or from being re-directed to the URL link of the brand or store that sells the product and shipped directly from them.

Products may be suggested or marketed or sold by a brand or store or source to a true direct target market or another user against their products in their personalized household repository of purchased products:

In another embodiment, the current invention could run as a background service on the TV and have direct access to the audio PCM data coming from the video source. For example, if a user is watching an ABC or Disney Movie and they ask the TV "what is Jennifer Lopez wearing on TV?", the firmware would send the source audio PCM data to the background of the current invention's service. This would be the source audio from the actual video or audio stream before it goes out through the audio device (speakers, Bluetooth, etc.). This will ensure that our service has the ability to get clean audio without having to re-record the audio after it leaves the output device (speakers). The advantage of this is multiple fold. When we record, it is hard to isolate the actual sound we want to process, as the recording picks up ambient noise in the room. It allows us to capture audio from whatever video is playing on the system regardless of what application the audio is coming from. It allows us to not have to worry about the actual "volume" of the TV output, as the source stream will have consistent volume, even if the TV is turned down low.

In another embodiment within the current invention the system would also like direct audio source for the purpose of allowing mobile users within proximity of the televisions or radio/audio (Entertainment) system to instantly connect to the TV or radio (entertainment system) automatically via Bluetooth or other means for the purpose to receive clean audio to their person mobile devices or automobile user interface from the television or televisions source audio or radio (Entertainment system) audio source in the automobile, before going out to the output speakers on the televisions or automobile. First user initiates a trigger in proximity of a television or radio and the smartphone or user account is connected to the audio source internally within the television or radio (car audio sound system). Upon trigger the television-(monitor) or (Car radio audio system) receives audio source directly from the TV and radio before the sound goes out to the external speakers. At triggering event, This partial captured audio or voice command and/or speaker command matches the fingerprinted audio in the repository or matches the item records in the repository (Speech to text or text to speech) that matches the spoken commands and delivers the item records to the user smartphone or user account via saved item record, Wishlist, Shopping Cart or the trigger directive can carry out instructions with a function to complete a purchase or add an item record (Events, show times, Ticketing events to a user calendar. Audio, Sound, Voice, and Speech Recognition is used in this claim. Voice command (Voice Recognition and Speech recognition triggers the audio recording to capture a partial audio sample from the television or radio system of Commercial ad or program that is associated to the second user repository or database. That sample recording, along with the voice command, locates time stamped or on a time code associated to the user repository to find the exact match of item records associated with the timestamp or commercial ad or TV show. Once found, instructions and functions may be carried out via voice command/voice recognition by the user. Any Item record within the current invention may also go through machine learning technology and Artificial Intelligence training to recognize the exact item against the user repository similar items that are on the video or audio program. Using machine learning technology to train products and artificial intelligence to process, analyze queries, or directives to execute faster when delivering exact or similar products or media files as results. Artificial Intelligence is used for faster processing, analyzing, rendering, and identifying item records or media files associated with Temporal Data Recognition or recognition technologies. The user voice command or computer system may also communicate with a virtual assistant, personal digital assistant, Artificial Intelligence, or a combination thereof to deliver results.

In the current invention, the term "artificial intelligence" may be used for one or more types of Artificial Intelligence and semantic intelligence. Artificial Intelligence systems are trained on a large amount of data, allowing it to learn patterns and make predictions or decisions based on that data. Artificial Intelligence may write its own algorithms based on being supplied with training data. Semantic Intelligence or mapping not only helps machines to interpret the heterogeneous big data to comprehend the corresponding context but can also help to detect big data anomalies and complete the missing information. The types of artificial intelligence and semantic intelligence used in the current invention are as follows, but not limited to:

Narrow AI: AI designed to complete very specific actions; unable to independently learn.

Artificial General Intelligence (AGI): AI designed to learn, think and perform at similar levels to humans.

Generative Artificial Intelligence (GenAI): on the other hand, is designed for a wide range of tasks but lacks AGI's comprehensive understanding or learning ability. Instead of creating a single intelligent system, GenAI develops models that generate new content, mimic human creativity, and excel at specific tasks. It creates original content such as images, text, music, or code, using extensive data to produce relevant and realistic outputs.

Artificial Superintelligence: AI able to surpass the knowledge and capabilities of humans.

Reactive Machine AI: AI capable of responding to external stimuli in real time; unable to build memory or store information for future.

Limited Memory AI: AI that can store knowledge and use it to learn and train for future tasks.

Theory of Mind AI: AI that can sense and respond to human emotions, plus perform the tasks of limited memory machines.

Self-Aware AI: AI that can recognize others' emotions, plus has sense of self and human-level intelligence; the final stage of AI.

All functions or functionality within the current invention may be completed or performed using an artificial intelligence computing system or may be associated with artificial intelligence. Artificial intelligence may systematically or through automation generate requests, selections, directives, suggestions, web crawls, recommendations, reminders, notifications, and perform task or functions based on but not limited to, time, demand, a user calendar, a user schedule, a user needs, voice command, directives. Cognitive Computing may be used in combination or associated with Artificial Intelligence and Semantic Intelligence.

Semantic Intelligence is the ability to gather the necessary information to allow identify, detect and solve semantic gaps on all levels of the organization.

Several types of semantic gaps can be identified:

The semantic gap between different data sources-structured or unstructured.

The semantic gap between the operational data and the human interpretation of this data.

The semantic gap between people communicating about a certain information concept.

One application of semantic intelligence is the management of unstructured information, leveraging semantic technology. These applications tackle R&D, sales, marketing and security for activities that include Knowledge Management, Customer Care and Corporate Intelligence.

Several applications aim to detect and solve different types of semantic gaps. They range from search engines to automatic categorizers, from ETL systems to natural language interfaces, special functionality include dashboards and text mining.

In this current invention, Semantic Intelligence is the ability to gather the necessary information, objects, or item records to identify, detect and solve semantic gaps across all levels of an organization or a centralized marketing system of organizations or an ecosystem or a combination thereof.

Modern operating systems include a voice-user interface that makes spoken human interaction with a device possible, using speech recognition to understand spoken commands. System or Artificial Intelligence may use speech to text and text to speech to respond with an audible or text reply. Artificial Intelligence may be systematic or automated in its directives, request, actions, functions, and when delivering results. User spoken command can be analyzed to search user repository associated with products, services, events to deliver results the user's account, mobile phone, computing device, Smart TV from a radio or television or another computing device. These items, events, services (item records, Matching Objects) are talked about on the radio via voice over and radio advertisement. All Systematic or push notifications can be saved in an advertisement history or saved in a wishlist. Notification history. Notifications may be sent to the email address of the viewer or as a notification itself via an email. In the current invention, all artificial intelligence types are referred to "Artificial Intelligence". Artificial intelligence may be associated to, but not limited to, all triggers, web crawlers, bots, recognition technologies, temporal data, and time codes for identification and processing purposes of item records, images, objects, items, media files, websites, corporate information, and virtual repositories of all users.

Buying products in real-time from television or radio. Actions or directives can also be selected to interact with television to receive information from a particular product or service to buy from a phone instantly. Celebrities, promoters, designers, television networks, television shows (e.g., QVC) radio networks may use such functionality to promote their shows and the products featured in their shows. A user may be notified of the date and time that a televised or radio broadcasted event, performance or appearance is occurring, or a product is being displayed on TV or discussed on radio. The notification may include a calendar entry. Concomitantly, the system may include a list, for each show or program, of products that appear in the show or program by time and date. The list may be linked to the notification and calendar entry provided to the user. A television show's calendar may synchronize with the user's calendar on their phone in real-time or the system. When an action or directive is selected the product shown in real-time will have a control or options for the user to select in real-time on their phone displaying the product on one or more strips in order to make a purchase. Network or television programming and retailer's product details via data feeds, API, can be synchronized with the system within the invention and with the user's mobile digital device, remote etc even if coming from a satellite. This synchronization can come with a trigger for the user to initiate for displaying products shown on television or heard on radio stations into their mobile digital devices, data feeds or calendars at the same time they are watching the television or listening to the radio. Each network, celebrity, personal stylist, designer, retailer or any source will have a portal which has access to the repository of archived purchases or universal virtual closet for selecting items or products they want users to access for product details while they are on television or at events. Any source may select any item within the virtual household for wearing purposes or select something from the repository of archived purchases or household repository they want to display on others phones or digital device when those users or viewers trigger the show at the time the product is shown from synchronization or the time or timeframe the user is saying they are.

The various databases described herein may comprise distinct separate databases, may be combined into one or more databases, or may comprise parts of larger databases. Thus, by way of example and not limitation, a participant database may be combined with a virtual repository. Similarly, a watermark database and fingerprint database may be combined into a multi-purpose database. Thus a database should not be construed to be limited to a distinct separate database, but, rather, may include any database that includes tables and relationships required to provide the described functionality.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts and/or steps have been described, the order may be modified in other implementations consistent with principles of the invention. Further, non-dependent acts may be performed in parallel. Still further although implementations described above discuss use of facial and voice biometrics, other biometric information (e.g., fingerprints, eye retinas and irises, hand measurements, handwriting, gait patterns, typing patterns, etc.) may be used to identify people and provide corresponding virtual repository information.

The term "comprises/comprising" when used in this specification is taken to specify the presence of stated features, steps or components but does not preclude the presence or addition of one or more other features, steps, components or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, step, or instruction referenced in this application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A computer-implemented method of exact matching item records in a virtual repository system from a media file supplied from a trigger, the method comprising:
   a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and
   the plurality of virtual repositories including a second virtual repository associated with a second user; and
   the computer system receiving a selection of a first item record, the first item record being an item record for an item used or owned by the second user, the computing system associating the first item record with use information for the second user of the second repository; the computing system receiving from a first computing device of a first user a first trigger, the first trigger including temporal data and a media file, the media file associated with the second user; and
   the computing system performing target identification and temporal data recognition, target identification including automatic content recognition, temporal data recognition including identifying at least one matching item record in the virtual repository; and
   the computing system sending results to the first computing device, the results including a link to one or more matching item records associated with matching item records of one or more virtual repositories related to the media file, the first item record being responsive to the first trigger.

2. The computer-implemented method of exact matching item records in a virtual repository system from a media file supplied from a trigger according to claim 1, wherein artificial intelligence making a selection of a first item record to the computing system, and determining the step of exact matching includes determining a type of the media file further including automatically determining a content of the media file, and identifying an item record of a virtual repository of the plurality of virtual repositories that corresponds to the content.

3. The computer-implemented method of exact matching item records in a virtual repository system from a media file supplied from a trigger according to claim 1, wherein the computing system preforming temporal data recognition associated with at least a sound, or a speaker, or a speech, or an object, or an image, or a scene name, or a face, or a media identification, or a video or a combination thereof.

4. The computer-implemented method of exact matching item records in a virtual repository system from a media file supplied from a trigger according to claim 1, wherein the computing system receiving from a first computing device of a first user a first trigger, the first trigger requesting first information including a media file, the media file including video data associated with the second user; the computing device receiving a touch digitizer on one or more images on an interactive touchscreen overlay on the user interface of the first user; and the computing system performing time code recognition.

5. The computer-implemented method of exact matching item records in a virtual repository system from a media file supplied from a trigger according to claim 1, wherein temporal data recognition identifying at least one item record associated with a time stamp of the virtual repository of a second user to identify one or more item records associated with an identical timestamp from the virtual repository of a second user.

6. The computer-implemented method of exact matching item records in a virtual repository system from a media file supplied from a trigger according to claim 1, wherein displaying the results on the first computing device, filtering the results on the first computing device, the filtering including other item records related to the time codes of the video data different from the first trigger results.

7. The computer-implemented method of exact matching item records in a virtual repository system from a media file supplied from a trigger according to claim 1, wherein displaying the results on the first computing device, the results on the first computing device including item records associated with a certificate, the certificate including information associated with the first user, purchased item record, and media file, including a purchase order number related to a timestamp in the order the item was purchased.

8. The computer-implemented method of exact matching item records in a virtual repository system from a media file supplied from a trigger according to claim 1, displaying the results on the second computing device, the results on the second computing device of a second user including a reward.

9. The computer-implemented method of exact matching item records in a virtual repository system from a media file supplied from a trigger according to claim 1, wherein the computing system receiving from a first computing device of a first user a first trigger, the first trigger requesting first information including marketing objects associated with marketing directives and the first trigger including media file, the media file including video data associated with the second user; and the computing system performing trigger item record identification including steps of performing object recognition one or more objects on the video data, and identifying a video program scene of interest on the video data including temporal data that correlates item records shown on a program to a specific time value of matching item records associated with a virtual repository, and identifying the second user from the video data.

10. The computer-implemented method of exact matching item records in a virtual repository system from a media file supplied from a trigger according to claim 1, wherein the results include a calendar object for calendaring an event.

11. The computer-implemented method of exact matching item records in a virtual repository system from a media file supplied from a trigger according to claim 1, wherein a first user generates a first trigger, the first trigger being trigger of item records associated with navigable three-dimensional graphic representation of a media file associated with a second virtual repository.

12. A computer-implemented method of exact matching item records in a virtual repository system from a media file supplied from a trigger, the method comprising:
  a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and
  the computer system receiving a selection of a first item record, the first item record being an item record for an item used or owned by the second user, the computing system associating the first item record with use information for the second user of the second repository;
  the computing system receiving from a first computing device of a first user a first trigger, the first trigger voice command requesting first information including a directive with instructions to implement a function associated with item records and the first trigger including media file, the media file including audio data associated with the second user; and
  a personal digital assistant performing trigger item record identification including steps of performing voice recognition and speech recognition on the voice command from the first user and speech and sound recognition on the audio data, and identifying the first user from the voice and speech recognition, and identifying the second user from the audio data, and identifying one or more matching item records associated with one or more directives from the first user corresponding to one or more virtual repositories of a second user and corresponding to one or more directives of the first user; and
  implementing one or more functions until one or more directives are satisfied; and
  the computing system sending results to the first computing device, the results including a link to one or more item records, the first item record being responsive to the first trigger.

13. The computer-implemented method of exact matching item records in a virtual repository system from a media file supplied from a trigger according to claim 12, wherein the computing system receiving from a first computing device of a first user a first trigger, the first trigger voice command requesting first information including a directive with instructions to implement a function associated to marketing objects and the first trigger including media file, the media file including audio data associated with the second user; and the computing system performing trigger item record identification including steps of performing voice recognition and speech recognition on the voice command of the first user and speech and sound recognition on the audio data, and identifying the first user from the voice and speech recognition, and identifying the second user from the audio data.

14. The computer-implemented method of exact matching item records in a virtual repository system from a media file supplied from a trigger according to claim 12, wherein the computing system receiving from a first computing device of a first user a first trigger, the first trigger requesting first information including a media file, the media file including video data associated with the second user; the computing device receiving a touch digitizer on one or more images on an interactive touchscreen overlay on the user interface of the first user; and the computing system performing time code recognition.

15. The computer-implemented method of exact matching item records in a virtual repository system from a media file supplied from a trigger according to claim 12, further comprising displaying the results on the first computing device, the results on the first computing device including item records associated with a certificate, the certificate including information associated with the first user, purchased item record, and media file, including a purchase order number related to a timestamp in the order the item was purchased.

16. The computer-implemented method of exact matching item records in a virtual repository system from a media file supplied from a trigger according to claim 12, wherein the results include a calendar object for calendaring an event.

17. The computer-implemented method of exact matching item records in a virtual repository system from a media file supplied from a trigger, the method comprising:
  a computing system storing a plurality of virtual repositories, each virtual repository of the plurality of virtual repositories being associated with a user of a plurality of users, and each virtual repository of the plurality of virtual repositories including item records for items owned or used by at least one user of the plurality of users, and the plurality of virtual repositories including a second virtual repository associated with a second user; and
  the computer system receiving a selection of a first item record, the first item record being an item record for an item used or owned by the second user, the computing system associating the first item record with use information for the second user of the second repository; the computing system generating a first trigger, first trigger being associated with one or more directives of a first computing device of a first user, the first trigger directive requesting first information including one or more item records associated with a media file including video data associated with a second user of a second virtual repository; and
  the computing system performing time code recognition and identifying a video program scene of interest on the video data including temporal data that correlates item records shown on a program to a specific time value to matching item records associated to a virtual repository, and identifying the second user from the video data, and identifying one or more matching item records from the media file; and
  the computing system sending results to the first computing device, the results including a link to one or more item records associated with item records of one or more virtual repositories associated with the video data of a second user, the first item record being responsive to the first trigger.

18. The computer-implemented method of exact matching item records in a virtual repository system from a media file supplied from a trigger according to claim 17, wherein the computing system performing sound recognition and identifying a video program scene of interest on the video data including temporal data that correlates item records shown on a program to a specific time value to matching item records associated to a virtual repository, and identifying the second user from the video data, and identifying one or more matching item records from the media file.

19. The computer-implemented method of exact matching item records in a virtual repository system from a media file supplied from a trigger according to claim 17, wherein the computing system performing object recognition and identifying a video program scene of interest on the video data including temporal data that correlates item records shown on a program to a specific time value to matching item records associated to a virtual repository, and identifying the second user from the video data, and identifying one or more matching item records from the media file.

20. The computer-implemented method of exact matching item records in a virtual repository system from a media file supplied from a trigger according to claim 17, wherein displaying the results on the first computing device, the results on the first computing device of a first user including a notification.

21. The computer-implemented method of exact matching item records in a virtual repository system from a media file supplied from a trigger according to claim 17, further comprising displaying the results on the first computing device, the results on the first computing device including item records associated with a certificate, the certificate including information associated with the first user, a second user, a purchased item record, and a media file, including a purchase order number related to a timestamp in the order the item was purchased in comparison to other purchases of other users.

22. The computer-implemented method of exact matching item records in a virtual repository system from a media file supplied from a trigger according to claim 17, wherein a computing system sending results to a first computing device, the results including a certificate associated to item records of a second user of a second virtual repository, the certificate being responsive to a purchase.

23. The computer-implemented method of exact matching item records in a virtual repository system from a media file supplied from a trigger according to claim 17, wherein the results include a calendar object for calendaring an event.

24. The computer-implemented method of exact matching item records in a virtual repository system from a media file supplied from a trigger, the method comprising:
- a computing system storing a plurality of virtual repositories, each virtual repository of the plurality of virtual repositories being associated with a user of a plurality of users, and each virtual repository of the plurality of virtual repositories including item records for items associated with at least one user of the plurality of users; and
- the computing system receiving, from a first computing device, a first data pack, the first data pack including first time information for generation of the first data pack, media information, and first location information for the media information; and
- the computing system performing exact matching, the exact matching including steps of automatically determining a type of the media information and further includes automatically determining a content of the media information, the step of automatically determining a content of the media information including automatic content recognition, and the computing system determining if the content satisfies a directive, and the computing system identifying a record of a virtual repository of the plurality of virtual repositories that corresponds to the content; and
- the computing system sending results to the first computing device, the results including a link associated with the identified record.

25. The computer-implemented method of exact matching item records in a virtual repository system from a media file supplied from a trigger according to claim 24, wherein determining a type of the media information includes determining if the media information comprises one of a video file, an audio file, and a digital photograph.

26. The computer-implemented method of exact matching item records in a virtual repository system from a media file supplied from a trigger according to claim 24, wherein automatically determining a content of the media information includes recognition of at least one of speech, a voice, and combined sounds, as contained in the media information.

27. The computer-implemented method of exact matching item records in a virtual repository system from a media file supplied from a trigger according to claim 24, wherein automatically determining a content of the media information includes recognition of content of a digital photograph.

28. The computer-implemented method of exact matching item records in a virtual repository system from a media file supplied from a trigger according to claim 24, wherein automatically determining a content of the media information includes identifying a digital code in the media information.

29. The computer-implemented method of exact matching item records in a virtual repository system from a media file supplied from a trigger according to claim 1, wherein automatic content recognition includes decoding a matrix code in the media file.

30. The computer-implemented method of exact matching item records in a virtual repository system from a media file supplied from a trigger according to claim 24, wherein automatically determining a content of the media information includes identifying a digital watermark in the media information.

* * * * *